United States Patent
Lucas et al.

(10) Patent No.: US 7,741,793 B2
(45) Date of Patent: Jun. 22, 2010

(54) HYBRID ELECTRIC DEVICE

(75) Inventors: Delbert E. Lucas, Bowling Green, KY (US); Justin Lucas, Stone Mountain, GA (US); Ryan J. Lucas, Atlanta, GA (US); Paul Brent Boyd, Bowling Green, KY (US)

(73) Assignee: MTD Products Inc, Valley City, OH (US)

(*) Notice: Subject to any disclaimer, the term of this patent is extended or adjusted under 35 U.S.C. 154(b) by 0 days.

(21) Appl. No.: 12/077,049

(22) Filed: Mar. 14, 2008

(65) Prior Publication Data
US 2008/0216458 A1 Sep. 11, 2008

Related U.S. Application Data

(63) Continuation-in-part of application No. 11/906,546, filed on Oct. 1, 2007, which is a continuation-in-part of application No. 11/899,616, filed on Sep. 5, 2007, which is a continuation-in-part of application No. 11/670,932, filed on Feb. 2, 2007, which is a continuation-in-part of application No. 11/550,476, filed on Oct. 18, 2006, now Pat. No. 7,482,768, which is a continuation-in-part of application No. 11/550,104, filed on Oct. 17, 2006, now Pat. No. 7,479,754, application No. 12/077,049, which is a continuation-in-part of application No. 11/906,541, filed on Oct. 1, 2007.

(51) Int. Cl.
H02P 3/00 (2006.01)
(52) U.S. Cl. .................................. 318/139; 56/10.1

(58) Field of Classification Search ................. 318/139, 318/811, 599; 56/10.1, 10.6, 10.8
See application file for complete search history.

(56) References Cited

U.S. PATENT DOCUMENTS

| | | | |
|---|---|---|---|
| 5,937,622 A * | 8/1999 | Carrier et al. ................ 56/11.9 |
| 6,456,508 B1 | 9/2002 | Namai et al. | |
| 6,591,593 B1 * | 7/2003 | Brandon et al. .............. 56/10.6 |
| 6,707,268 B1 | 3/2004 | Bell et al. | |
| 6,938,400 B2 * | 9/2005 | Fillman et al. ............... 56/10.6 |
| 2002/0093299 A1 | 7/2002 | Kobayashi et al. | |
| 2004/0135373 A1 * | 7/2004 | Osborne .................... 290/1 A |

* cited by examiner

Primary Examiner—Rina I Duda
(74) Attorney, Agent, or Firm—Wegman, Hessler & Vanderburg

(57) ABSTRACT

A device includes a housing configured with a working element. The device further includes a motor configured for urging motion of the working element. The device further includes a power control module. The power control module is configurable for being in electrical connection with at least one of the motor, a first power source configuration and a second power source configuration. The first power source configuration is configurable for being electrically connected to a battery assembly having a DC power output. The second power source configuration is configurable for being electrically connected to a power inverter, the power inverter configured for receiving an AC power and further configured for outputting a DC power to the second power source configuration. The motor receives power via the power control module from the first power source configuration and/or the second power source configuration.

13 Claims, 44 Drawing Sheets

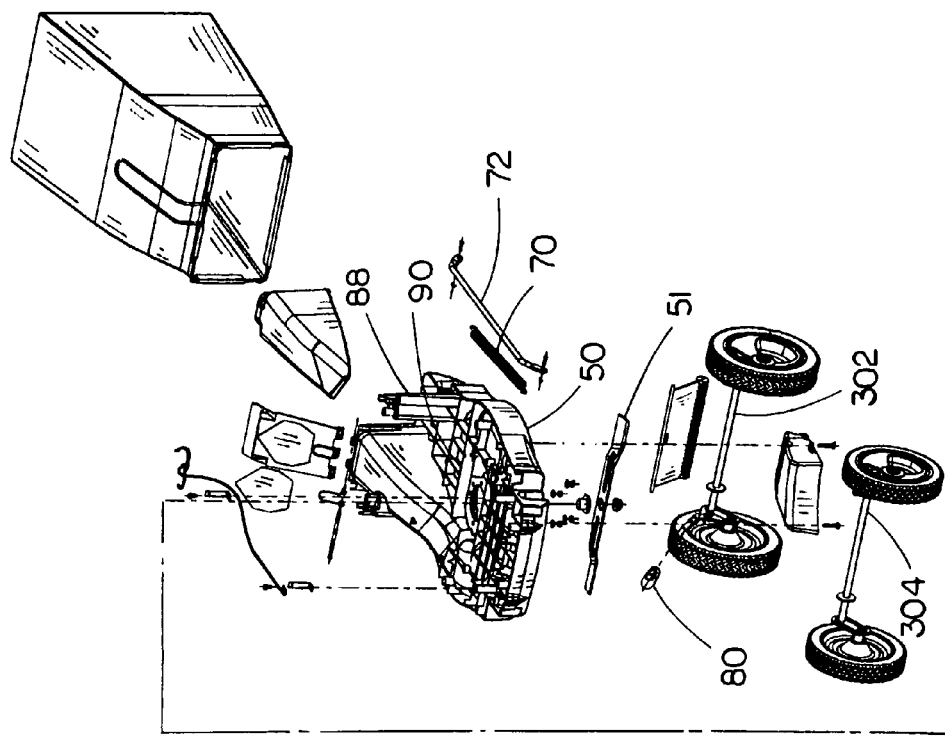
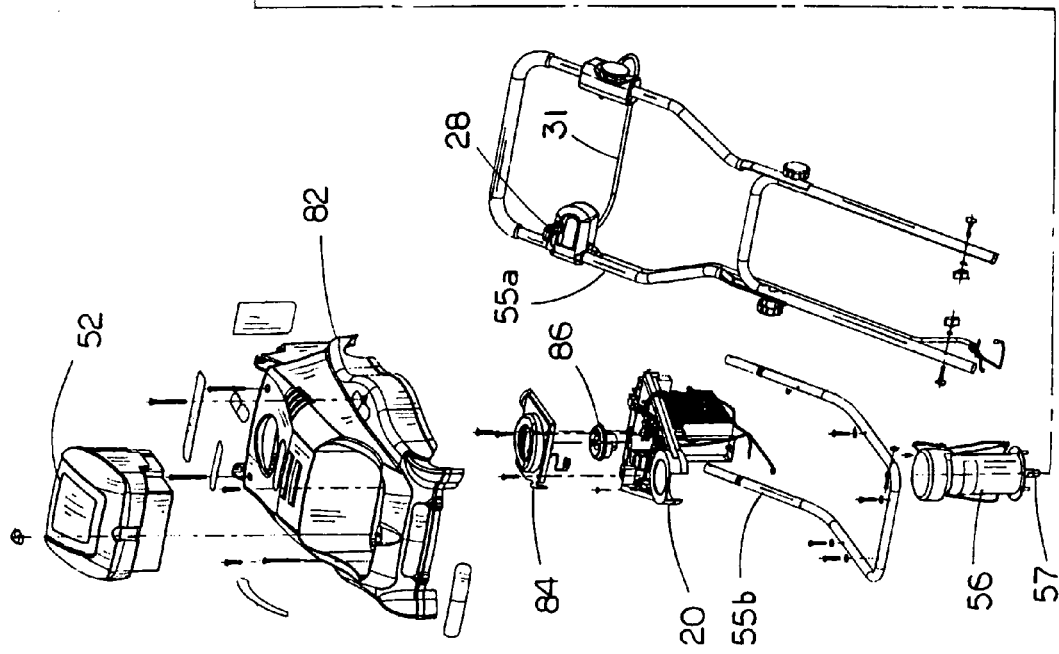
FIG. 12

HYBRID ELECTRIC DEVICE

CROSS-REFERENCE TO RELATED APPLICATIONS

The present application is a continuation-in-part application and claims priority under 35 U.S.C. §120 to U.S. patent application Ser. No. 11/906,546 entitled: Hybrid Electric Device filed Oct. 1, 2007, (pending) which is a continuation-in-part application and claims priority under 35 U.S.C. §120 to U.S. patent application Ser. No. 11/899,616 entitled: Hybrid Electric Lawnmower filed Sep. 5, 2007, (pending) which is a continuation-in-part application claiming priority under 35 U.S.C. §120 to U.S. patent application Ser. No. 11/670,932 entitled: Hybrid Electric Lawnmower filed Feb. 2, 2007, (pending) which is a continuation-in-part application claiming priority under 35 U.S.C. §120 to U.S. patent application Ser. No. 11/550,476 entitled: Hybrid Electric Lawnmower Having Dual Power Supply filed Oct. 18, 2006, (pending) which is a continuation-in-part application claiming priority under 35 U.S.C. §120 to U.S. patent application Ser. No. 11/550,104 entitled: Hybrid Electric Lawnmower filed Oct. 17, 2006 (pending).

The present application is also a continuation-in-part application and claims priority under 35 U.S.C. §120 to U.S. patent application Ser. No. 11/906,541 entitled: Hybrid Electric Device filed Oct. 1, 2007, (pending) which is a continuation-in-part application and claims priority under 35 U.S.C. §120 to U.S. patent application Ser. No. 11/899,616 entitled: Hybrid Electric Lawnmower filed Sep. 5, 2007, (pending) which is a continuation-in-part application claiming priority under 35 U.S.C. §120 to U.S. patent application Ser. No. 11/670,932 entitled: Hybrid Electric Lawnmower filed Feb. 2, 2007, (pending) which is a continuation-in-part application claiming priority under 35 U.S.C. §120 to U.S. patent application Ser. No. 11/550,476 entitled: Hybrid Electric Lawnmower Having Dual Power Supply filed Oct. 18, 2006, (pending) which is a continuation-in-part application claiming priority under 35 U.S.C. §120 to U.S. patent application Ser. No. 11/550,104 entitled: Hybrid Electric Lawnmower filed Oct. 17, 2006 (pending).

U.S. patent application Ser. Nos. 11/906,546, 11/906,541, 11/899,616, 11/670,932, 11/550,476 and 11/550,104 are hereby incorporated by reference in their entireties herein. Further, U.S. patent application entitled Hybrid Electric Cleaning Device filed Mar. 14, 2008 and having Express Mail Mailing Label Number EM 117519027US is also hereby incorporated by reference its entirety herein.

FIELD OF THE INVENTION

The present invention generally relates to the field of hybrid electric devices, and more particularly to a hybrid electric device having a boost/conserve power feature and a dual mode power supply for providing power to an electric motor.

BACKGROUND OF THE INVENTION

Power tools are frequently utilized for lawn and property maintenance operations in and around various properties. The tools may be commonly utilized for operations that require a motor, such as operations requiring the rotational actuation of a working element, such as a cutting blade and/or an impeller. One such power tool is a lawnmower. Another such tool is a snow blower. Lawnmowers typically utilize a rotating cutting blade, while snow blowers typically utilize a rotating impeller/fan. Some power tools may be operated from AC mains, such as power supplied by a utility company or from an AC generator. Other power tools may be operated utilizing a battery.

SUMMARY OF THE INVENTION

Accordingly, an embodiment of the present invention is directed to a device including: a housing configured with a working element; a motor configured for urging motion of the working element; a power control module, the power control module configurable for being in electrical connection with at least one of the motor, a first power source configuration and a second power source configuration, the first power source configuration configurable for being electrically connected to a battery assembly having a Direct Current (DC) power output, the second power source configuration configurable for being electrically connected to a power inverter, the power inverter configured for receiving an Alternating Current (AC) power and further configured for outputting a DC power to the second power source configuration, wherein the motor receives power via the power control module from at least one of the first power source configuration and the second power source configuration; a charge switch for selecting between a first mode for charging the battery assembly when the power control module is receiving AC power and a second mode for not charging the battery; and a charge controller for controlling battery assembly charging when the first mode of the charge switch is selected, wherein the charge controller comprises logic embedded in the power control module.

An additional embodiment of the present invention is directed to a lawnmower, including: a housing configured with a cutting blade; a motor configured for urging motion of the cutting blade; a power control module, the power control module configurable for being in electrical connection with at least one of the motor, a first power source configuration and a second power source configuration, the first power source configuration configurable for being electrically connected to a battery assembly having a Direct Current (DC) power output, the second power source configuration configurable for being electrically connected to a power inverter, the power inverter configured for receiving an Alternating Current (AC) power and further configured for outputting a DC power to the second power source configuration, wherein the motor receives power via the power control module from at least one of the first power source configuration and the second power source configuration; a charge switch for selecting between a first mode for charging the battery assembly when the power control module is receiving AC power and a second mode for not charging the battery; and a charge controller for controlling battery assembly charging when the first mode of the charge switch is selected, wherein the charge controller comprises logic embedded in the power control module.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 12 is an exploded isometric view of the hybrid mower illustrated in FIG. 1;

DETAILED DESCRIPTION OF THE INVENTION

Reference will now be made in detail to the presently preferred embodiments of the invention, examples of which are illustrated in the accompanying drawings.

Figure 1:
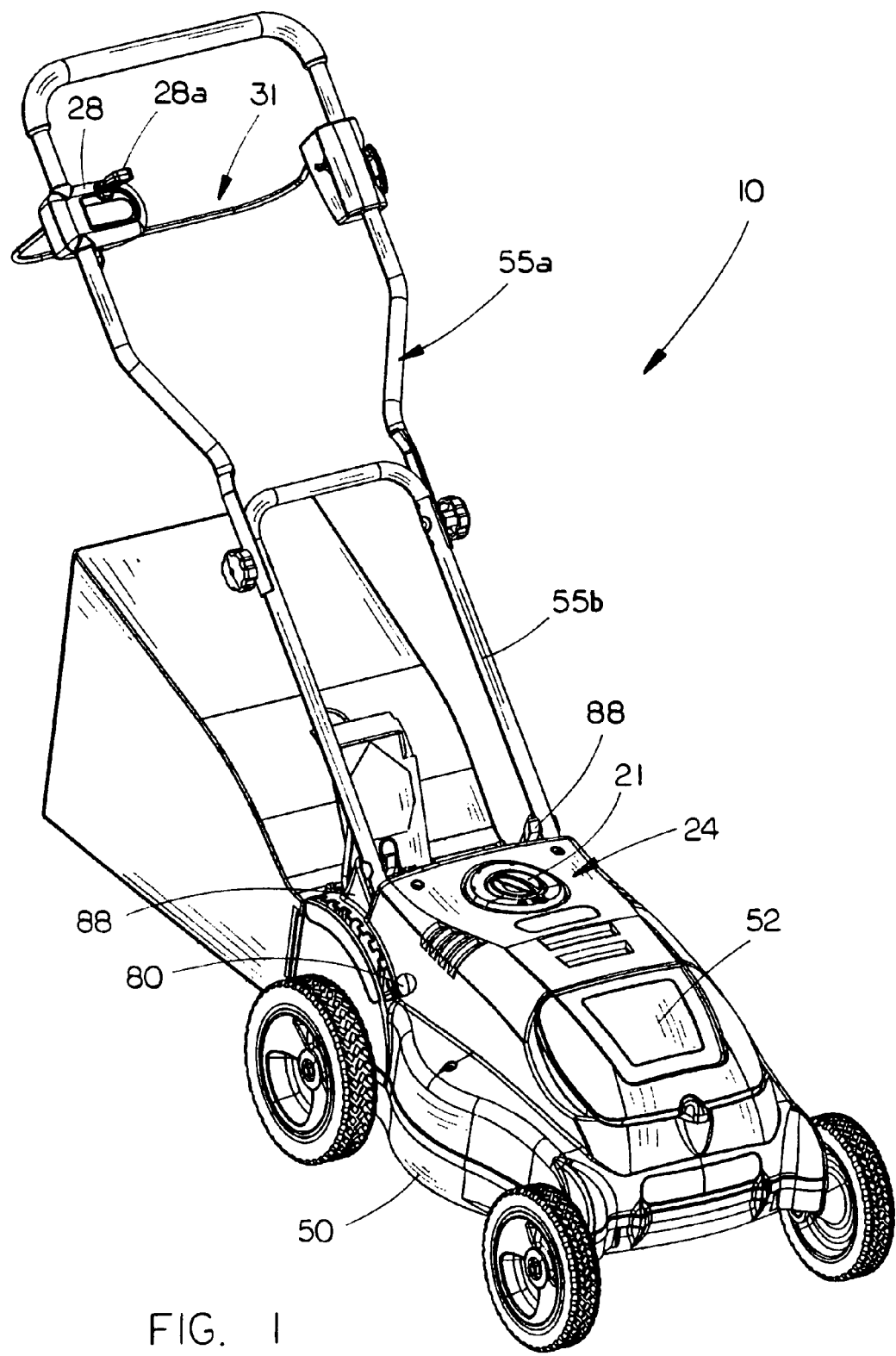
FIG. 1 is an isometric view of a hybrid mower.
Figure 2:
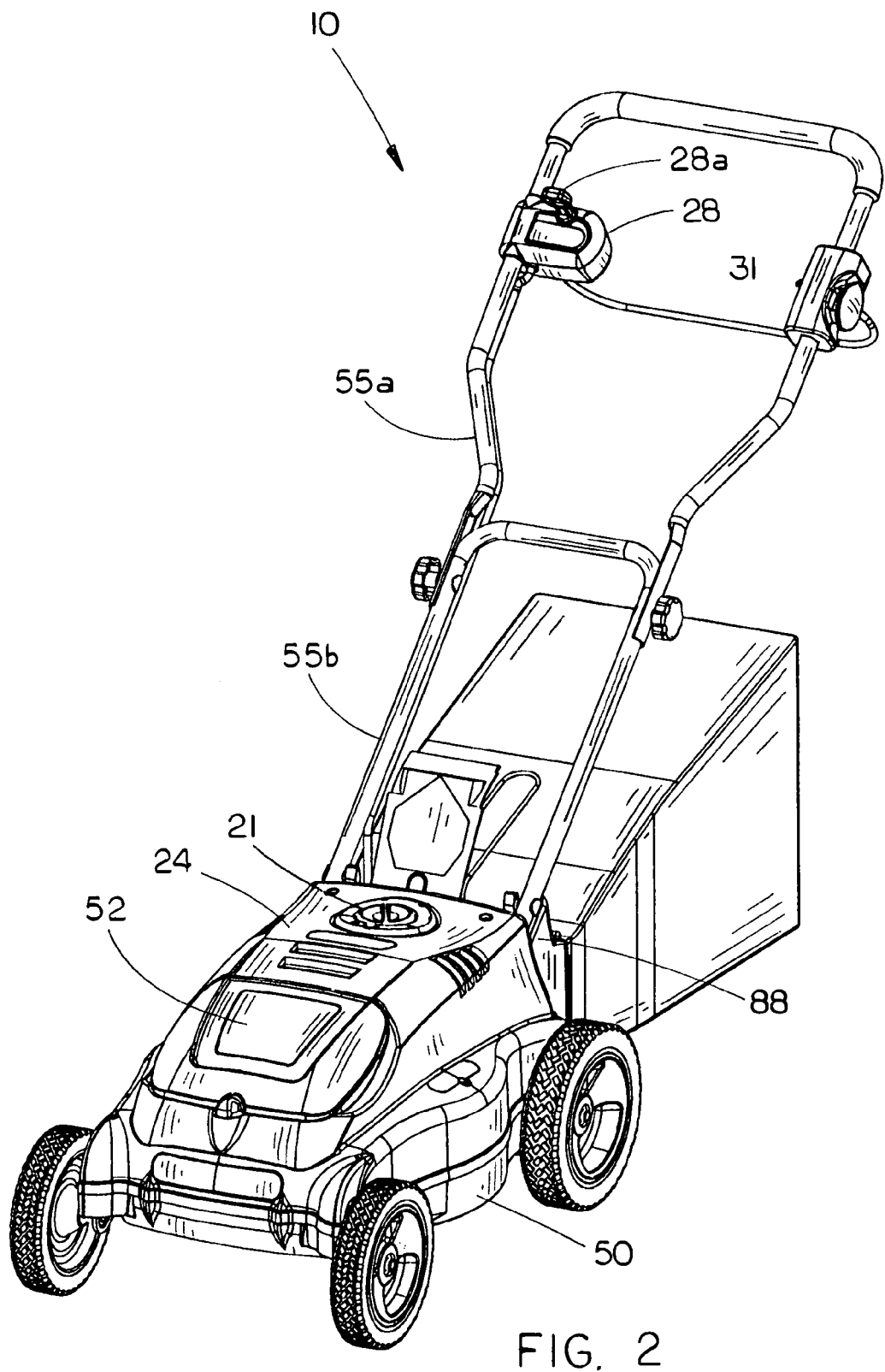
FIG. 2 is another isometric view of the hybrid mower illustrated in FIG. 1.
Figure 3:
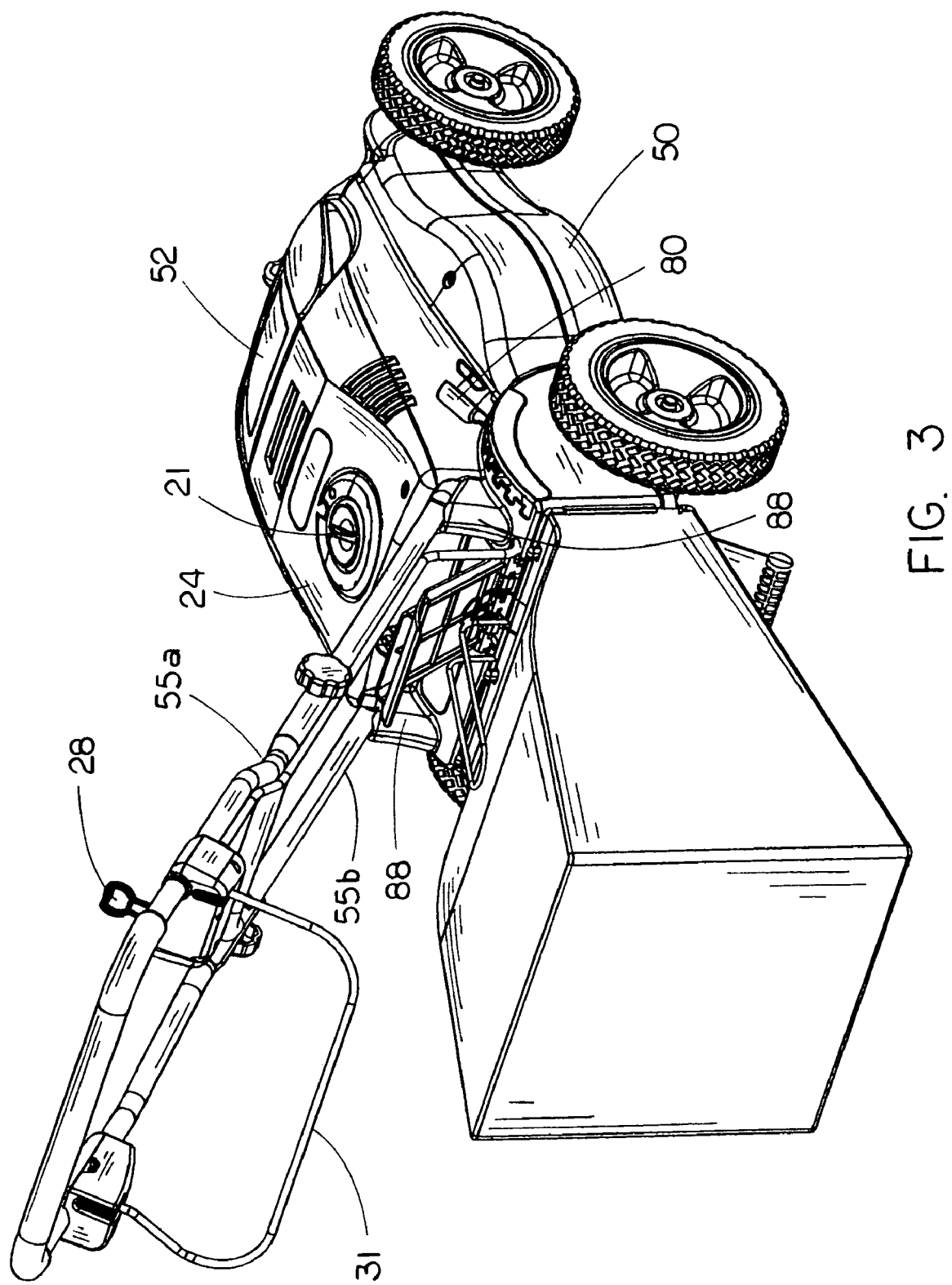
FIG. 3 is a perspective view of the hybrid mower illustrated in FIG. 1.
Figure 4:
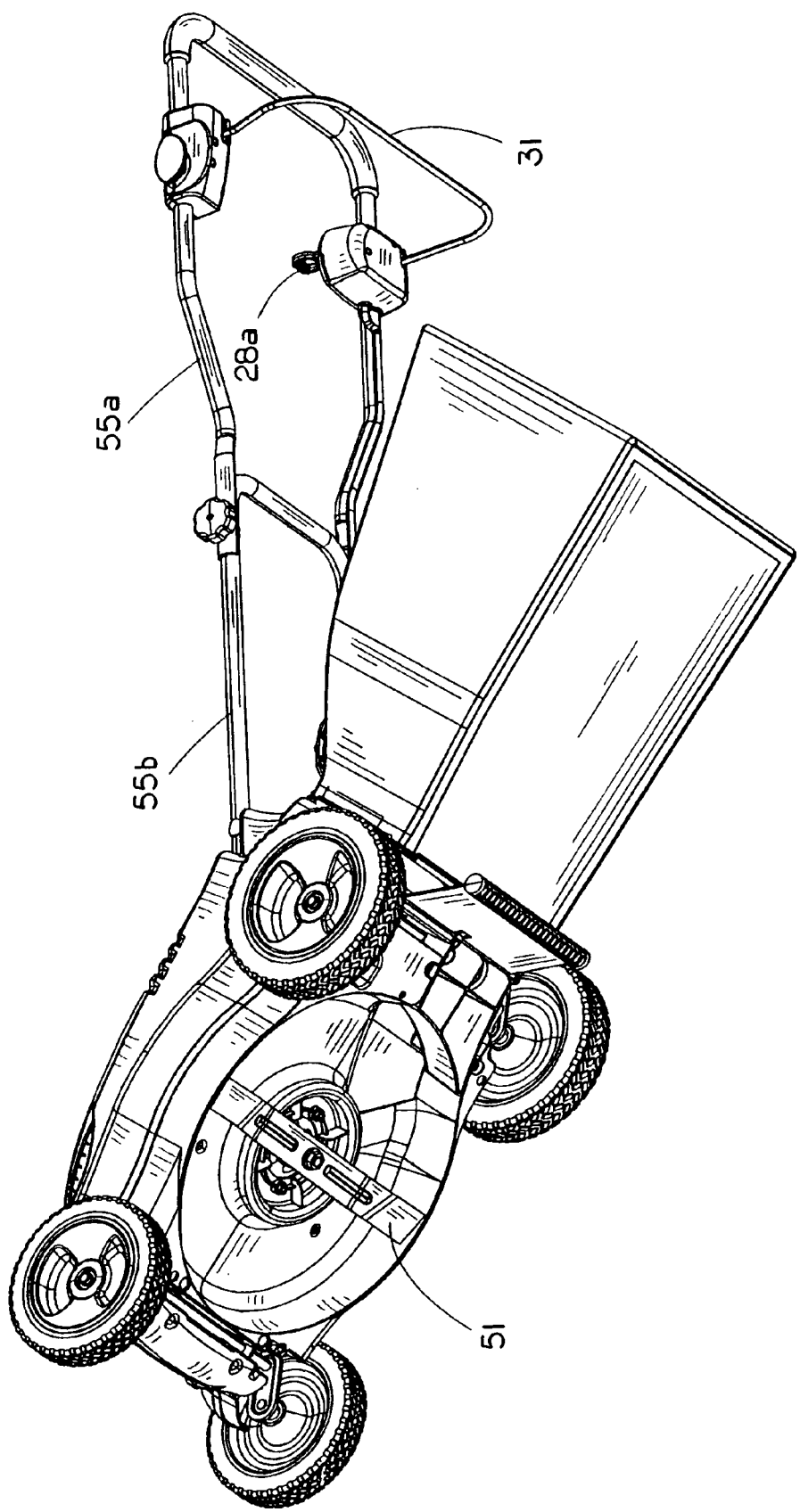
FIG. 4 is another perspective view of the hybrid mower illustrated in FIG. 1.
Figure 5:
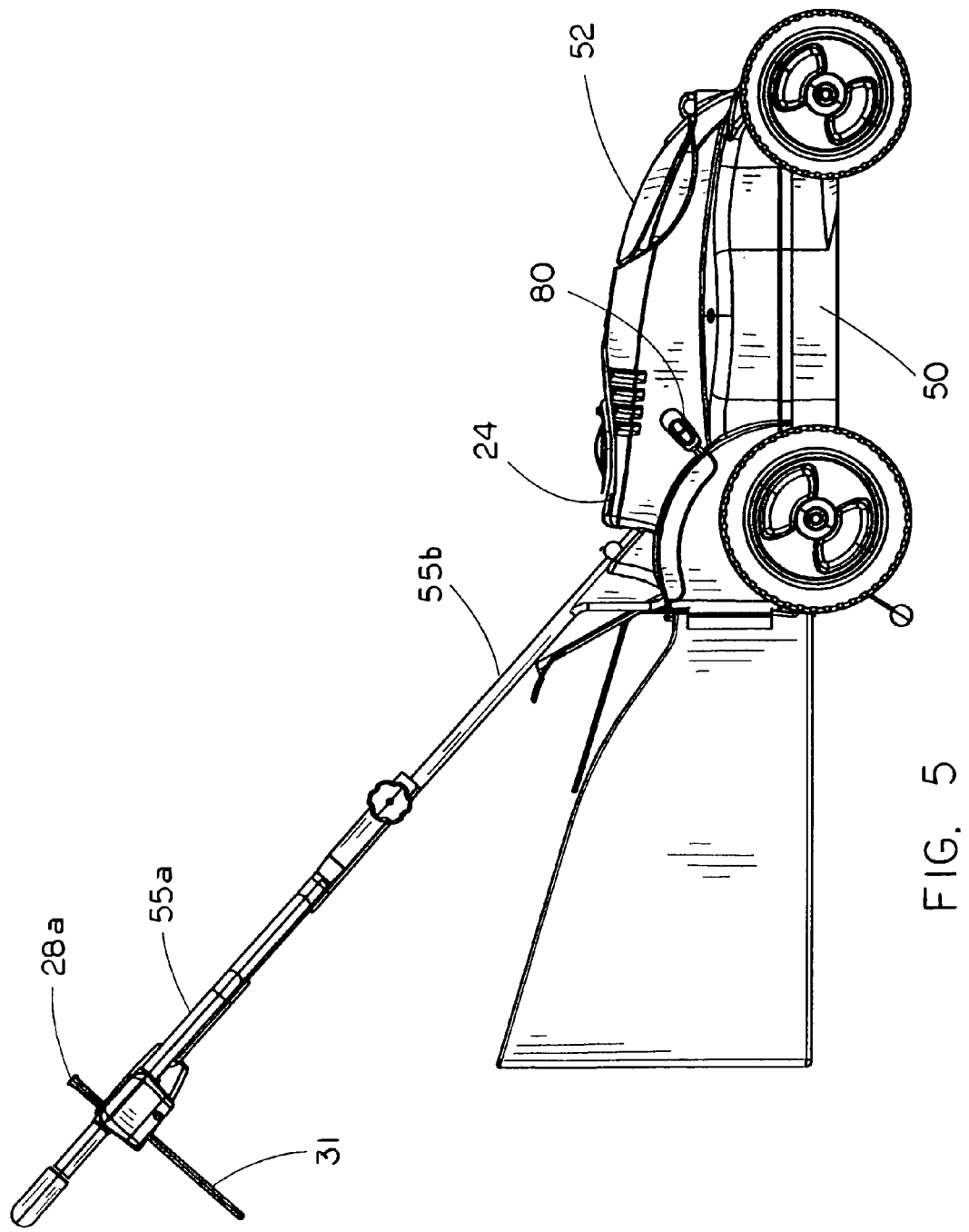
FIG. 5 is a side elevation view of the hybrid mower illustrated in FIG. 1.
Figure 6:
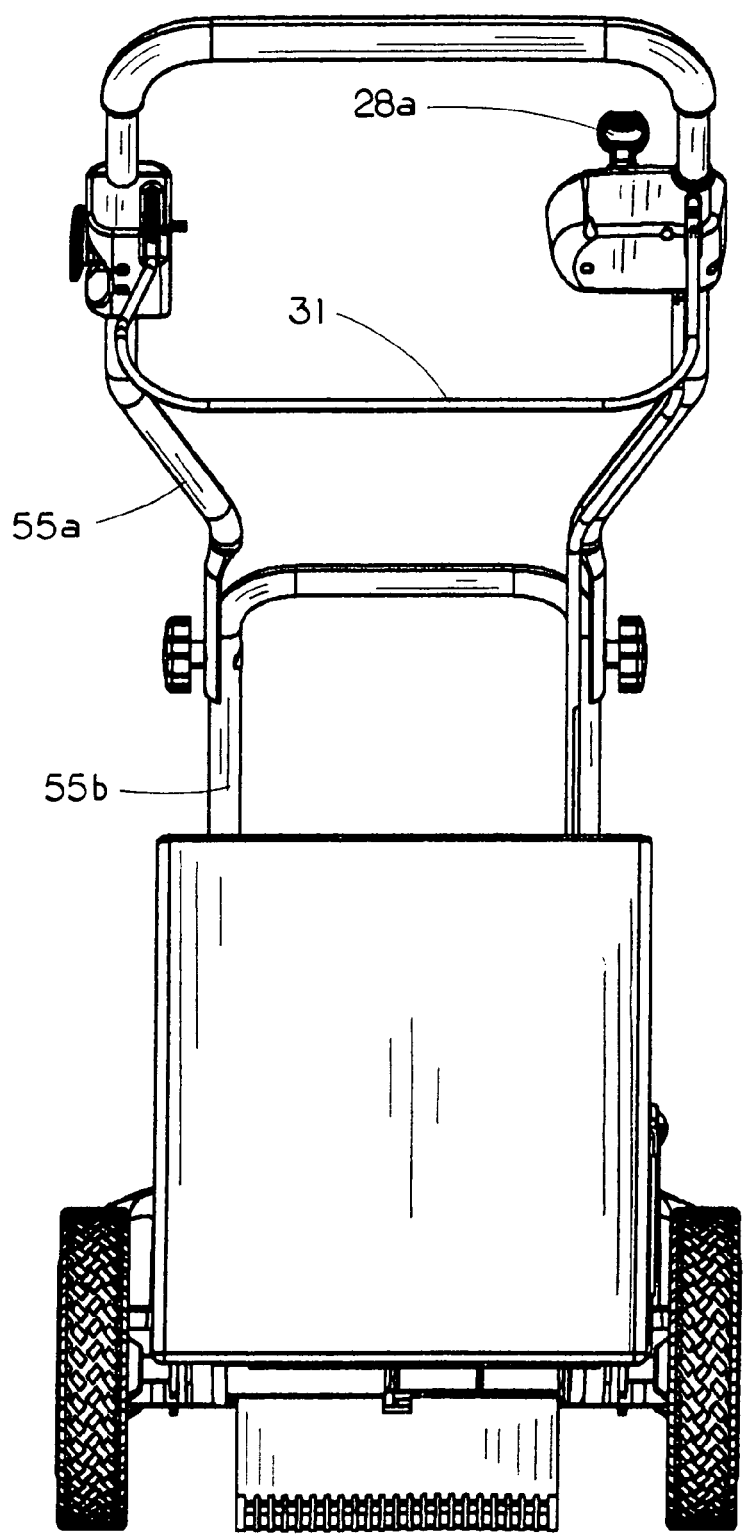
FIG. 6 is a rear elevation view of the hybrid mower illustrated in FIG. 1.
Figure 7B:
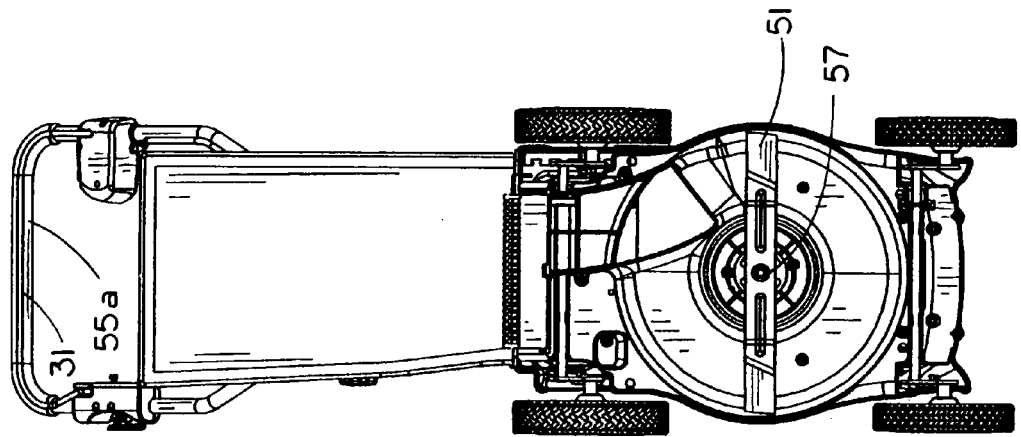
FIG. 7B is a bottom view of the hybrid mower illustrated in FIG. 1.
Figure 7A:
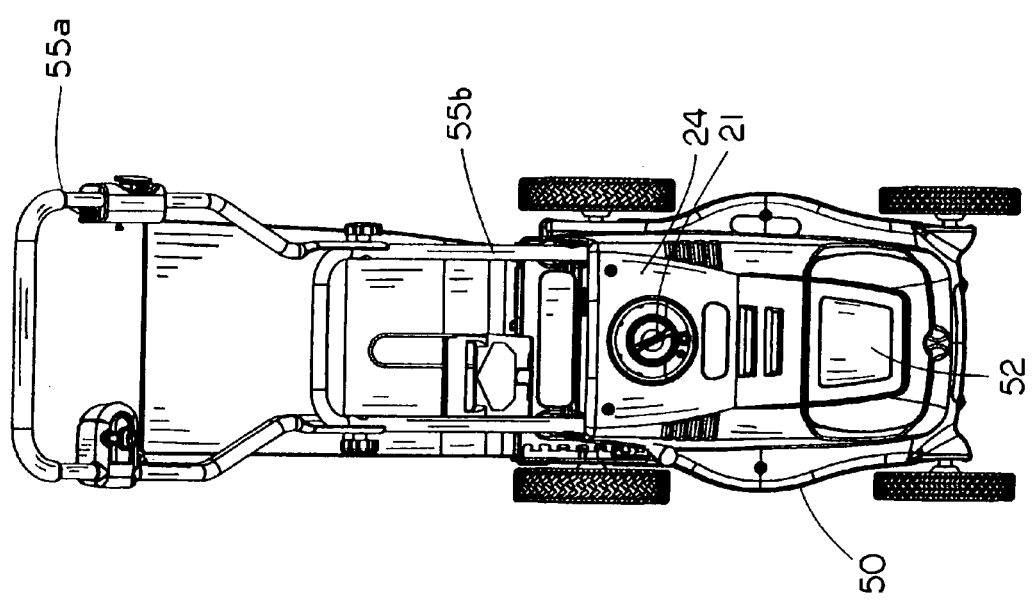
FIG. 7A is a top plan view of the hybrid mower illustrated in FIG. 1.

A hybrid electric device is described herein and set forth in the claims and is partially depicted in the perspective view of FIG. 1 wherein an exemplary embodiment of a hybrid mower 10 is shown. The hybrid mower 10 includes a deck 50 with an outwardly extending handle including an upper handle 55a and a lower handle 55b. Positioned on top of the deck 50 is a control box 24 including a controller and at least one power selection switch 21. The deck 50 further includes a number of features including, but not limited to, the power control and supply described herein as well as a DC motor, a cutting component housing including at least one blade (cutting component), and other necessary features for making the electric lawnmower described herein operable to function as desired. Such function and structure includes the DC motor for driving the blade, the DC motor being powered by alternative power supplies (power source configurations) which may include 120 VAC line voltage or DC power supply such as a battery assembly 52. The motor drives the blade, while the power control system/power supply system of the hybrid electric mower allows the user to select the power source whether it be AC power supply or DC power supply. In either selection, the power control system of the electric mower provides adequate voltage to the motor. Further, a selection is available for the user of the present embodiment to drive the motor in either conserve or boost mode. Conserve mode utilizes less power from the power source than boost mode, thereby increasing run time for each full battery charge under such selection, should the DC operation mode be selected. It is understood that conserve and boost mode may also be operable in AC operation mode.

Further, the motor may be designed as a dual voltage motor which has the capability to operate on two different DC voltages, such as a motor as described in U.S. Pat. No. 6,172, 437. In one embodiment, the dual voltage motor utilizes two separate commutators on a single armature. Each commutator connects to one set of windings (coils) that are separated from the other. Each commutator is also in electric contact with a corresponding set of brushes. The two sets of brushes may be selectively configured through the use of a user selection switch which reconfigures the two sets of coils on the motor from series connectivity, for higher voltage source such as rectified line voltage, to parallel connectivity, for a lower voltage source such as a battery pack.

In this dual voltage motor configuration, if the higher voltage is approximately twice the potential of the lower voltage, the power supply will provide substantially the same voltage potential across a first and a second commutator on the electric motor. For example if the mower is connected to a standard AC power source of 120 VAC, a rectifier may rectify the voltage to about 120 VDC (a higher voltage source). In such case, a series configuration will provide each set of coils about 60 VDC. Alternatively, the mower may be connected to a 60 VDC battery pack (a lower voltage source). In such case, a parallel configuration will provide each set of coils about 60 VDC also. Substantially the same voltage provided to the sets of coils in both higher and lower voltages results in substantially the same revolutions-per-minute or rounds-per-minute (RPM) of the motor. In this manner, the dual-voltage lawnmower may be capable of executing speed control over the motor and the cutting blade without the utilization of an electronic controller. This may represent a significant cost benefit to a consumer. In one specific embodiment, the lack of a controller may represent a cost savings of approximately ten percent. It will be appreciated that the number of windings in the motor may vary and/or the diameter of wires including the windings may vary.

It is understood that alternative designs of the mower may be employed without departing from the scope and spirit of the present invention. For example, in one embodiment, the mower utilizes a second electric motor in order to increase the cutting width of the electric lawn mower without increasing the blade diameter. Moreover, it will be appreciated that in addition to permanent magnet DC motors, many other various types of motors may be utilized with the present invention. These motors may include, but are not limited to, a universal motor, a brushless DC motor, a switched reluctance motor, a stepper motor, and/or an induction motor.

Referring generally to FIGS. 1 through 11. A hybrid mower with a boost conserve feature of the present embodiment is depicted. A plurality of wheels support the deck 50 such that the hybrid mower 10 may roll, be powered or be pushed over terrain required to be cut by the blade 51. The specific configuration of the hybrid mower 10 of the present embodiment, as depicted in FIG. 1, is not necessarily limiting in that the many structures and switches which are depicted may be positioned on multiple surfaces or in multiple positions on the hybrid mower 10 and thus, the particular location and limitation of the depictions and structure set forth are considered to be merely exemplary.

The hybrid mower 10 of the present embodiment incorporates controls near the upper handle 55a such that they may be readily accessible to the operator of the mower 10. A circuit breaker 28 having a key 28a is utilized to break the electrical connection to the motor 56, hence stopping the blade 51, should the key 28a be removed from a fully inserted position. Further, the circuit breaker 28 also serves as a theft-prevention device as the motor cannot be started without the key 28a. Also found located on the upper handle 55a is a blade clutch handle 31. The blade clutch handle 31 is utilized as an interlock handle switch to engage and disengage the DC motor 56 from rotating the blade 51. The blade clutch handle 31 must be operatively held in close relationship to the upper handle 55a in order to engage the DC motor 56 and correspondingly the blade 51. The blade clutch handle 31, when placed and held in close relationship to the upper handle 55a, engages an interlock handle switch as will be described herein which may be a double throw switch, and which operates to act as a user's dead man switch in order to disengage the DC motor if released. Such features may be desirable in order to discontinue rotation of the blade 51 upon release of a manually actuatable handle within a limited and short period of time. Thus, the interlock handle switch as depicted herein is integrated with the blade clutch handle 31 and acts to operatively disengage the DC motor and also cause resistive breaking (hard dynamic break) of both the motor and the blade upon release of the handle 31.

Figure 8:
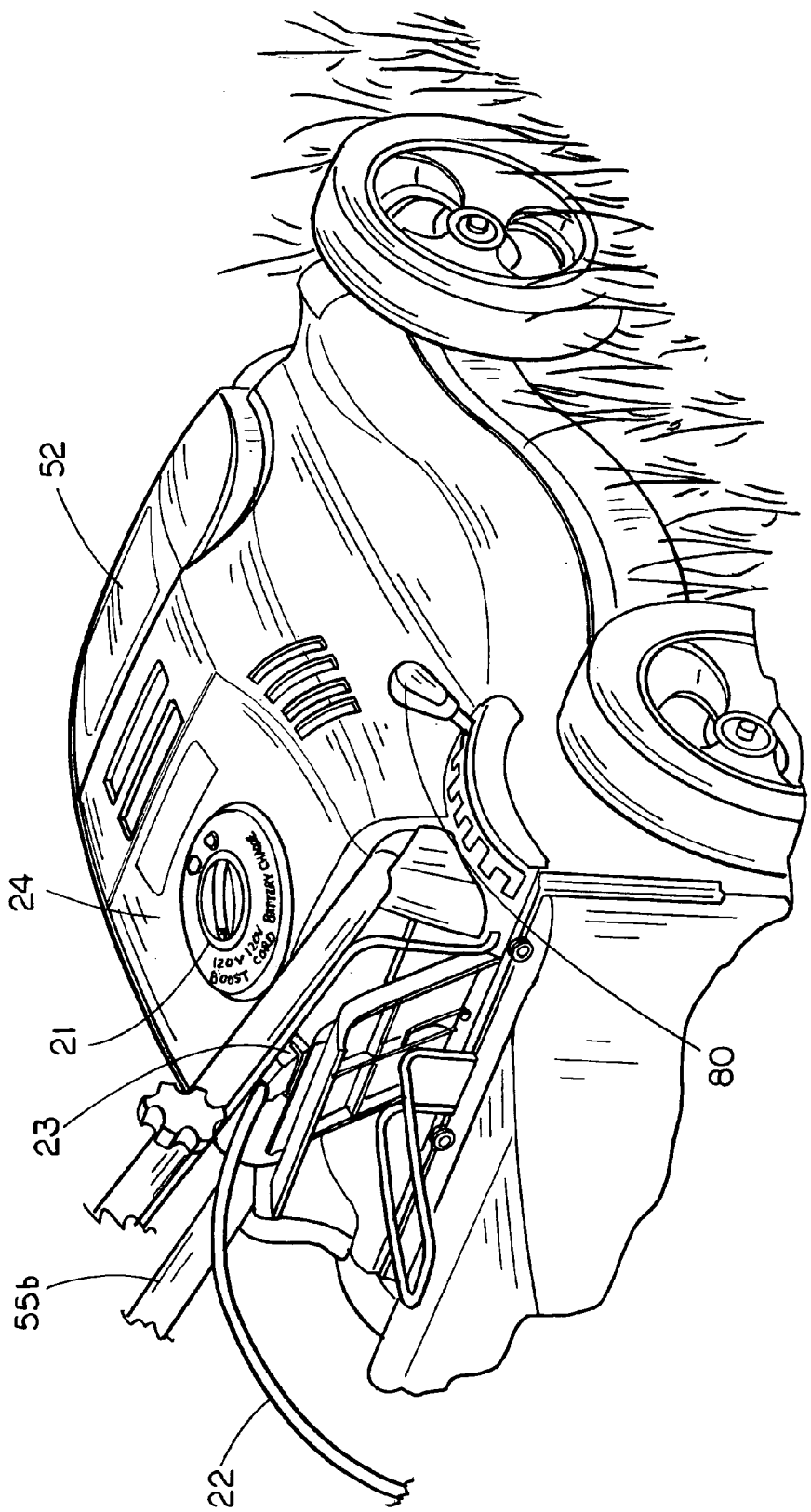
FIG. 8 is a perspective view of the hybrid mower illustrated in FIG. 1.
Figure 9:
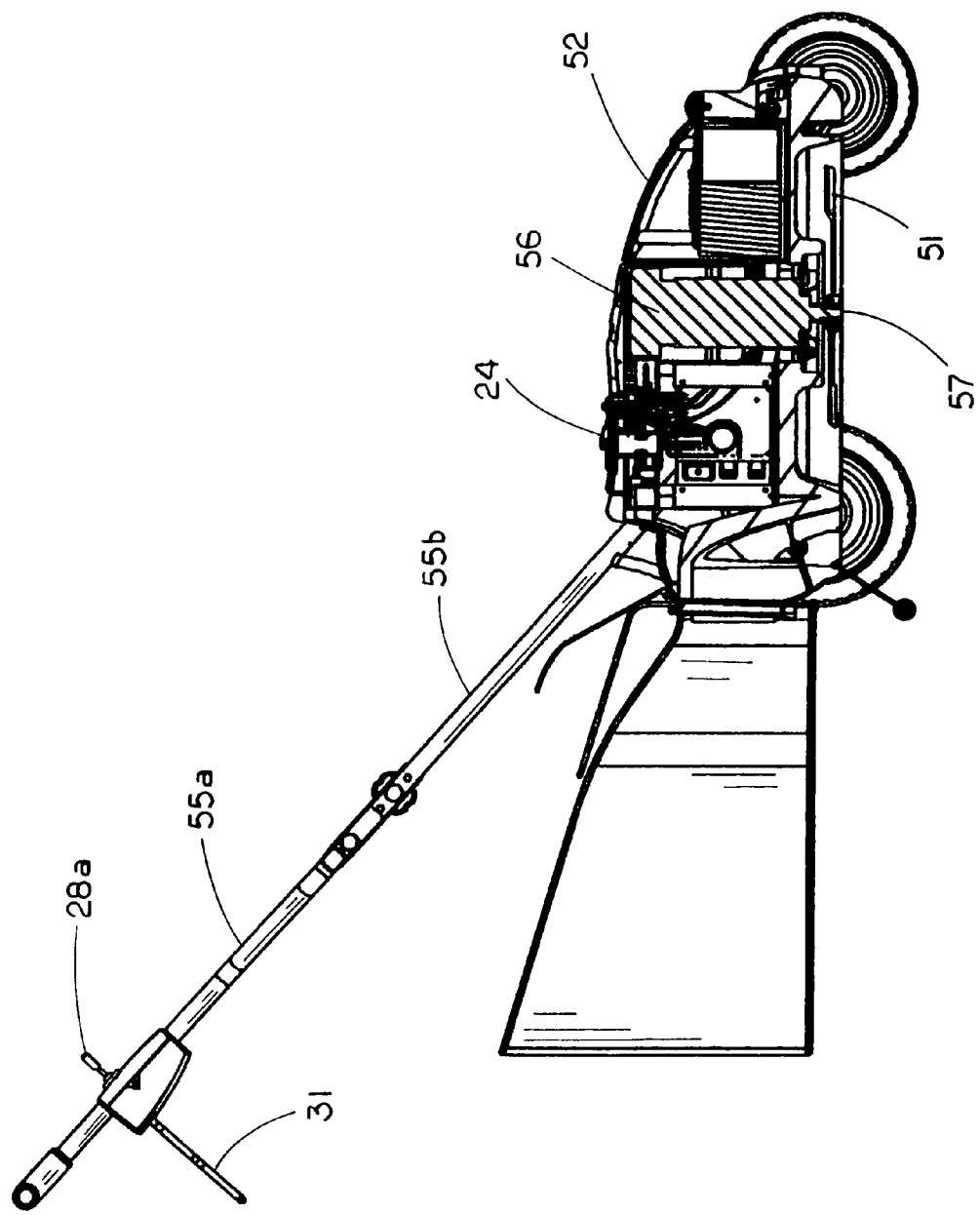
FIG. 9 is a partial cross-sectional side elevation view of the hybrid mower illustrated in FIG. 1.

The hybrid mower 10 of the present embodiment is designed to be operated on either AC line voltage from an AC power source (such as a wall plug or other AC source), or from a DC battery assembly (pack) 52 which is mounted on the deck 50 or in close conductive and operative relationship with the DC motor 56 depicted. The hybrid mower 10 of the present embodiment is designed such that the operator may operatively select functionality of the hybrid mower 10 and the motor 56 by either AC or DC power. When the mower 10 is connected to an AC power source, as depicted in FIG. 8, an AC cord 22 is electrically connected to an AC receptacle 23 positioned on the mower 10. The AC cord may be directly plugged into AC line voltage which is typically 60 Hz 120 Volts. A battery pack 52 located on the deck 50 may provide DC power to the motor 56. The battery pack 52 may be rechargeable.

Figure 37:
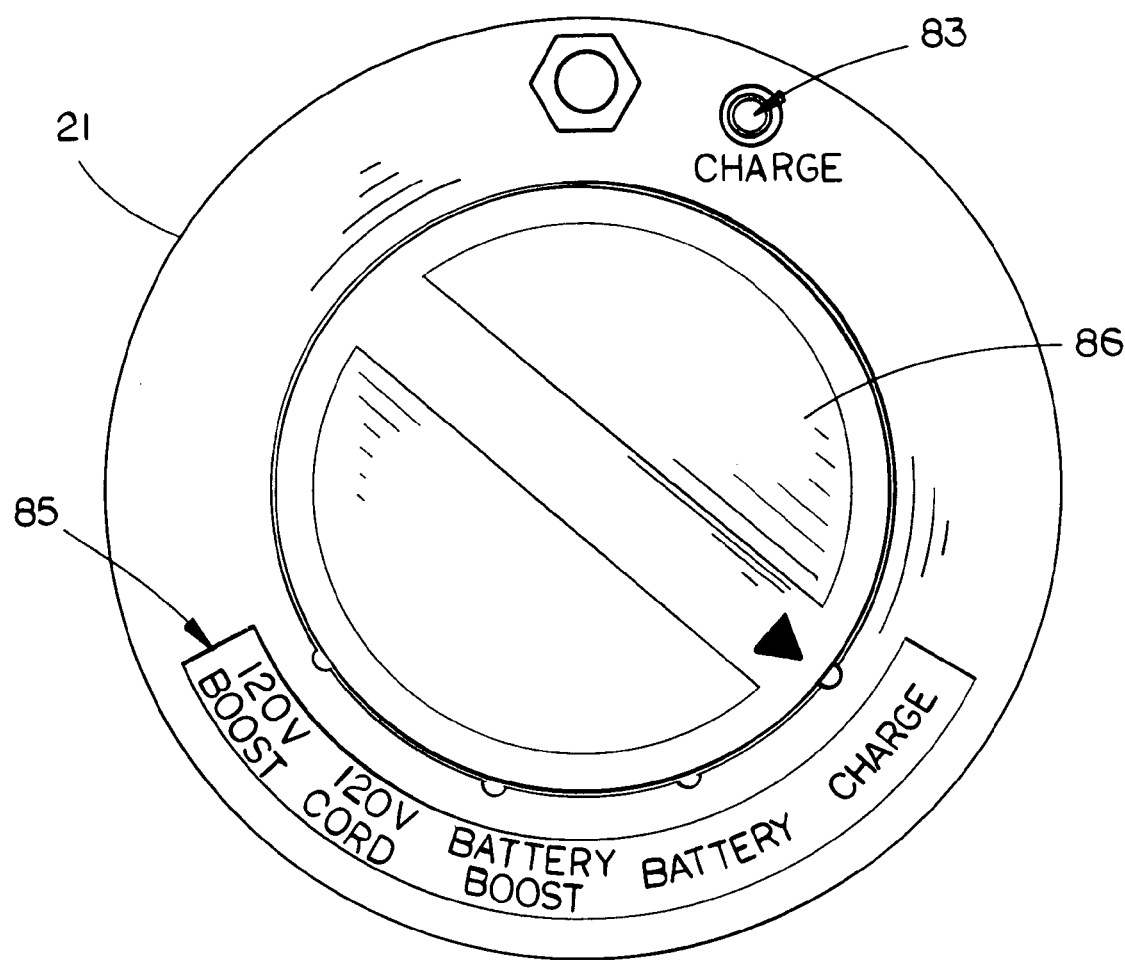
FIG. 37 is a top plan view of a power selection switch.

Positioned on the mower 10 is also a power selection switch 21, as depicted in FIG. 37. In one specific embodiment, the power selection switch 21 includes a battery charge indicator 83, a plurality of power source selections 85, and a knob 86 for selecting a specific power mode. In the present embodiment, the power source selections 85 include a charge mode, a battery mode, a battery boost mode, a 120V cord mode and a 120V boost mode. The battery mode and the 120V cord mode are conserve modes, while the battery boost mode and the 120V boost mode are boost modes. The boost modes provide the functionality of increasing the voltage provided to the DC motor 56 thereby increasing the rotational speed of the blade 51 compared to conserve modes. When a boost mode is selected, a boost conserve switch in the controller is turned on. Conversely, when a conserve mode is selected, the boost conserve switch in the controller is turned off. Selecting boost or conserve mode may increase or decrease the voltage and thereby increase or decrease the actual drain on the battery pack 52 or other power supply due to the increased current provided to the DC motor 56. It is understood that the power selection switch may have different configuration. For example a plurality of buttons may be utilized in place of a knob. Further, a different set of power source selections may be provided.

In a present embodiment, the hybrid control system of the hybrid mower 10 allows for the hybrid mower 10 to be powered from regular household AC line voltage or from a DC voltage battery pack. The battery pack may be designed to have a lower available operating voltage than the average peak voltage of household current. This arrangement may be provided in order to allow the mower to run in a possible conservation mode in order to preserve battery run time under less demanding grass conditions. Alternatively, when the mower is plugged in to AC household current or line voltage or when additional voltage is tapped from the battery pack or from a battery associated with the battery pack, the hybrid mower 10 of the present embodiment may selectively be operated in a boost or power mode, the boost mode allowing for mulching of taller grass or pick up of various debris, such as pine cones, during operation.

Figure 10:
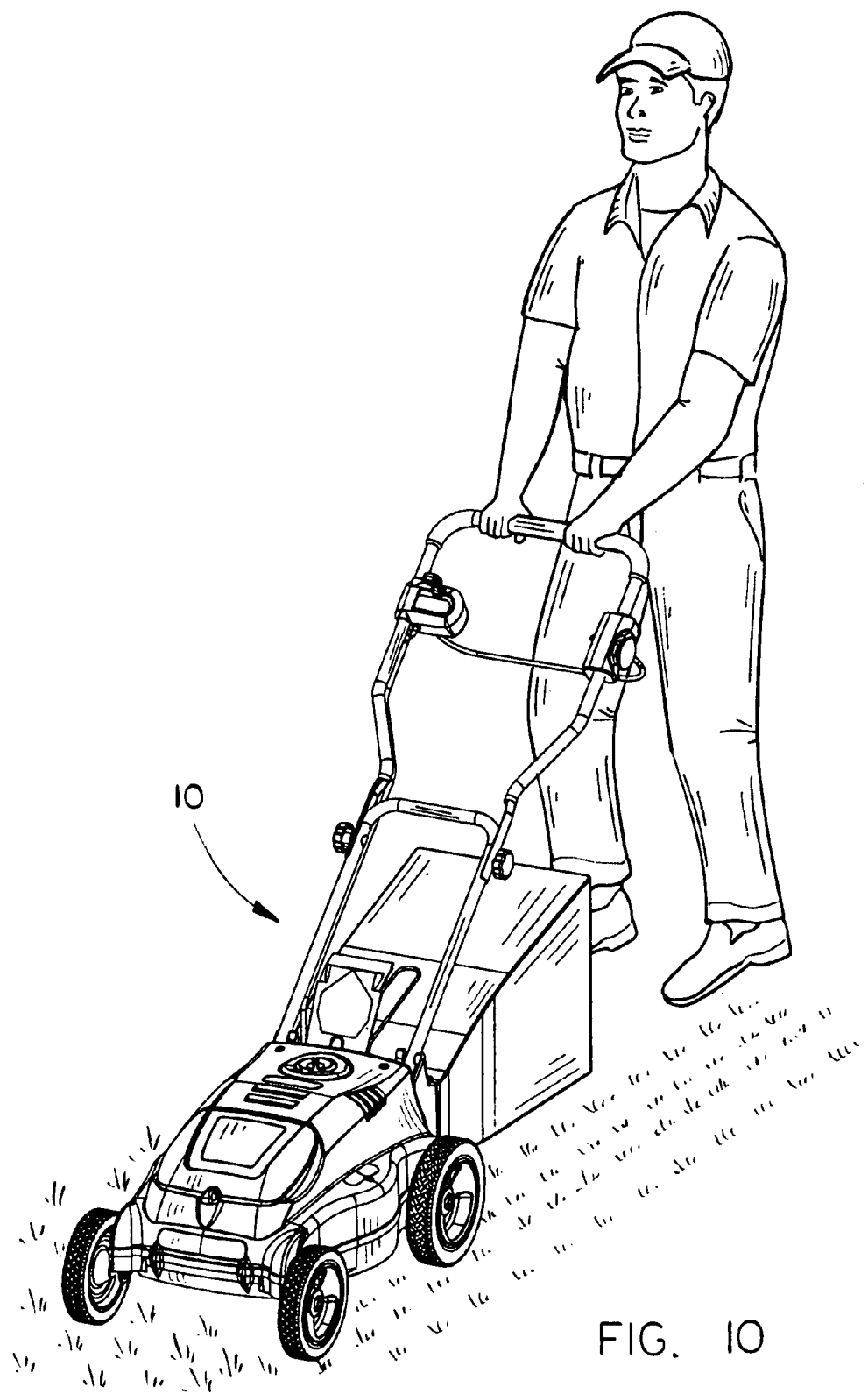
FIG. 10 is an isometric view of the hybrid mower illustrated in FIG. 1, wherein the hybrid mower is operated via a battery.

Thus, for an example, when the hybrid mower 10 with power boost conserve feature of the present embodiment is in operation/being used for cutting relatively shorter grasses as shown in FIG. 10, since such task requires less power, the battery mode (a conserve mode) may be selected by the power selection switch 21. The battery pack 52 may be brought in electrical conductivity with the DC motor 56 and the conserve setting may reduce the rotational speed of the blade 51 thereby decreasing the rate of drain of the battery pack 52 and also increasing the run and operation time of the hybrid mower 10 per charge. However, should there be a need to increase the rotational speed of the blade 51, the battery boost mode may be selected to increase the voltage being supplied to the motor 56. It will be appreciated that the battery boost mode may supply added voltage to the motor from a secondary battery, and/or from any other auxiliary power source included with and/or connected to the hybrid mower 10 as needed.

Figure 11:
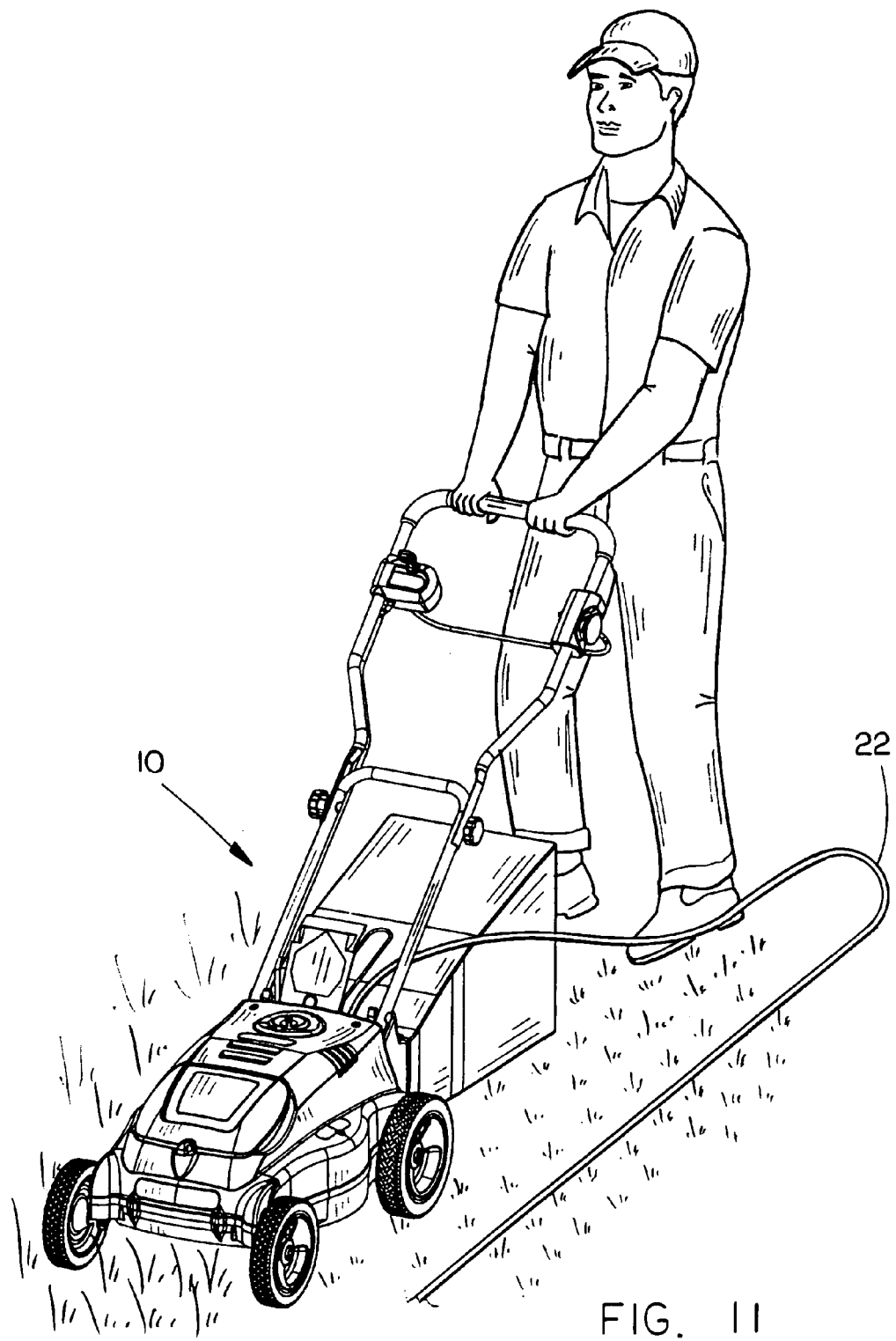
FIG. 11 is an isometric view of the hybrid mower illustrated in FIG. 1, wherein the hybrid mower is operated via AC current.
Figure 13:
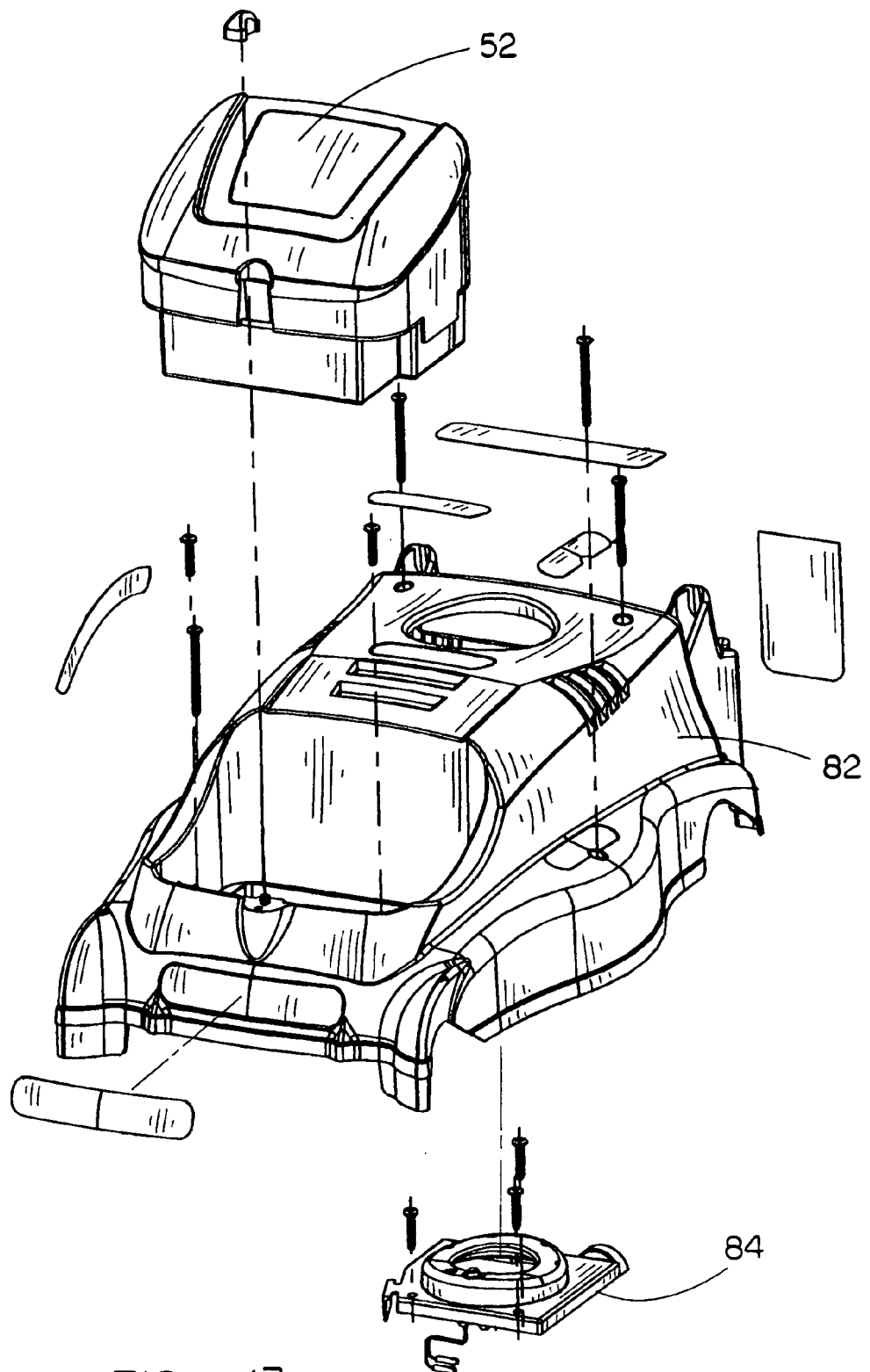
FIG. 13 is an exploded isometric view illustrating a removable battery and a housing cover for the hybrid mower illustrated in FIG. 1.
Figure 14:
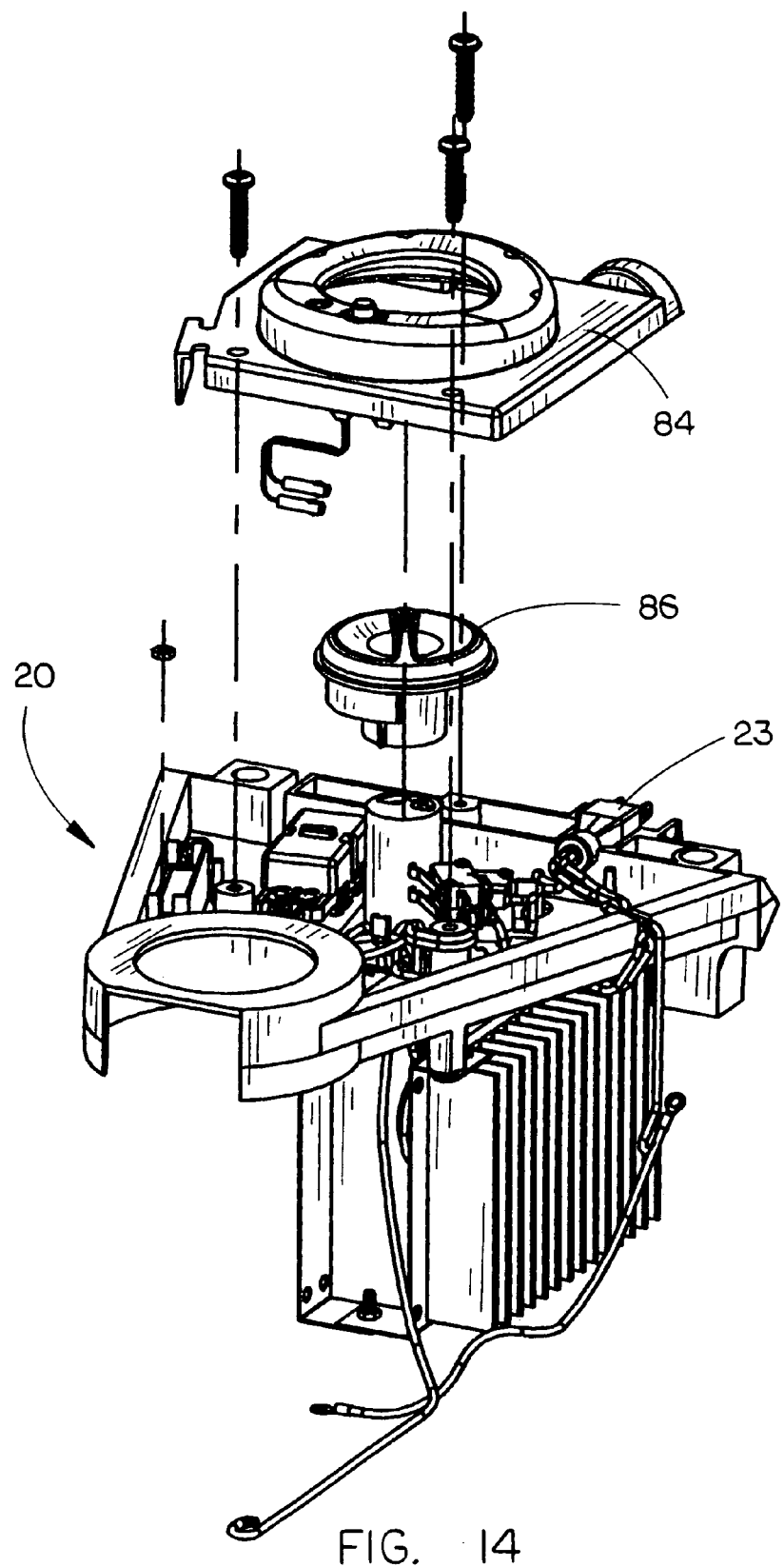
FIG. 14 is an exploded isometric view illustrating a control unit for the hybrid mower illustrated in FIG. 1.

Alternatively, the hybrid mower 10 with power boost conserve feature of the present embodiment may be in operation while connected to an AC power source, as shown in FIG. 11. Thus, for cutting relatively taller grasses (as shown in FIG. 11), which requires more power, the 120V boost mode may be selected by the power selection switch 21. It will be appreciated that the 120V boost mode may supply added voltage to the motor from the battery pack 52, from a secondary battery, and/or from any other auxiliary power source included with and/or connected to the hybrid mower 10 as needed. However, should there be a need to decrease the rotational speed of the blade 51 (for example when operating over an area where the grasses are generally shorter), the 120V mode (a conserve mode) may be selected to decrease the voltage being supplied to the motor 56 to conserve energy. Thus, the boost and conserve feature as shown and depicted in the examples may be integrated with either power selection of the AC power input line or DC power input line to the DC motor 56. Further descriptions and implementations of such examples will be described hereinafter.

Figure 42:
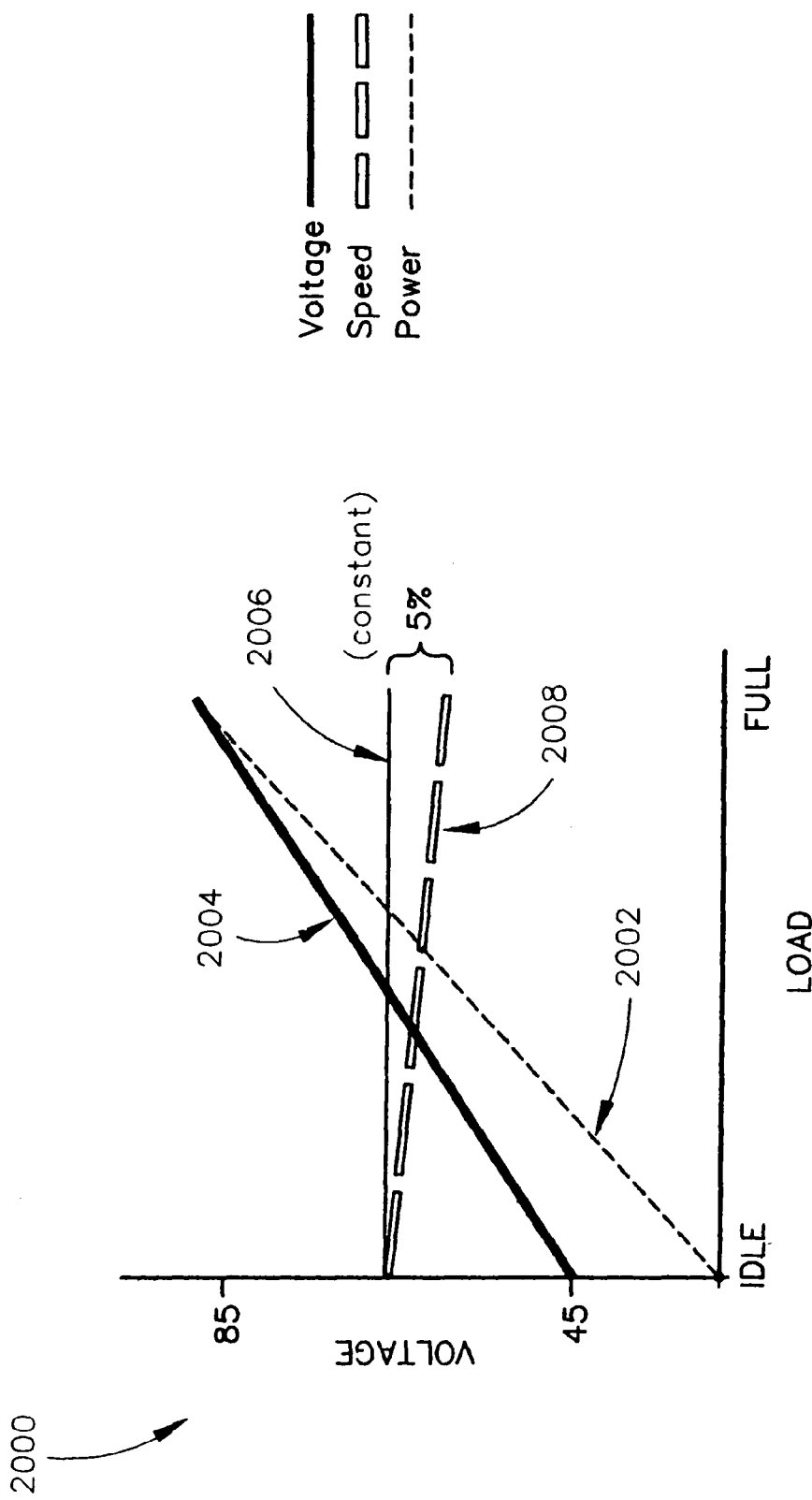
FIG. 42 is graphical depiction which depicts a relationship between mower load, voltage level, power consumption and blade speed in accordance with an exemplary embodiment of the present invention.

In exemplary embodiments, the controller may include a speed sensor for sensing a speed of the mower blade and adjusting the voltage supplied to the motor to maintain the speed of the blade of a substantially constant level. A relationship 2000 between mower load, voltage level 2004, power consumption 2002 and blade speed 2008 for a specific embodiment is depicted in FIG. 42. As the load of the mower increases (from IDLE towards FULL), the voltage level 2004 (hence the power consumption 2002) also increases in order to maintain the blade speed 2008 of the substantially constant level 2006 (for example within 5% in this specific embodiment).

Figure 22:
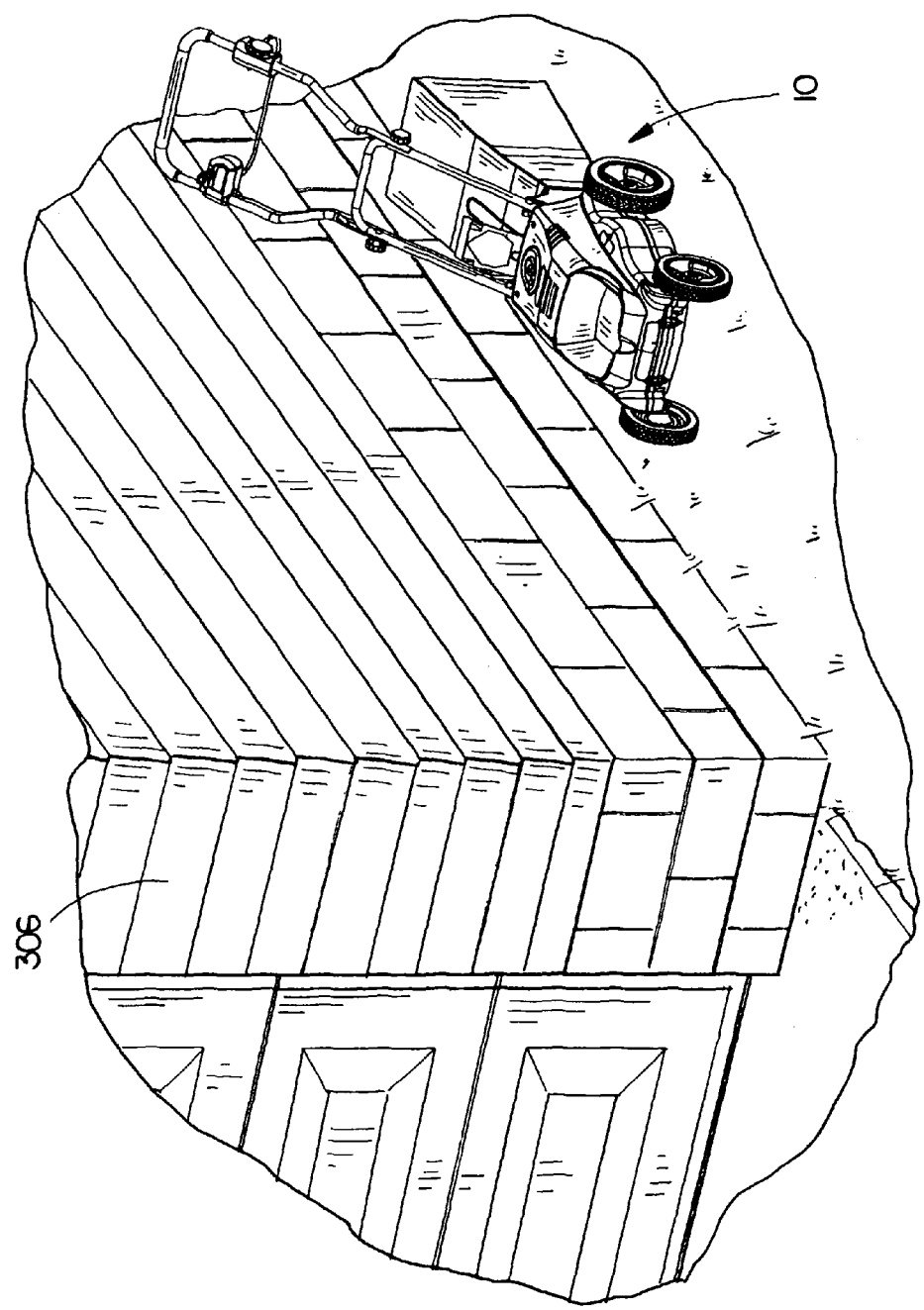
FIG. 22 is an isometric view of the hybrid mower illustrated in FIG. 1.
Figure 36A:
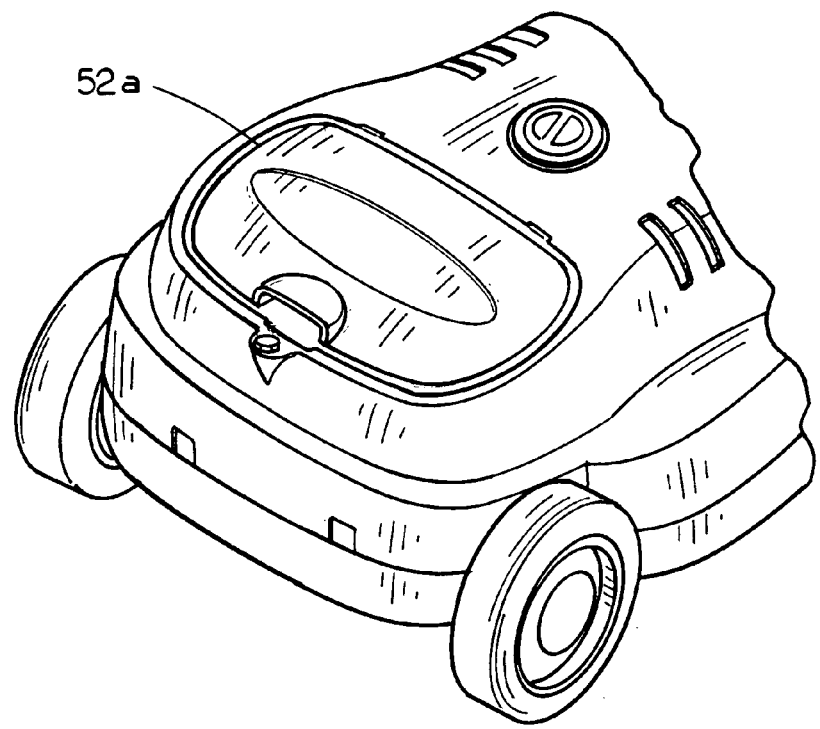
FIG. 36A is a partial isometric view illustrating a hybrid mower, wherein a battery compartment is in a closed configuration.
Figure 36B:
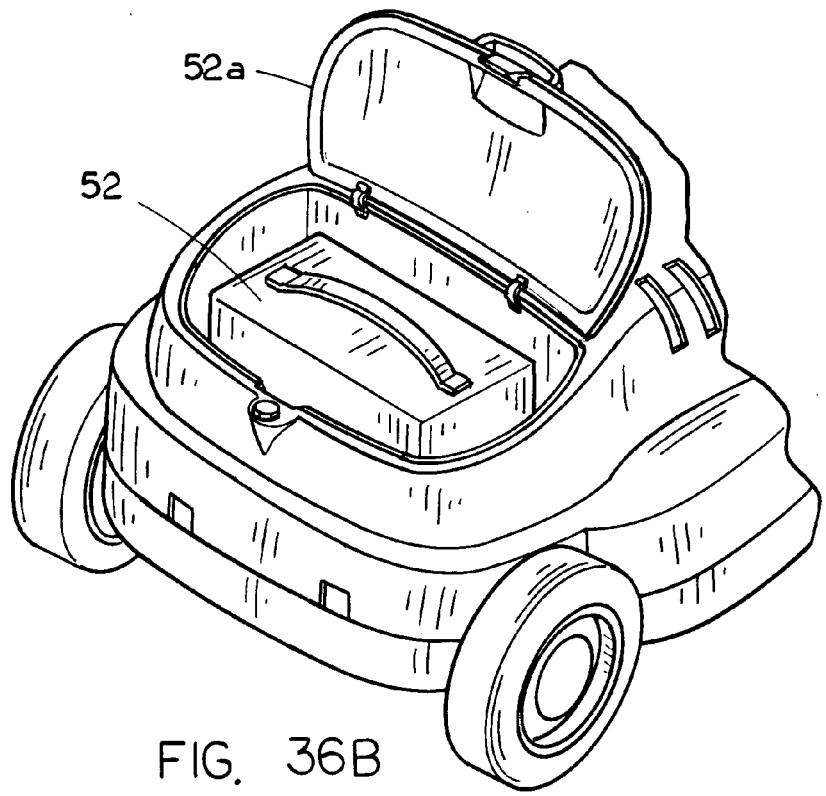
FIG. 36B is a partial isometric view of the hybrid mower illustrated in FIG. 36A, wherein the battery compartment is in an open configuration.

It may also be desirable in one of the present inventive embodiments, to provide a battery pack 52 which is easily removable from the lawnmower deck 50. The hybrid mower 10 of the present embodiment may be used without the battery pack so as to be more easily maneuverable in sloped areas due to the reduced weight of not having the battery pack 52 installed. In one specific embodiment, the total weight of the mower 10 with the battery assembly is between approximately 60 lbs to approximately 70 lbs, while the battery assembly weighs approximately 20 lbs. Therefore, removing the battery assembly may reduce a considerable amount of the weight. Additionally, the mower 10 of the present invention may make it easier to stow/store the mower and charge the battery pack 52 separately or alternatively, may promote ease of charging the battery when the mower 10 is still in operation (i.e., when AC power is available). It may also be desirable that a battery cover 52a, as shown in FIG. 36A at a closed position and in FIG. 36B at an open position, be provided to cover the location of the battery pack 52. In addition, as illustrated in FIG. 22, the mower 10 with the battery pack removed may be stored outside the garage 306, hence saving space that would otherwise be used to store a mower.

Figure 38:
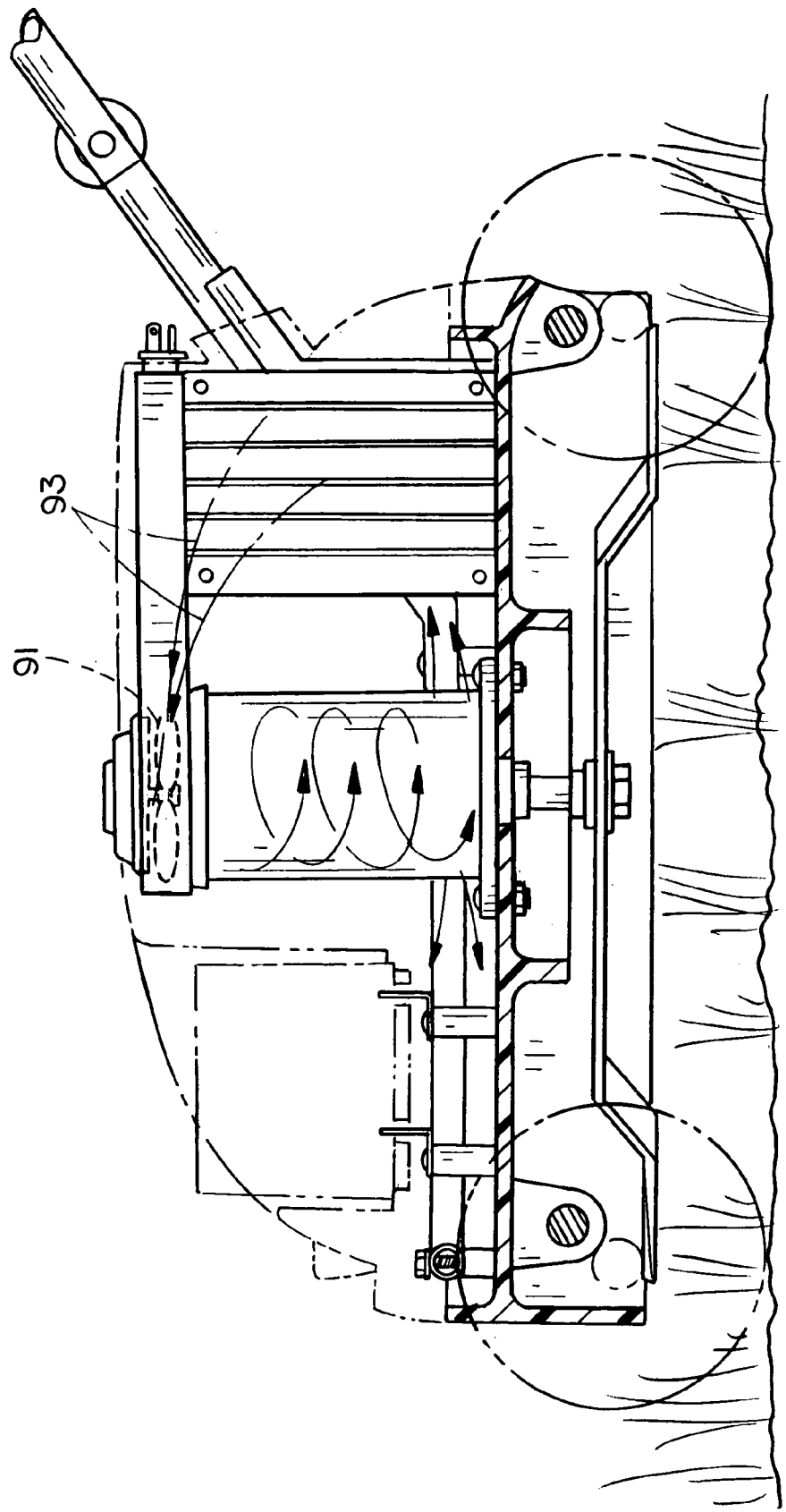
FIG. 38 is a partial cross-sectional side elevation view of a hybrid mower, wherein an airflow path is illustrated.
Figure 39:
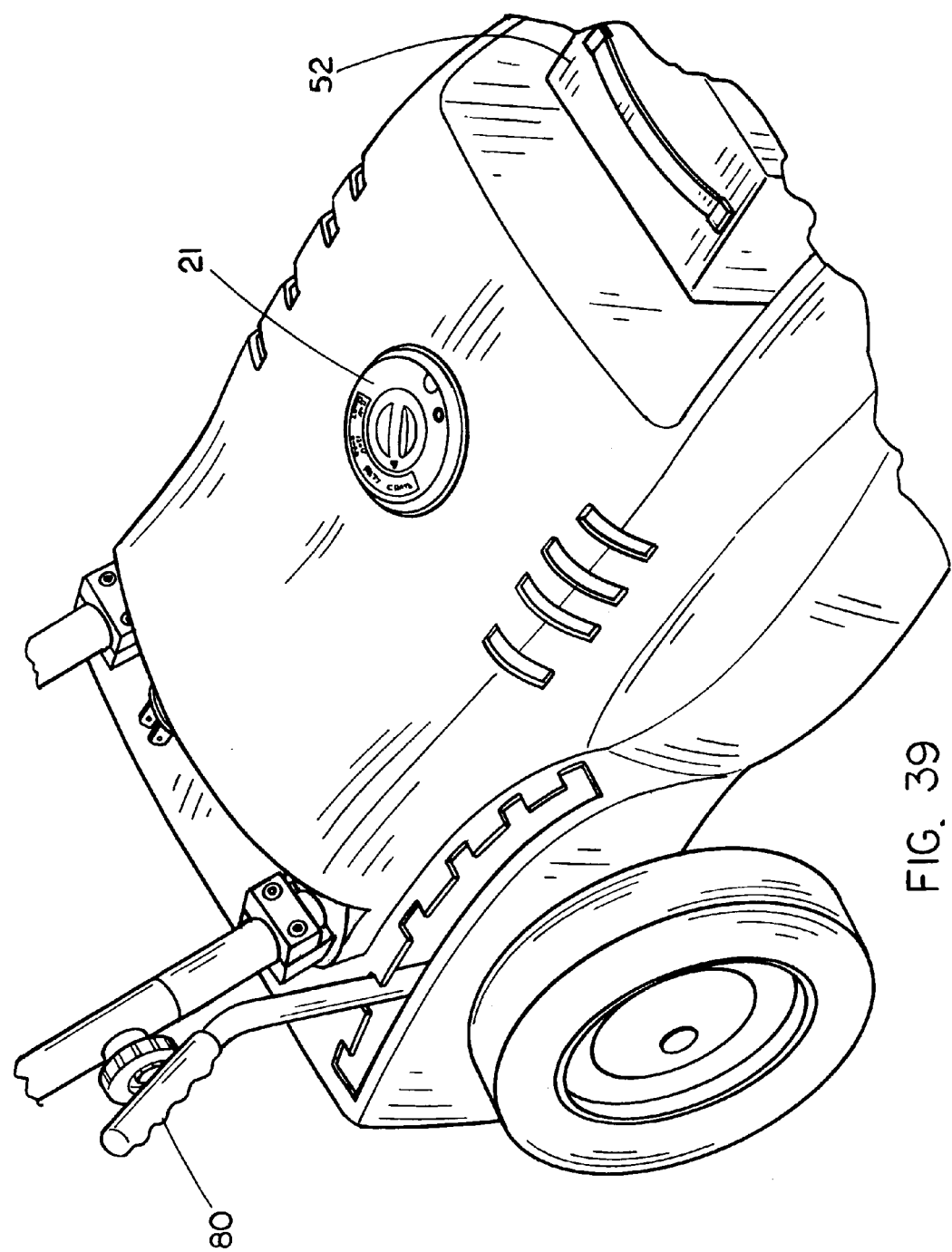
FIG. 39 is a partial isometric view of a hybrid mower illustrating a lever for a height adjustment assembly.

The DC motor 56 may be a permanent magnet type DC motor and may be designed to receive power from the battery and/or from the hybrid power controller which will be described herein. The DC motor 56 may be provided to power the rotating blade 51 while cutting vegetation and the motor 56 may act as a generator in order to provide resistive breaking after deactivation of the interlock handle switch described thereby providing a resistive load to stop the blade quickly once the blade interlock handle 31 is released. It is contemplated, as shown in FIG. 38, that the motor 56 may be designed to further include a fan 91 to promote cooling of the DC motor 56, thereby providing air circulation vent paths 93 across the brushes and through the motor. For example, in a specific embodiment, the motor promotes airflow up (relative to the ground upon which the mower is supported) and across the heat sink. Then, the airflow proceeds down through the motor (i.e., within the motor housing). Alternative embodiments with multiple motors or with multiple commutators selectively operating in series or in parallel may also be provided.

As previously described, the blade 51 may be provided in order to mulch or cut vegetation. Typical blade tip speeds may be between approximately 16,000 to 19,000 ft. per minute during non-cutting and between approximately 12,000 to 18,000 ft. per minute during cutting of vegetation with a proportionate horsepower rating for the DC motor of about 1.5. Higher speeds may be indicated/attained when operating from AC line voltage while lower speeds may be recognized/attained when operating off of Battery DC voltage. Alternatively, in a low power or conservation mode, the run time may be considerably longer with battery life expected to be increased by 50% and with the speed of the DC motor 56 correspondingly decreasing to drive the blade 51 at approximately 14,000 ft. per minute blade speed as measured at the tip of the blade. The various speeds of the blade 51 can correspond to a plurality of voltage outputs from the hybrid power supply as seen/detected/received by the DC motor 56. Namely, to provide higher speed functionality of the blade, a voltage of 66V or 72V DC may be presented to the DC motor with a 300 watt/hr batter charge capacity. Alternatively, in conservation or low speed mode, which may thereby correspond to higher battery pack run time duration or less current draw from the power supply, the power consumption may be significantly reduced by providing 60V or less to the DC motor 56. These various power consumption modes may be provided through the use of the boost and conserve switch which, as can be seen from the examples depicted herein, may be a single pole double throw switch as shown in order to increase the voltage through the various techniques/hardware depicted and described in the multiple examples hereof.

Thus, when the mower 10 is in conservative mode, the corresponding blade speed may be less than 15,000 ft. per minute blade tip measurement and preferably at 14,000 ft. per minute blade tip measurement or less thereby significantly increasing the battery pack charge run time when the battery pack is in operation and the power selection switch 21 is selected/positioned in the battery mode. In such an instance, the 60 volts may be provided to the DC motor by the battery pack 52, which may include a series of five batteries connected in series, each of the batteries providing 12 volts. Alternatively, should the power selection switch 21 be set to the battery boost mode, an additional or secondary battery which may be integrated with or separated from the battery pack 52, may be brought in series with the battery pack 52 power supply thereby increasing the voltage to 66 or 72 volts, depending on desirability and the blade speed at which the mower 10 is to be operated.

Figure 23:
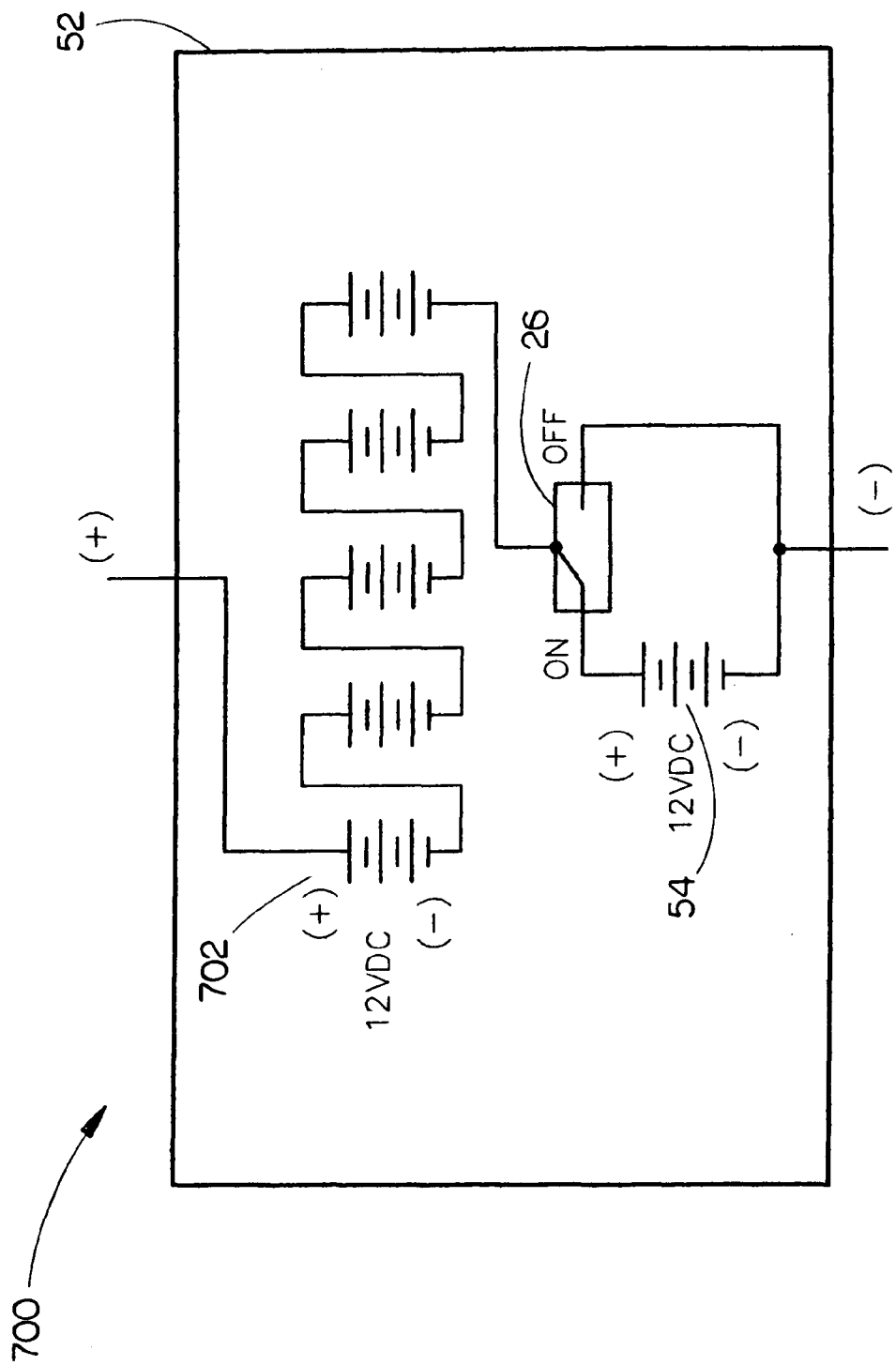
FIG. 23 is a circuit diagram of one option of a battery assembly for use with the hybrid mower illustrated in FIG. 1.

The battery assembly may include a stack of DC batteries connected in series. In one specific embodiment, as shown in FIG. 23, the battery assembly 700 includes a stack of five lead acid five amp-hour 12V DC batteries 702. In this configuration the voltage of the battery assembly may be around 60V. It will be appreciated that when fully charged, the voltage of the battery assembly 700 may be approximately 66V and, during battery discharge, may be reduced to approximately 50V. Further, it will be appreciated that as the battery discharges, the speed of the mower blade may be reduced proportionally. For this reason, it is contemplated that the speed of the mower blade may be set based on the fully-charged voltage of the battery assembly and/or the battery assembly and one or more other power sources, as utilized in a power boosting configuration.

In a further embodiment, the battery assembly 700 may be connected in series with an auxiliary battery 54 in a power boosting configuration, through the control of the boost conserve switch 26. The auxiliary battery 54 may be a five amp-hour 12V DC battery. In this configuration, when in the power boosting mode (boost conserve switch 26 is set to ON), the voltage of the battery assembly and the auxiliary battery together may be around 72V. It is understood that variations may be provided in the configuration and implementation while running in DC mode for the battery pack depicted herein as this example is provided merely for descriptive purposes only and many other embodiments including bringing batteries in parallel, series, or providing additional power sources may be utilized.

While the example of the conserve and boost switch has been provided for operation in DC mode, alternative embodiments which may provide an increase in motor speed while running in AC mode will also be described herein. Such embodiments may include increasing the step down voltage from the power supply controller as presented to the DC motor or alternatively bringing in series the secondary battery while also operating in AC mode thereby increasing the DC voltage presented to the motor and resulting in an increase in rotational speed of the blade. Thus alternative embodiments are shown and depicted wherein the power supply of the present embodiment generates DC power to the motor and wherein the boost or increased voltage may be derived from either the power supply by various techniques, such as depicted, or by providing additional voltage from the battery pack or secondary battery, either of which may result in increased operational speed of the motor and blade speed.

One other aspect of the present embodiment of the hybrid mower 10 of the present embodiment is the ability to provide a user selectable power supply to a DC motor driving the blade 51. In the hybrid mower 10 of the present embodiment, a DC motor 56 is provided to rotate blade 51 on the mower deck 50 due to its energy use and supply characteristics. A user selectable alternative power supply or power selection switch 21 is provided in order that the DC motor 56 may be user switchable from power sources, namely from an AC 120 volt 60 Hz power input representing line voltage should an extension cord or line voltage be readily accessible, or alternatively, to a battery pack DC voltage provided on board of the mower, both power supplies selectable by the operator and both power supplies driving the same motor mounted on the lawnmower housing or deck 50. Such an option may be highly desirable and unique in that the user may selectively operate the mower from various user selectable inputs representing alternative power inputs, a first power input being provided at the power selection switch 21 representing a power input line from a battery pack 52, with a second power input being provided at the power selection switch 21 representing the AC line 22.

Further, as an alternative design element, an automatic mode may be available for the power selection switch 21. Under the automatic mode, the power control circuit 60 could include a solid state relay which, as an example, has a zero crossing circuit for voltage detection to activate a triac or other relay device to automatically connect the electric motors to line voltage, when plugged into the power control circuit. Such user selectable power selection can thus be automated by an automated voltage or other detection circuit or may be actuated by the switch 21 herein described. It is appreciated that the automatic selection may be overwritten by the user selection by setting the power selection switch 21 to an alternative power source selection. In exemplary embodiments, a switch/relay/solid-state switching device may be utilized to accomplish power supply selection.

Figure 43:
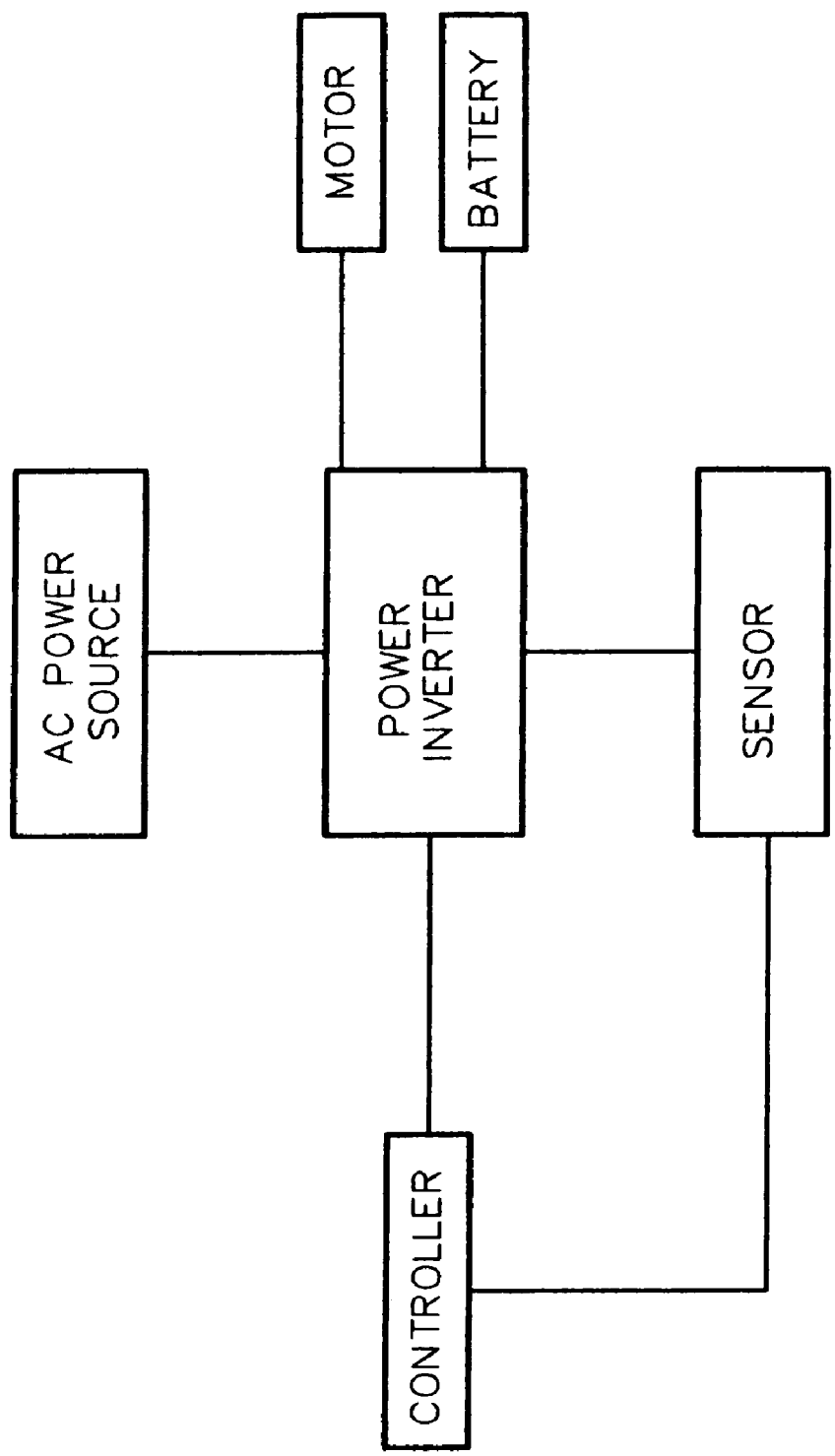
FIG. 43 is a block diagram of a battery charging mechanism for use with the electric lawnmower of the present invention.

The controller may employ a set of algorithms to control the battery assembly charge logic/mechanism. For example, as illustrated in FIG. 43, when the mower is connected to an AC power source, the algorithm employed by the controller may examine the charge level of the battery assembly utilizing one or more sensors (e.g., a voltage sensor and/or a current sensor), and determine if recharging of the battery assembly is necessary. In one embodiment, a PIC algorithm may be programmed on an ASIC programmable controller chip (controller) and utilized to control the charge logic. It is contemplated that the algorithm may further contain logic to achieve a rapid charging during a charging process. In a specific embodiment, a PIC algorithm/PIC controller may be utilized to configure the charging mechanism as a switch mode charger.

Figure 44:
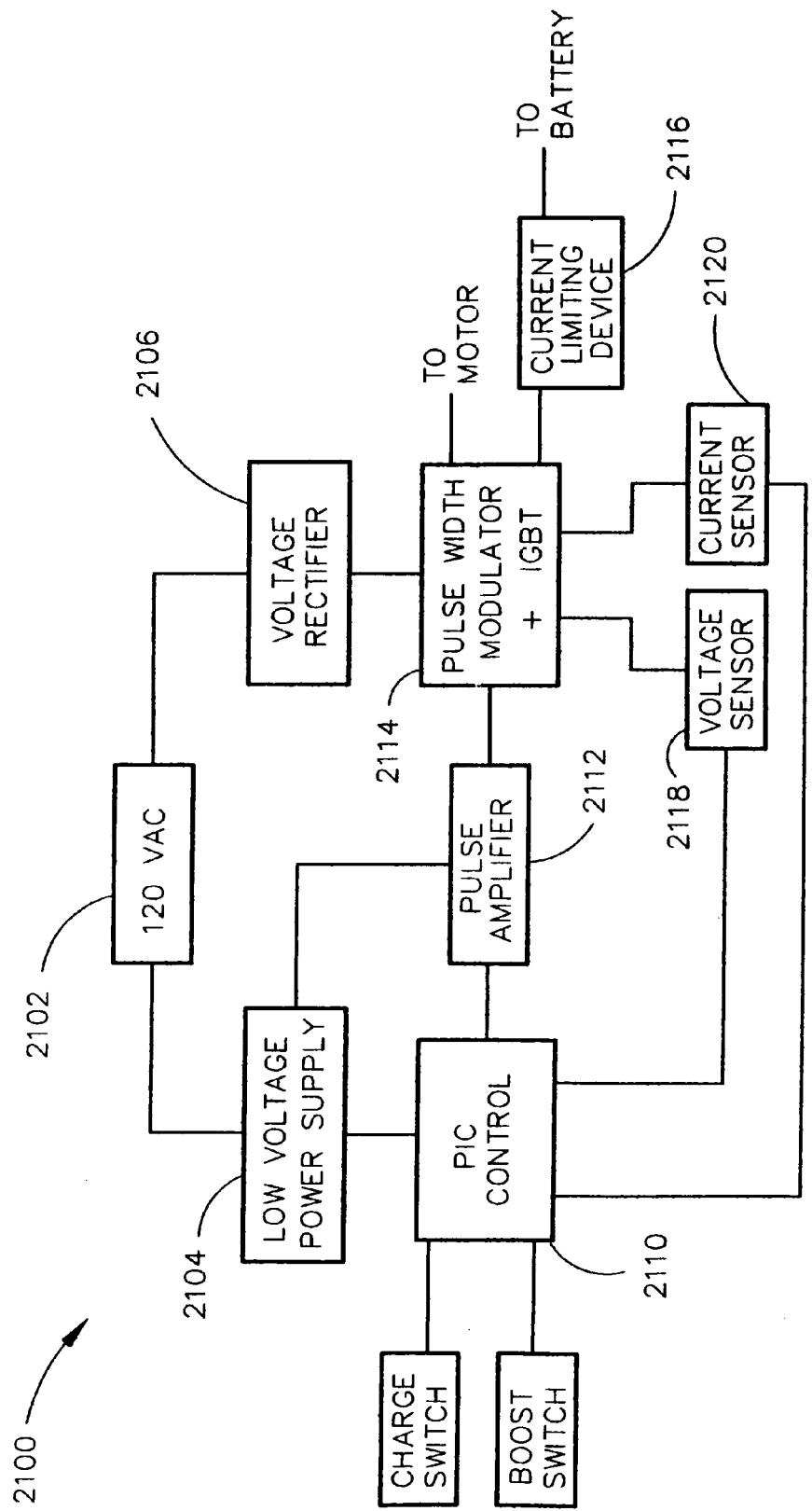
FIG. 44 is another block diagram of a battery charging mechanism for use with the electric lawnmower of the present invention.

Referring now to FIG. 44, there is shown a block diagram of an exemplary battery charging mechanism 2100 for use with the hybrid mower 10. In one specific embodiment, a PIC algorithm (PIC controller) 2110 embedded in the hybrid mower controller is utilized to configure the charging mechanism 2100 as a switch mode charger. An AC power source 2102 provides current to a low voltage power supply 2104 and a voltage rectifier 2106. The low voltage power supply 2104 supplies rectified low voltage DC (e.g. 5 VDC) to power the PIC control 2110 and a pulse amplifier 2112. The voltage rectifier 2106 supplies rectified DC voltage to a pulse width modular (PWM) 2114. The PWM 2114 is capable of providing current to the motor and/or the battery of the hybrid mower 10. The current provided to the motor and/or the battery by the PWM 2114 is controlled by the pulse amplifier 2112, which is controlled by the PIC controller 2110. A modifiable duty cycle controlled by the PIC controller 2110 is utilized to provide appropriate average voltages per cell to achieve a rapid charging.

The PIC controller 2110 utilizes a voltage sensor 2118 and a current sensor 2120 to sense voltage and current levels, respectively. A current limiting device 2116 (e.g. a resistor or a transformer) is utilized to limit the voltage level from the PWM 2114 to the battery to appropriate levels. In one specific embodiment, a 0.01 ohm current sense resistor (current limiting device) 2116 is used to infer the state of charge of the battery by sensing the current flowing through the battery. During each "on time" (e.g., where "on time" represents a time period during which a charge is applied to the battery) of a cycle, multiple current samples are taken by the current sensor 2120. A fixed number of the most recent current samples (e.g. the most recent 20 samples) are analyzed to determine an average current level for this cycle. The average current level is monitored to determine the time elapsed between transitions from one current level to the next.

In one specific embodiment, during rapid charging process, current flow from the PWM 2114 to the battery is turned on by the PIC control 2110 for two (2) seconds, and then turned off for seven (7) seconds. This duty cycle configuration provides approximately 2.5 Volts per cell on average. When current samples taken by the PIC controller 2110 indicates that the speed of transitions has increased, correlating to a battery that is more than 80% charged, the PIC controller 2110 modifies the duty cycle of the charging cycle by changing the duration and period of the charging pulse waveform, effectively lowering the average voltage to the battery to approximately 2.25 Volts per cell, which is appropriate for the float charge cycle of the battery, and prevents overcharging.

It is contemplated that the PIC controller 2110 may comprise additional logic controls for the battery charging mechanism. For example, in one specific embodiment, a timer logic is utilized to specify a predetermined maximum charge time. Once the predetermined maximum charge time (e.g. 12.5 hours) have passed without meeting the criteria of the regular charge completed algorithm described above, the charging mechanism may be automatically switched to a trickle charge (maintenance) mode instead of active charging mode. In another embodiment, a battery sensing algorithm is employed to detect if the battery is installed incorrectly. In still another embodiment, the controller is capable of sensing line voltage frequency (e.g., 50 or 60 Hz), and adjust charging characteristics accordingly. It is further contemplated that the PIC controller algorithm may be modified to allow for more charge stages than is depicted above, by varying the pulse width and/or duty cycle of the charge signal in response to current or voltage measurements on the battery.

It will be appreciated that the battery charging mechanism 2100 utilizing charging cycles may also provide functionality as a battery desulphator. Such functionality may be particularly desirable for lawnmower batteries, as there may be a season of storage wherein the battery may be stored in a discharged state during which sulphate buildups may occur. It is further contemplated that the charging mechanism may comprise additional components/logics. For example, in a specific embodiment, a charging indicator (e.g., a Light Emitting Diode (LED) or another type of light and/or indicator) is utilized to indicate the state of charge of the battery. In another embodiment, a temperature sensor is utilized to turn off charging if the battery overheats during charging, and/or if the surrounding temperature exceeds a predetermined level.

It is also contemplated that a more precise state-of-charge determination may be possible by comparing current level samples taken within an "on time" of a cycle (comparing early current levels sampled with later current levels sampled within the same on time). Direct battery voltage detection circuitry may be employed to realize a more precise state-of-charge determination. An additional microcontroller may be utilized (e.g., together with the battery) to monitor and record current transfer in and out of the battery and communicate that information back to the PIC controller for more precise state-of-charge determination. It is further contemplated that the PIC controller may be employed to control charging mechanisms for other types of batteries. Further, it will be appreciated that the PIC controller may be configured for different charging voltages and characteristics. It is also contemplated that charging while operating on line (AC) voltage may be supported.

It is further contemplated that the controller may contain a current sensor that senses the electric current going to the motor 56 and examines/references/compares the current level against the blade speed to provide a soft start ramp up. The current sensor may also serve as a current overload protection device, preventing circuit breaker trip should a sudden drop of load occur (moving from a taller grass area to a shorter or no grass area). Further, the current sensor may signal a raise of the voltage to meet an increased power demand, thus maintaining the blade speed at a relatively consistent level.

Referring to FIGS. 12 to 15, there is shown an exploded view of an exemplary embodiment of the mower 10. Enclosed between a housing cover 82 and the deck 50 includes a controller (power control module) 20 mounted on to a generally triangular shaped support plate (control mount). Positioned on top of the controller is the power selection switch knob 86, covered by a control box cover 84. In one specific embodiment, the control mount is formed as an A-frame structure that is independent of the housing cover 82. This configuration may aid in the assembly of the hybrid mower 10. The knob 86 is accessible by a user through an opening on the housing cover 82. Also mounted on to the support plate are additional circuit boards, electrical connectors, an AC receptacle 23, and cooling devices such as a heat sink and/or a fan. Attached to the bottom of the support plate on one end is the top portion of the motor 56, which is electrically connected to the controller 20, and has its bottom portion attached to the deck 50. A shaft 57 is attached to the motor to transfer rotational energy to the blade 51, which is rotatably attached to the bottom of the deck 50, and connected to the shaft 57 through an opening at the bottom of the deck 50. Positioned on the bottom of the deck 50 are a rear axle 302 supporting rear wheels, and a front axle 304 supporting front wheels. The front and rear axles 302 and 304 may comprise self-aligning, snap-in axles (as an assembly aid and labor reducer).

Figure 15:
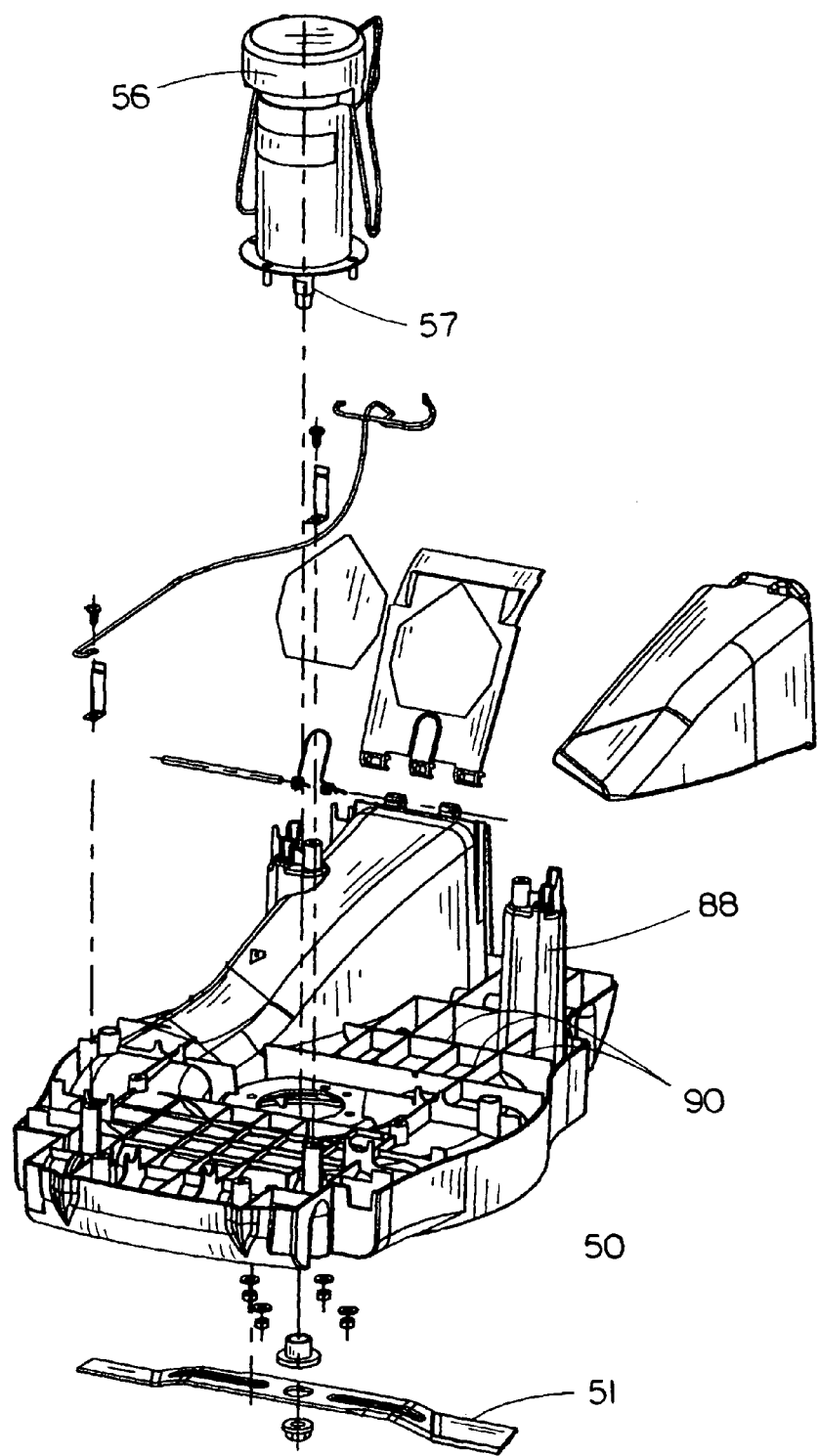
FIG. 15 is an exploded isometric view illustrating a deck assembly for the hybrid mower illustrated in FIG. 1.

As depicted in FIG. 15, the deck 50 is reinforced utilizing reinforcing ribs 90 in combination with a steel reinforcing framework, which may be provided by the lower handle 55*b* or separate tube extending around the periphery of the mower deck and intersecting with the handles and/or other structural components mounted to the mower deck. In one specific embodiment, a steel tube extending around the mower deck is connected to the mower deck utilizing screws or other fasteners as required. In one embodiment, the deck made of plastic with reinforcing framework is able to achieve similar rigidity of a steel deck. It is understood that the deck 50, the reinforcing ribs 90, and the lower handle 55*b* may be made of various materials. For example, in a specific embodiment, the deck and the reinforcing ribs are made of plastic. Alternatively, the reinforcing ribs may be made of steel or other metal materials. Additional suitable materials may include fiberglass and other composite materials.

Also mounted on to the top of the deck 50 is the lower handle 55b. In one specific embodiment, the lower handle 55b includes a generally parallel portion, which is generally parallel to the deck on one end, and an outwardly extended portion on the opposite end. The outwardly extended portion forms an angle with the deck 50. Thus, to securely support the outwardly extended portion of the lower handle 55b, two handle support posts (axle towers) 88 are positioned on either side of the deck 50 above the location of the rear axle 302. This setup allows the outwardly extended portion of the handle to establish a contact point with, and be secured onto, the support post 88. A generally triangular shape formed by the handle, the deck and the post allows the attachment relationship between the lower handle 55b and the deck 50 to be more stable and less vulnerable to breakage and/or flexing. In one specific embodiment, the axle towers 88, together with the motor 56 and the controller 20 mounted on the deck 50, form a box structure which is more stable and provides more protection to the motor 56 and the controller 20.

Figure 21:
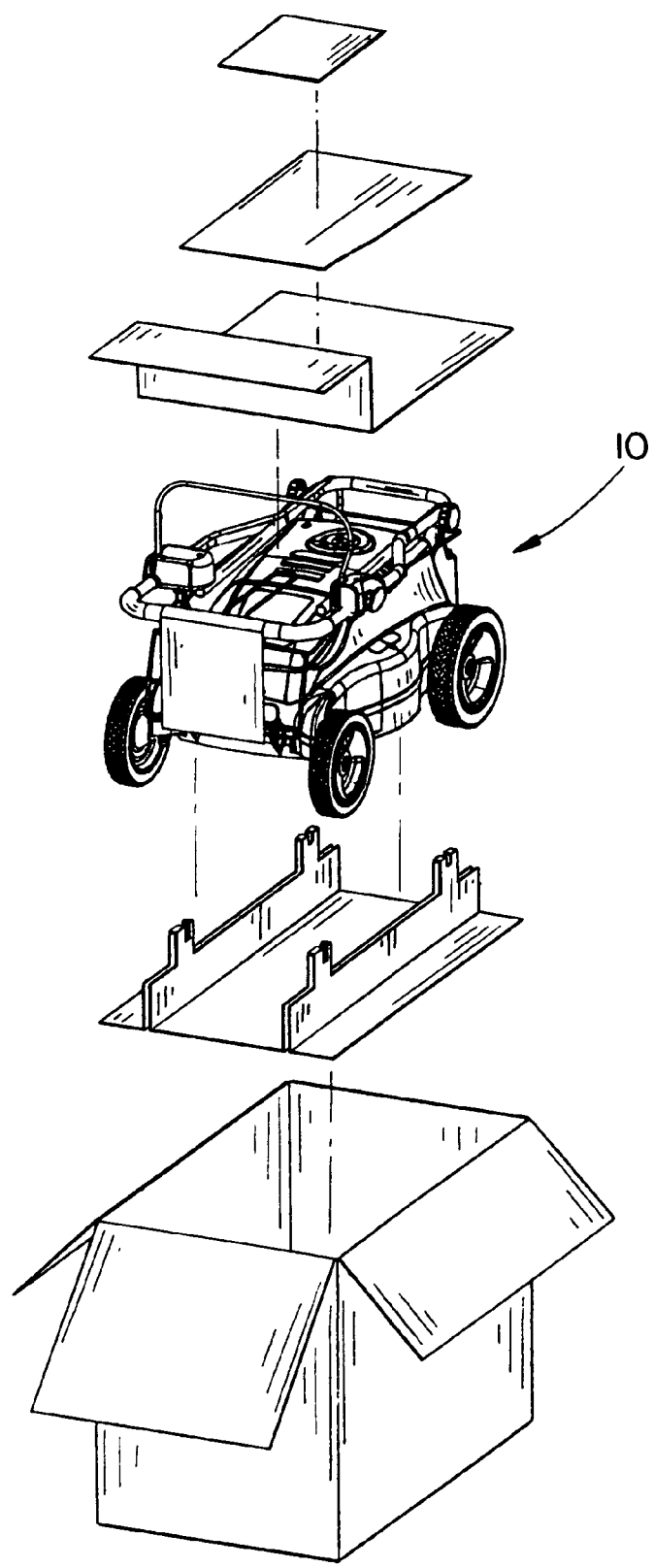
FIG. 21 is an exploded isometric view illustrating the hybrid mower shown in FIG. 20, wherein the hybrid mower is shown in a shipping configuration.

It will be appreciated that strengthening the rigidity of the mower deck may be desirable for providing an added feel of quality for a consumer. It is understood that alternative designs of the handle may be employed without departing from the scope and spirit of the present invention. For example, in one embodiment, the handle may have the lower handle adjustably attached to an upper handle. Thus, the upper handle 55a may be folded down, as illustrated in FIGS. 21 and 22, requiring a smaller storage and/or packaging space. Height adjustment of the handle may also be made available in this setup. Alternatively, the handle may be designed as one-piece having one end attached to the deck 50 and the opposite end to be handled/grasped by the user.

Figure 16:
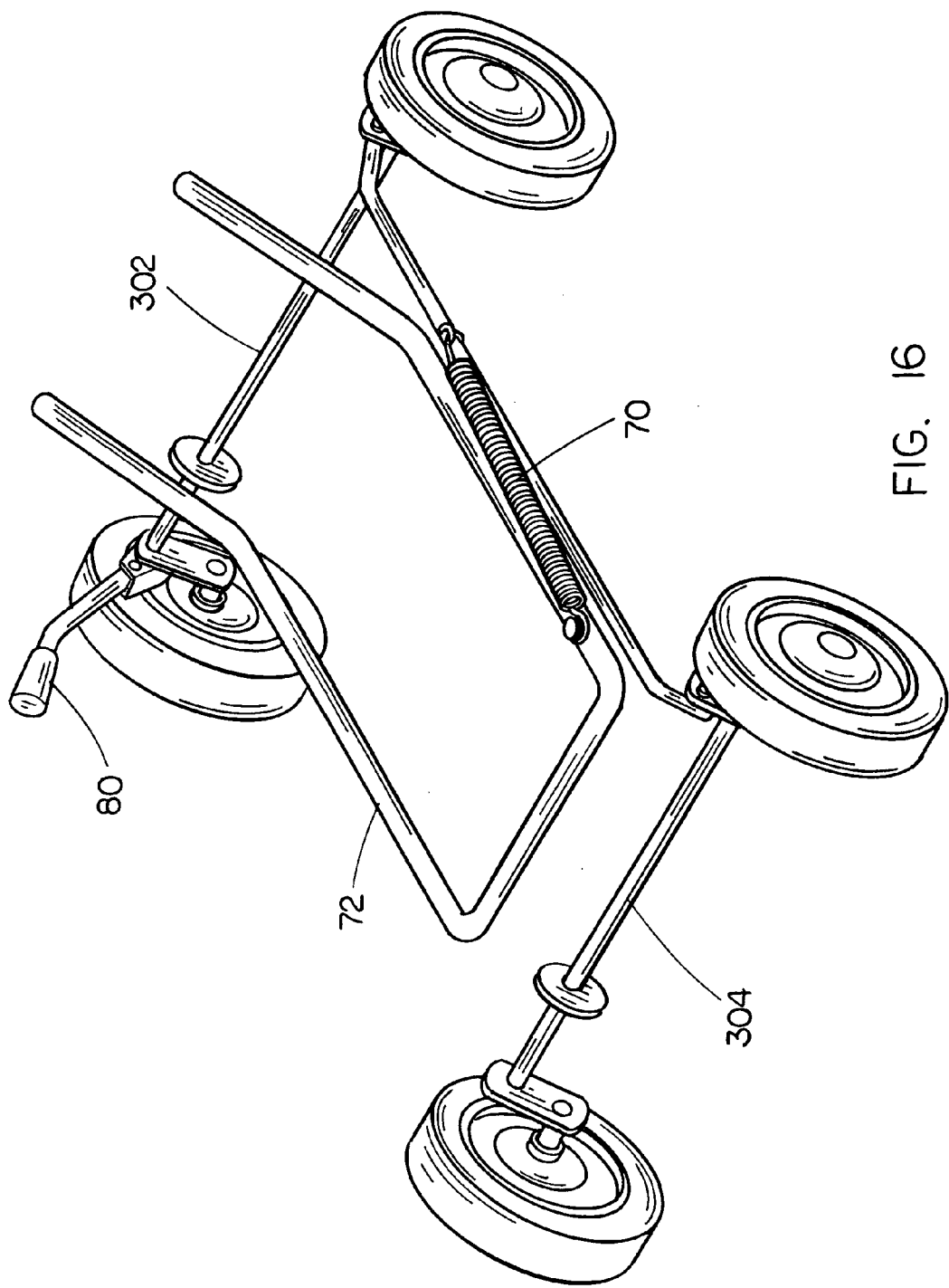
FIG. 16 is an isometric view illustrating a height adjustment assembly for the hybrid mower illustrated in FIG. 1.
Figure 17:
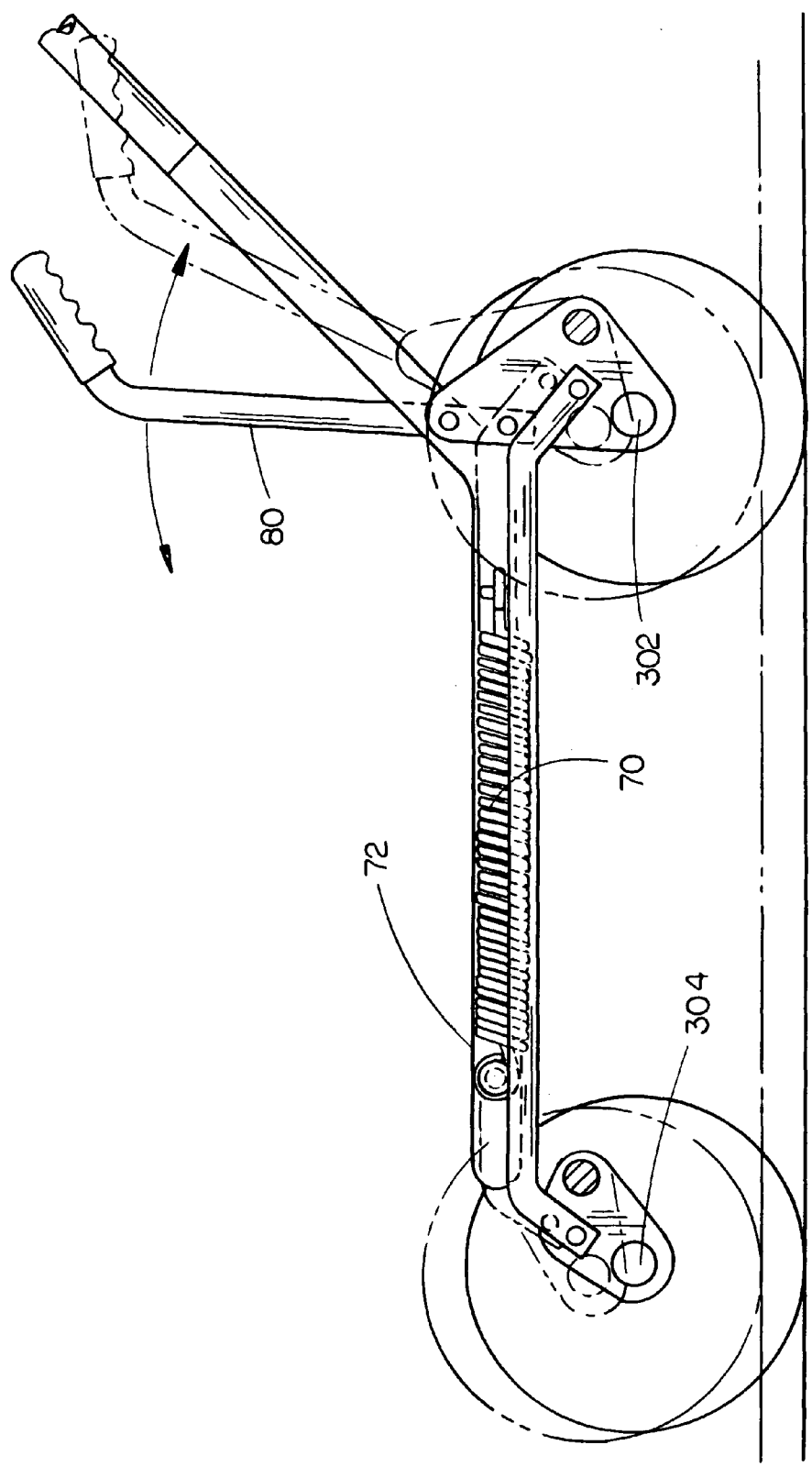
FIG. 17 is side elevation view of the height adjustment assembly illustrated in FIG. 16.

A single point height adjustment assembly is utilized in one specific embodiment. As illustrated in FIGS. 16 and 17, this single point height adjustment assembly includes a lever connected to a first bar 302. The first bar 302 is connected to a second bar 304, via a connecting rod. The connecting rod may be coupled to the height adjustment handle 72 utilizing a spring 70. In exemplary embodiments, the first bar 302 and the second bar 304 are offset from a rotational axis for a set of wheels connected to the lawnmower. In this manner, adjustment of the handle 80 will cause the first and second bars 302 and 304 to move around fixed points and thereby raise/lower the wheels as illustrated in FIG. 17. This assembly may be applicable to electric, gas, and even push mowers.

Figure 18:
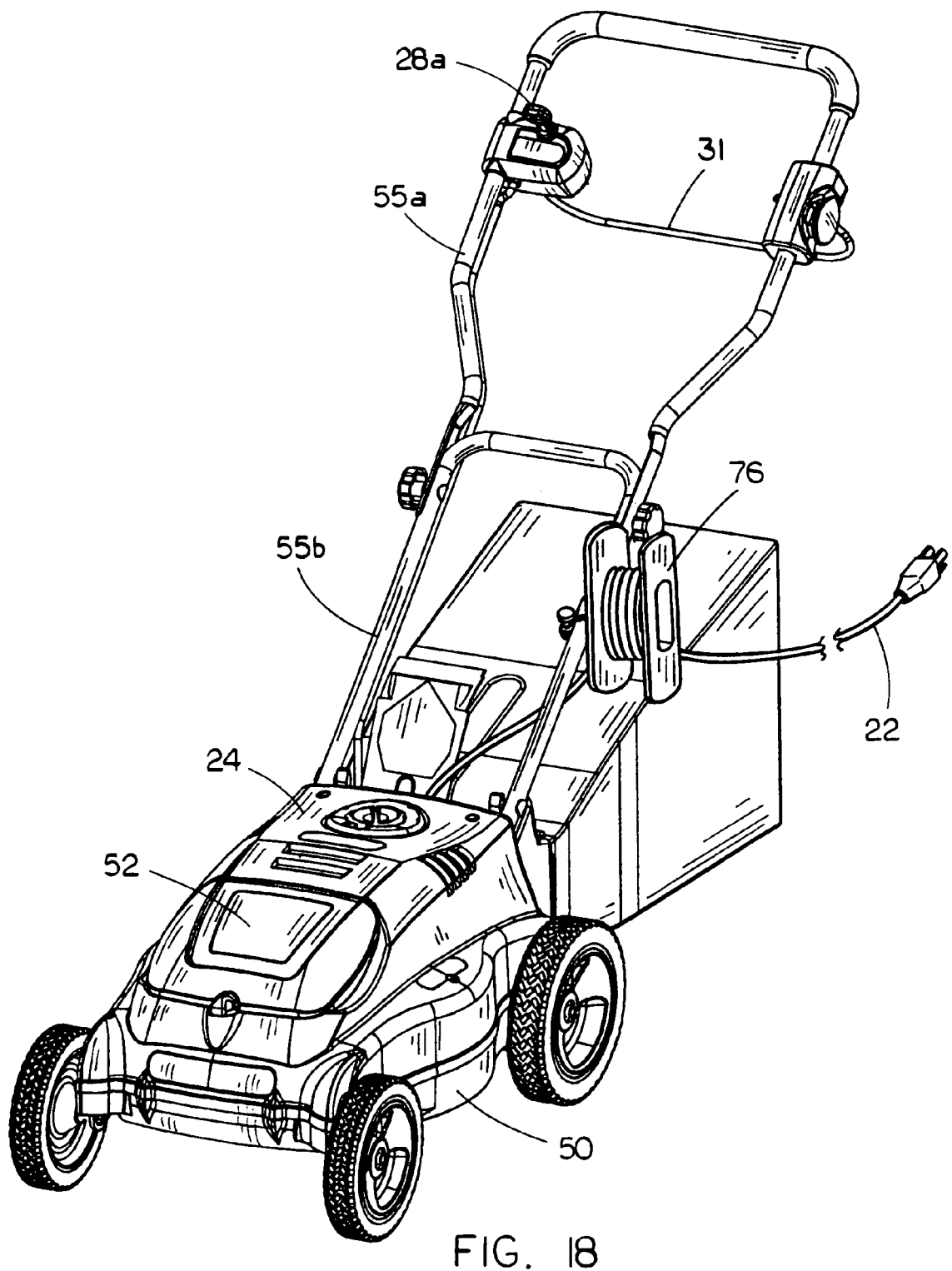
FIG. 18 is an isometric view illustrating a hybrid mower, wherein the hybrid mower includes a cord holder.
Figure 19:
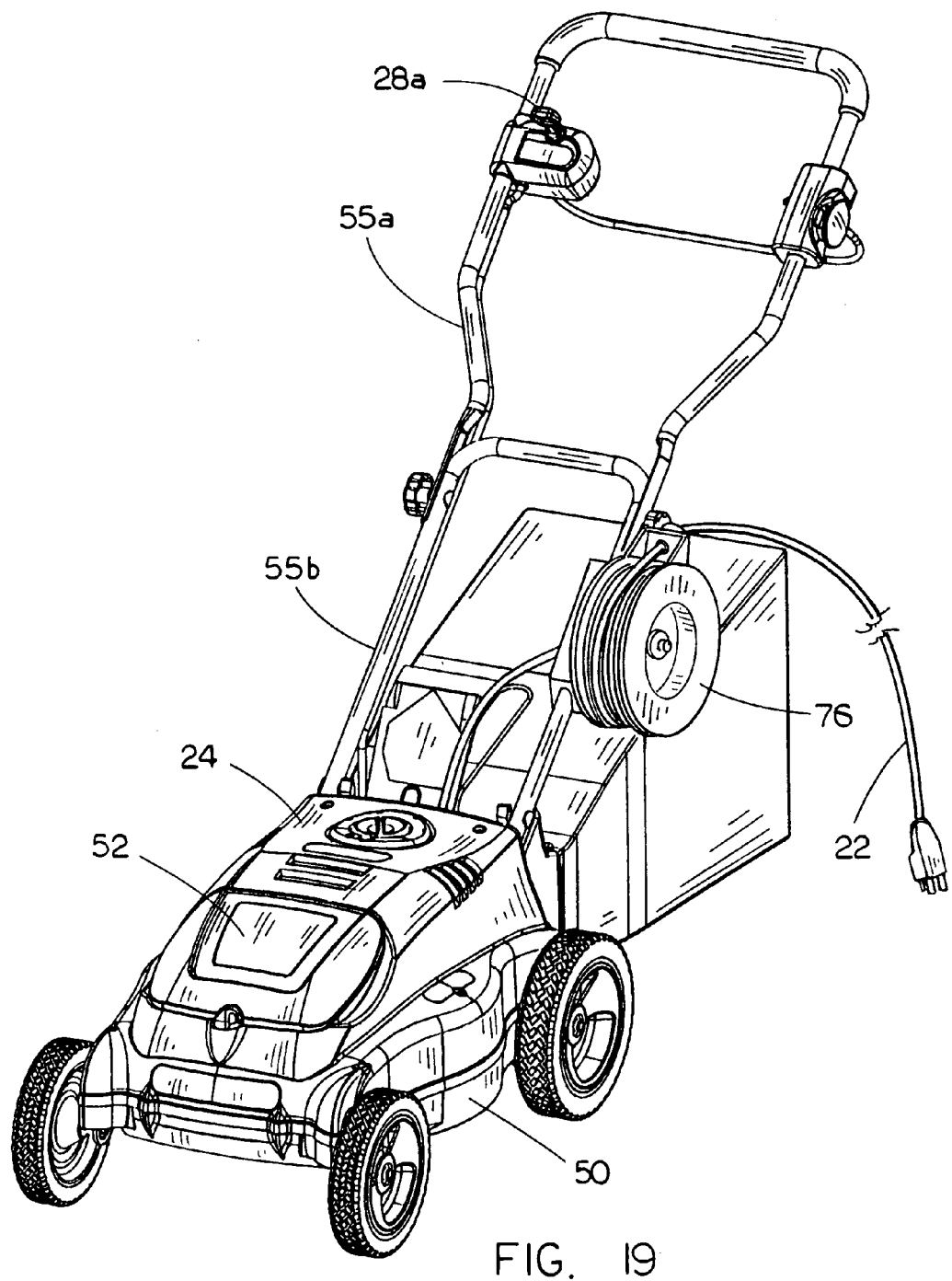
FIG. 19 is an isometric view illustrating a hybrid mower, wherein the hybrid mower includes another cord holder.
Figure 20:
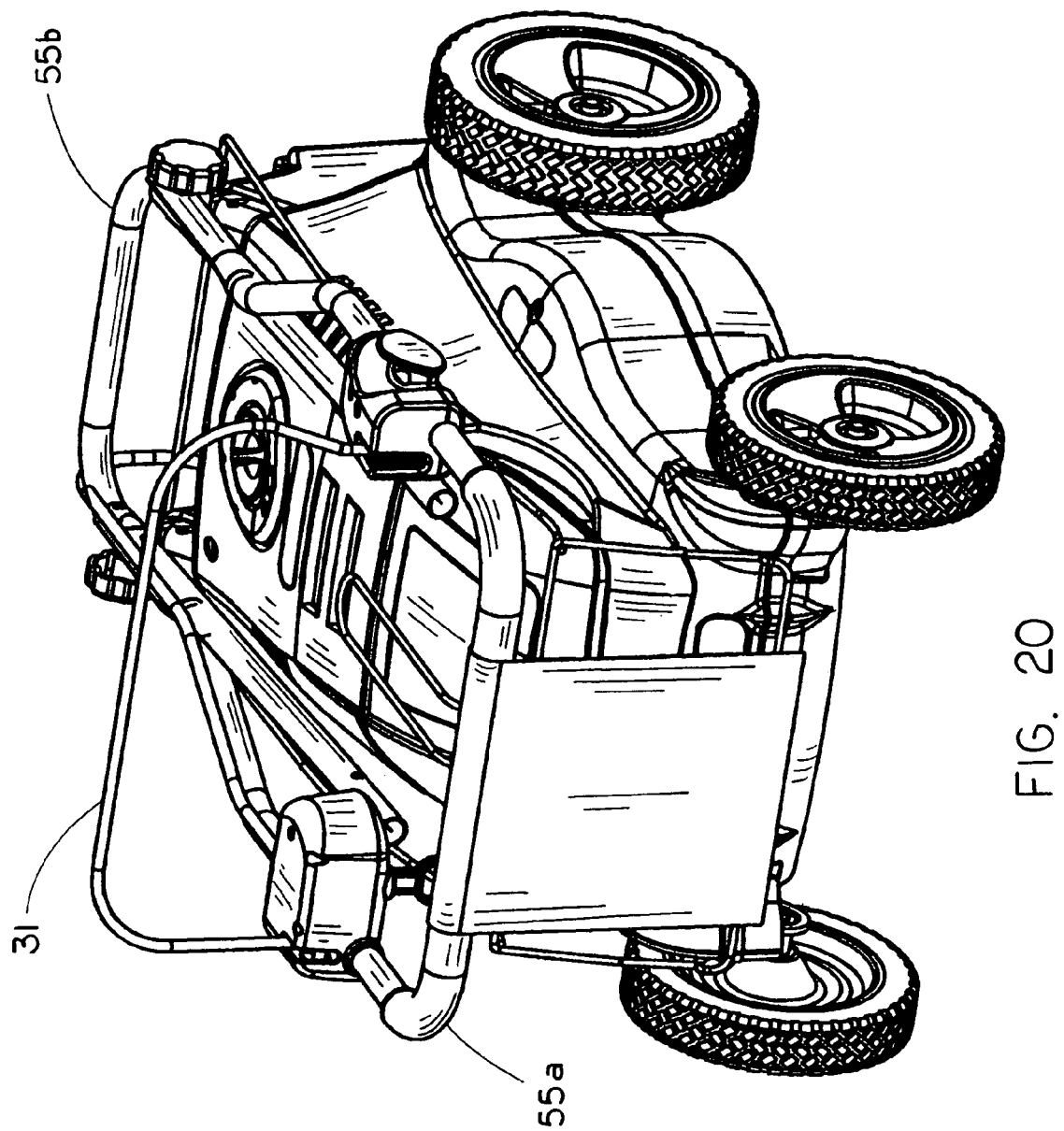
FIG. 20 is an isometric view illustrating a hybrid mower in a stowage position.

It is understood that alternative designs of the mower may be employed without departing from the scope and spirit of the present invention. For example, in one embodiment, the power control switch 21 is positioned near the controller 20 on the deck 50 to reduce the amount of wiring needed for connection. In an alternative embodiment, the power control switch 21 may be positioned near the circuit breaker 28 on the upper handle 55a to promote ease of use. Further, an AC cord holding device may be utilized to promote easier retrieving or retracting of the AC cord 22. In one embodiment, as illustrated in FIG. 18, an AC cord holding device 76 of a generally rectangular shape is rotatably attached to the handle. Rotating the device 76 in one circular direction (for example clockwise) may retract the AC cord 22, while rotating the device 76 in a reverse circular direction (for example counterclockwise) may allow user to retrieve more of the AC cord 22. Alternatively, the device 76 may be configured in other geometrical shapes, for example, in a generally circular shape, as depicted in FIG. 19. In still another alternative embodiment, the cord holding device includes two stationary holders distanced apart from each other (for instance 1 foot apart), where the user may wind/unwind the AC cord around the two stationary holders to retract/retrieve the cord 22.

Figure 24:
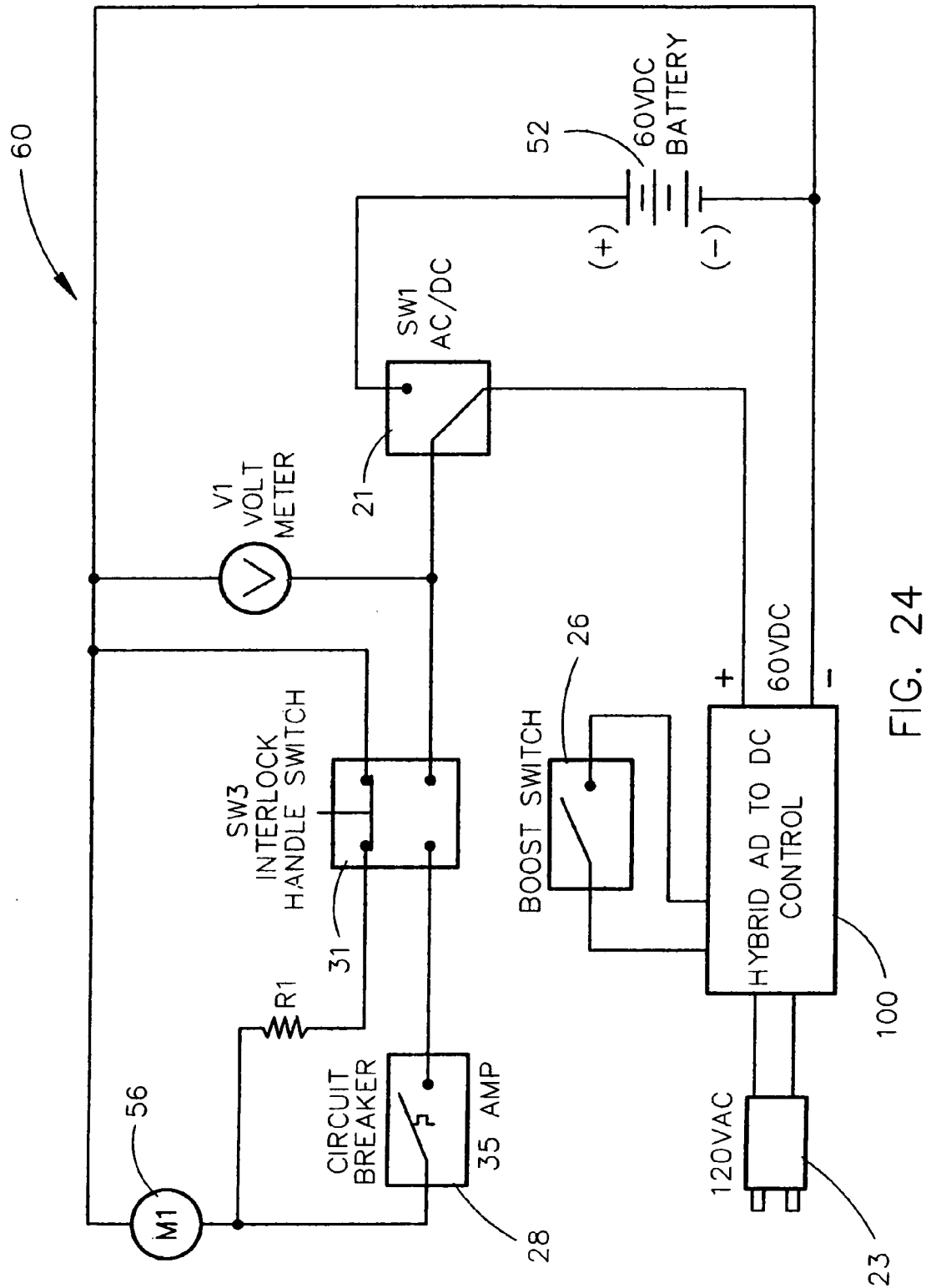
FIG. 24 is a circuit diagram of one option of a power control circuit for use with the hybrid mower illustrated in FIG. 1.

Turning to an exemplary embodiment shown in FIG. 24 wherein a power control circuit 60 is depicted providing, among other things, the boost and conserve power features of the present embodiment. The DC electric motor 56 is shown in electrical connectivity with the various power control circuit elements 60, 100 which include the interlock handle switch 31, for example being a double pole double throw switch, a circuit breaker 28 being, as depicted herein, a 35 amp breaker, a boost/conserve switch 26, in this example being a single pole double throw switch, a power selection switch 21, in this example being a single pole double throw switch, a battery pack 52 which is depicted as a 60 volt DC battery pack providing 60 volts presented to the motor 56 when operatively selected by the power selection switch 21, and a hybrid AC/DC controller 100 which serves as a power inverter or step down controller for converting the line voltage 120 VAC presented by the plug 23. The battery pack is shown as sharing a common ground with other portions of the power control circuit but may be in electrical connectivity with the power control circuit in many known and understood manners without actual connected electrical wiring as long as the user operation of the lawn mower is actuated through activation of the various switches.

In this present example, the boost selection switch 26 provides an increased voltage to the motor 56 by virtue of modifying an input resistive value or timing signal value to the pulse width modulation control unit 120 (see FIG. 25), which will be described below, in order to alter the gating of the IGBT thereby affecting the voltage wave form at the output of the power inverter or step down controller 100. The in rush current limiter may be provided as shown in order to prevent over-saturation of the circuit during the initial startup and energizing of the circuit. The rectifier 110 (see FIG. 25) as is commonly understood rectifies the voltage from AC to DC, in this case utilizing a full bridge rectifier as shown. However, many different forms of providing a step down controller are known in the art and the depictions set forth are not to be considered unduly limiting.

As depicted in FIG. 24, the design consists of the AC receptacle 23 which connects to the hybrid AC/DC controller 100 acting as a voltage converter which in turn is connected to a single pole double throw power selection switch 21 and a single pole double throw boost switch 26. The boost switch 26 is the boost conserve switch depicted and described herein and it provides resistive loads to the CMOS micro-controller for pulse width modulation control 120 when selected and opens the contacts when off. The power selection switch 21 toggles the DC motor between the output of the step down controller 100 and the DC battery voltage source 52. The output of the power selection switch 21 feeds a voltage meter shown which may be connected in parallel with the double pole double throw interlock handle switch 31, the interlock handle switch 31 toggling between shorting the DC motor 56 through resister R1 to ground and connecting the output of the power selection switch 21 through a circuit breaker 28 to the DC motor 56.

In this embodiment as depicted in FIG. 24, the boost switch 26 may provide increased voltage to the motor 56 when the hybrid mower 10 of the present embodiment is plugged in and running off of line voltage AC power. Such boost may be effectuated by modifying the pulse width modulation control 120 through alteration of the input resistive load at input pin 7 of the micro-controller shown in FIG. 25. More description of the power inverter and/or step down controller 100 of the power supply and mower of the present invention will be set forth herein.

Figure 26:
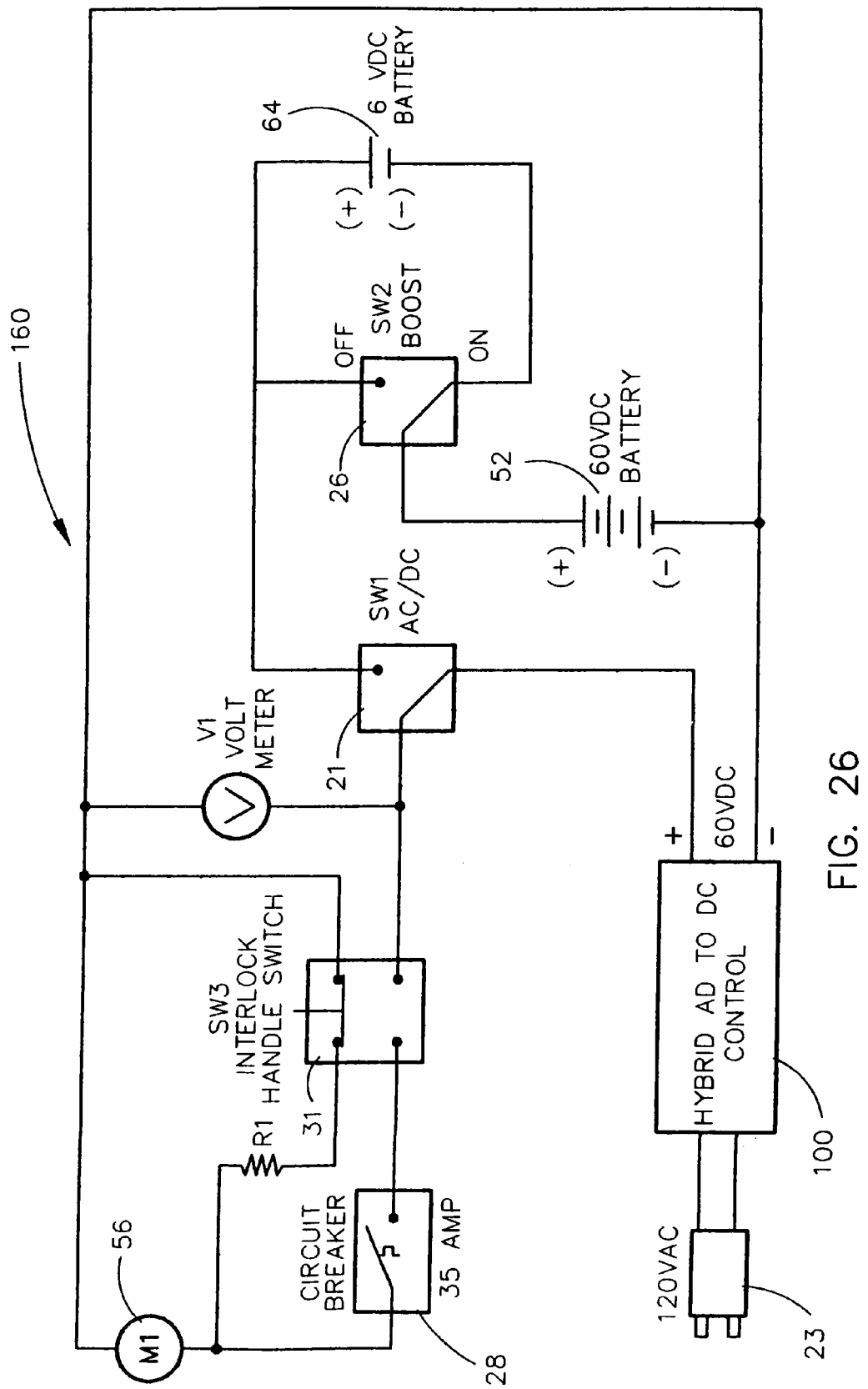
FIG. 26 is a circuit diagram illustrating one option of the power control circuit for use with the hybrid mower illustrated in FIG. 1.

Turning to an additional embodiment for the power supply circuit 160 of the present embodiment in FIG. 26, this embodiment provides an AC wall plug 23 which connects to an AC voltage and to the hybrid AC/DC controller 100 which in turn is connected to the power selection switch 21 which allows toggling between output of the AC/DC hybrid controller 100 when in the AC selection and to a boost conserve switch 26 and alternative power source when in the DC position. The boost conserve switch 26 toggles between shorting the positive side of the battery source 52 directly to the boost switch 26 when off and connecting the battery source 52 in series with the secondary or boost battery 64 before connecting to the power selection switch or AC/DC switch 21. The power selection switch 21 then feeds a voltage meter V which is connected in parallel with an interlock handle switch 31, here depicted as a double pole double throw switch. The interlock handle switch 31 toggles between shorting the DC motor 56 through a resistor R1 to ground and connecting the output of the power selection switch 21 through the circuit breaker 28 to the DC motor 56.

As depicted, in the example shown in FIG. 26, additional voltage is provided to the DC motor 56 when the hybrid mower is positioned in the DC power selection option and the boost switch 26 is activated thereby providing an additional 6 volts DC to the 60 volts DC provided by the battery 52. A secondary battery 64 provides additional voltage to the motor thereby increasing the motor speed and corresponding blade speed through actuation of the boost/conserve switch 26 to the boost setting. Thus, the power control circuit or power supply 160 depicted in FIG. 26 allows the operator, while in the DC battery operation mode, to increase the operating speed of the motor 56 corresponding to/via the additional voltage provided by the secondary battery 64. Controls are also provided allowing the operator to select between the operation of the motor 56 through the use of line voltage, namely 120 VAC, or through the use of the battery pack 52. Depicted herein is a secondary boost battery 64 which is provided separately from the battery pack 52, but it may be more practical to provide a secondary boost battery 64 in combination with and contiguous to the battery pack 52 as assembled and shown in the figures. Thus, the secondary boost battery 64 may be continuous with the battery pack 52 or may be separate but is provided to add additional voltage to the motor 56 in order to modify the operating output voltage of the power supply as presented to the motor 56.

The hybrid AC/DC controller 100 as shown provides both power inverter and step down capabilities in order to modify and regulate the 120 VAC to the proper voltage required to run the DC motor 56. However, these functions are provided to be only exemplary. The controller 100 acts as an inverter via rectifier 110 and also acts to properly modulate the voltage via the PWM controller 120 and associated gates. The power inverter and step down controller 100 may be part of the power supply or power control module 60 (see FIG. 24), 160 (see FIG. 26), 260 (see FIG. 27) and 360 (see FIG. 28) as needed, or may be excluded, depending on the voltage characteristics of the input line voltage and the requirements of the electric motor implemented in the present design.

Figure 27:
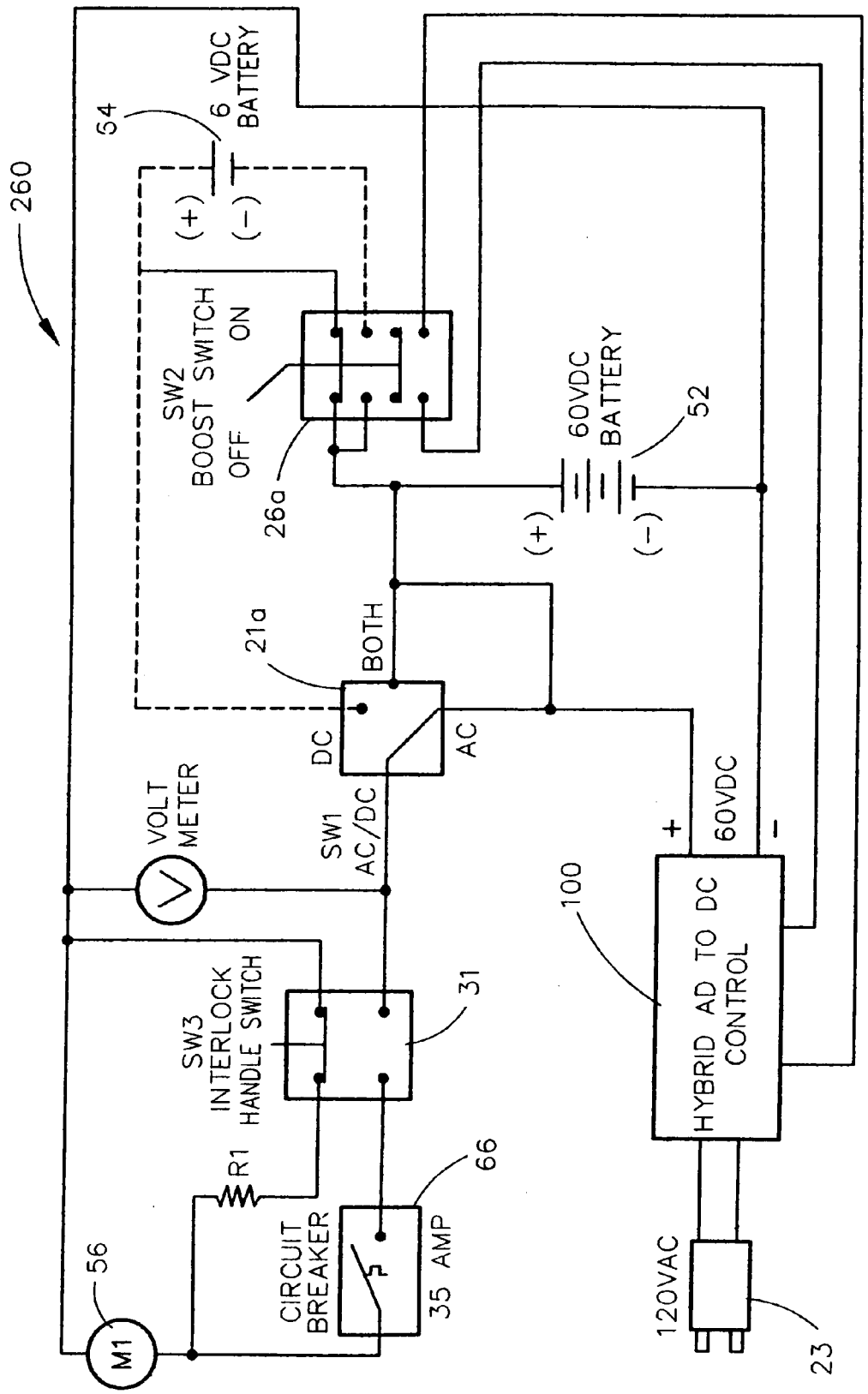
FIG. 27 is a circuit diagram illustrating an alternative option of the power control circuit for use with the hybrid mower illustrated in FIG. 1.

An alternative construction for the power control is the power supply circuit 260 depicted in FIG. 27 wherein both 120 VAC may be provided to supply power to the motor 56 while optionally a 60 volt DC battery may be provided and may be operatively selectable by the user through/via the power selection switch 21a. As depicted in this example, the boost switch 26a is operative to bring in series a secondary battery 64 which is 6 volts DC (when set in "BOTH" mode) with the voltage provided by the hybrid controller 100 of the power supply or the battery pack 52. The secondary battery 54, as previously described and as depicted in this embodiment of the power control circuit 260, may be in combination with the battery pack or may be secondary and separate therefrom. Additionally, as shown in the illustrated example, the 6 volt battery is brought into the circuit in series with the DC output of the hybrid control 100 or with the battery pack 52. Also, many variations for the structure, assembly and actual value of the secondary battery 64 for all embodiments may be provided in order to increase the voltage to the motor 56.

As depicted in FIG. 27, the power selection switch 21a further provides for three settings allowing user selectable options of powering the DC motor 56 by either 120 VAC, by the direct battery pack connection or by a hybrid BOTH connection. When operating in the strictly 120 VAC mode, the hybrid AC to DC control 100 of the present embodiment regulates and modulates the voltage for proper supplying of voltage to the DC motor 56. Alternatively, the power selection switch 21a provides for a DC operation whereby the motor 56 is operated merely by the battery pack 52. A third option is placement of the power selection switch 21a into the BOTH mode, wherein there may be a limited amount of power contribution from the battery. In such instance, voltage drops caused by increased load on the motor 56 may result in increased contribution from the battery pack 52. Additionally, as depicted in the embodiment shown, the boost conserve switch 26a may be provided for contribution of additional voltage from the secondary battery 64 when the power selection switch 21a is placed in either the BOTH or DC mode. In such an instance, the secondary battery 64 is brought in series with the voltage contribution from either the power supply 100 or the battery pack 52.

Figure 28:
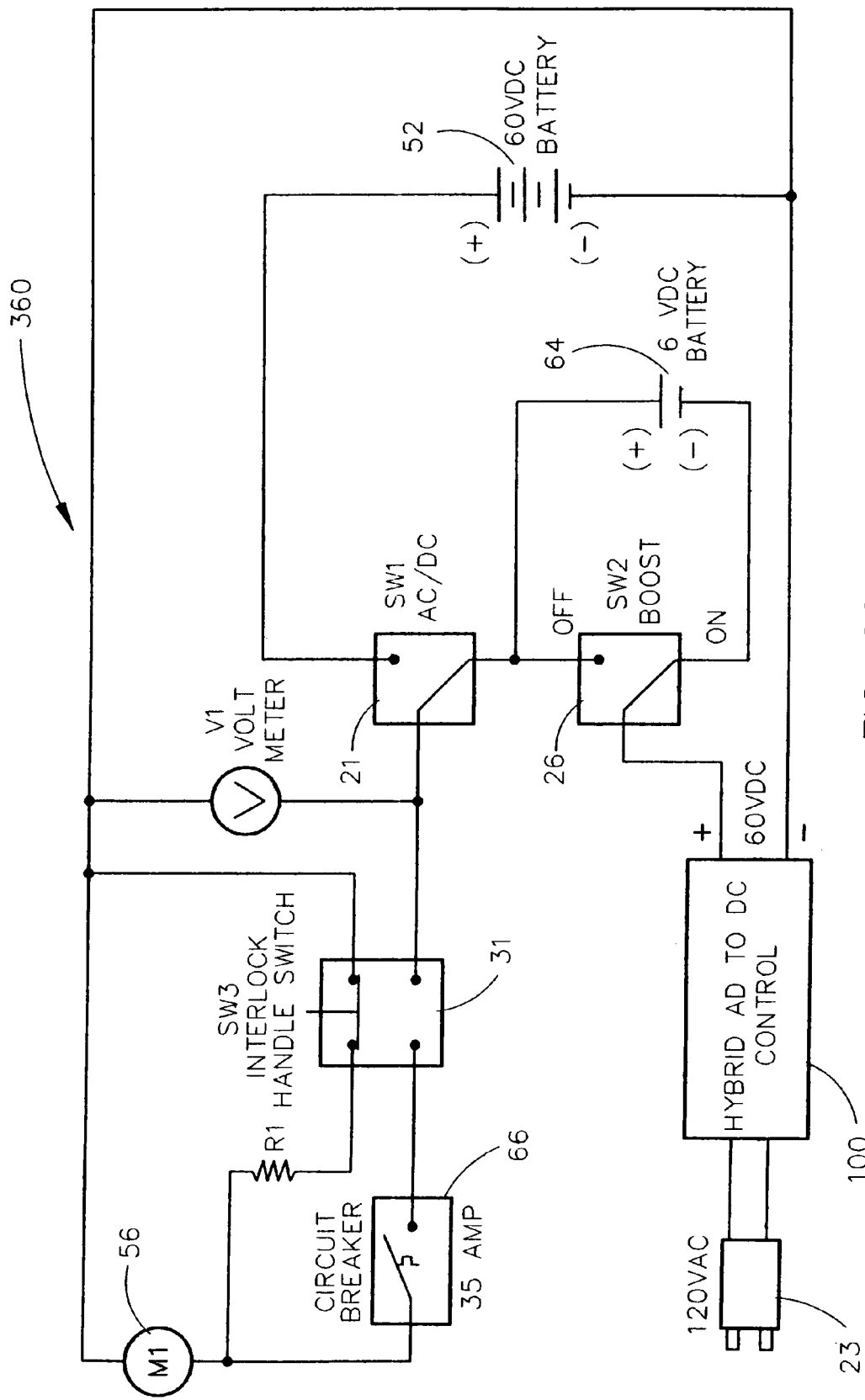
FIG. 28 is a circuit diagram illustrating still an alternative option of the power control circuit for use with the hybrid mower illustrated in FIG. 1.

Turning to FIG. 28, an alternative construction and embodiment of the power control and supply circuit 360 is depicted. In the example depicted, the power supply circuit 360 consist of a 120 VAC wall receptacle 23 which connects to the hybrid AC controller 100 which in turn is connected to an exemplary single pole double throw boost switch 26 thereby allowing the circuit to bypass boost battery 64 when off or be connected to the boost battery 64 when on. Additionally, the circuit continues to an exemplary single pole double throw power selection switch 21 which toggles between the output of the speed selection switch 26 when in the AC position and the DC battery assembly 52 when in the DC position. The power selection switch 21 feeds a voltage meter V which is connected in parallel with an exemplary double pole double throw interlock handle 31, the interlock handle switch 31 toggling between short in the DC motor 56 through a resistor R1 to ground and connecting the output of the power selection switch 26 through a circuit breaker 66 to the DC motor 56. In this example of the power control circuit 360, the boost or secondary battery 64 is brought in parallel with the power pack 52 or with the output of the hybrid controller 100 which may increase the current capacity for the motor when in higher speed or boost mode.

Multiple variations of power control module or power supply may be provided and are described herein. When mentioned herein as a hybrid power controller, power supply, power control module, step down controller or hybrid controller, these terms are collectively meant to imply providing electricity to the motor placed on the mower housing. No single element set forth in the exemplary embodiments provided herein, namely the power supply elements of the switches, battery packs, circuit breakers, inverters and modulation elements are to be unnecessarily applied to the interpretation of these terms. In fact, the power supply circuit collectively described herein may be implemented through the use of a significant number of alternative structures for regulation, modulation, controlling or limiting the proper voltage or power to the motor implemented in the examples herein. No unnecessary limitation should be interpreted from the particular use of the term controller, inverter, regulator or regulation or modulation as depicted herein.

Figure 25:
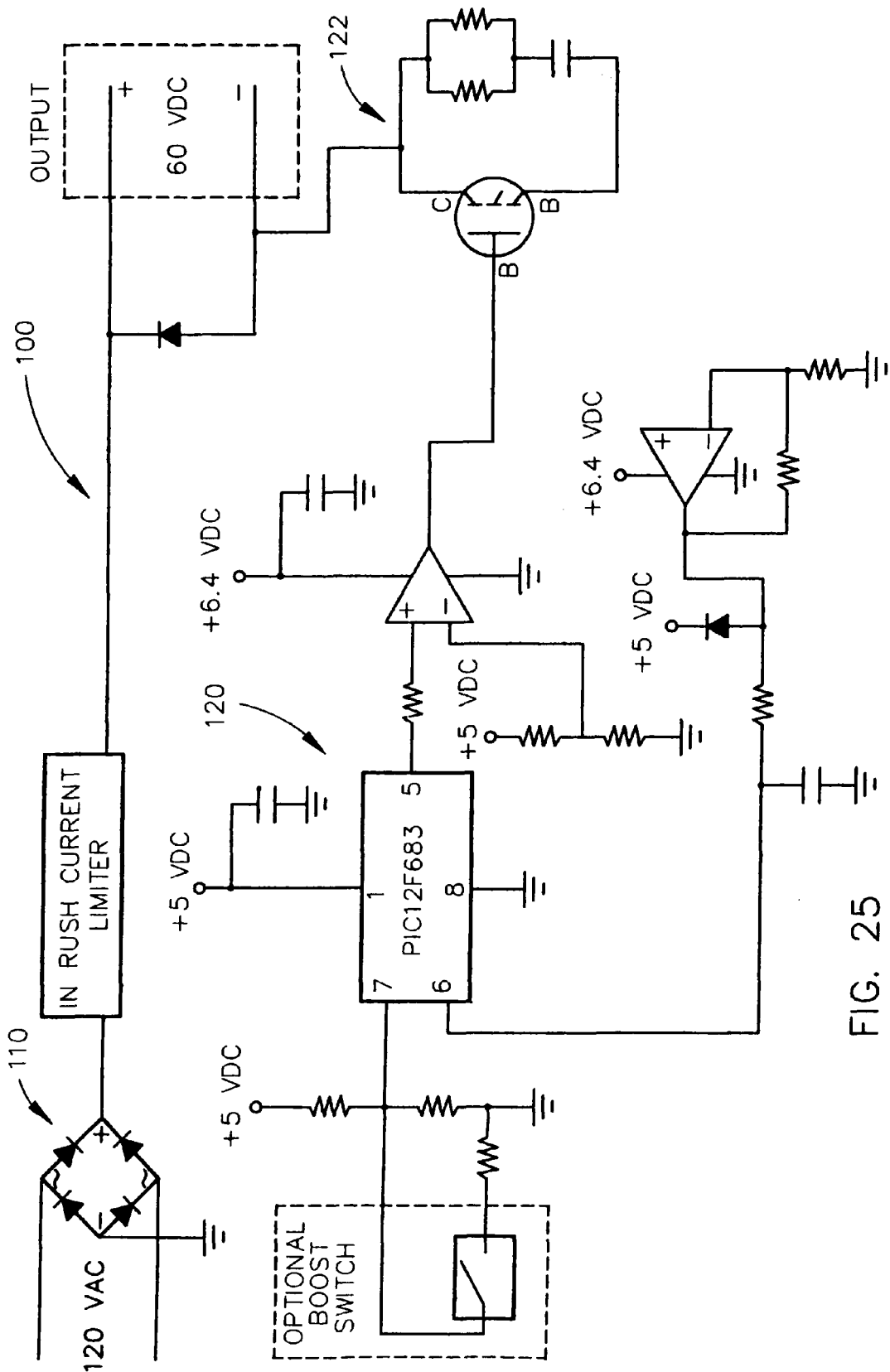
FIG. 25 is a circuit diagram of one option of the power inverter and hybrid control illustrated in FIG. 24 for use with the hybrid mower illustrated in FIG. 1.

Turning to the exemplary power inverter and in combination step down controller 100 which acts as a portion of the power control module, the hybrid controller 100 receives as input 120 volts AC which, in this example, is inverted utilizing a full bridge rectifier 110 depicted in FIG. 25. An in rush current limiter is provided also to prevent current surges during initial loading of the circuit and prevent further damage or over-saturation. A number of different inverter designs may be used in order to provide voltage rectification. As depicted in the present example, a full bridge rectifier may be utilized but this may be replaced with other known inverter circuitry as is available and known in the art.

In addition, as depicted in FIG. 25, an optional boost switch may be provided which may correspond to the boost switch 26 depicted in FIG. 24. In the present exemplary embodiment, the optional boost switch may be operable to modify the input to the pulse width modulation controller 120 which defines the voltage output for the step down controller 100. As shown, a micro-controller is utilized in order to set the appropriate pulse rate for the PWM control and feeds into the insulated gate bi-polar transistor (IGBT) which provides the switching or pulse gate driver 122 for the DC output of the hybrid AC/DC control 100. Thus, the hybrid controller 100 incorporates, but does not necessarily require, the utilization of voltage rectification and a voltage rectifier as is necessary in combination with variations of voltage modification such as a pulse width modifier. However, multiple options for step down voltage and control are known and may be utilized such as diode controls, triac controls, MOSFET controls and the like. Many of these are well known in the art and may be utilized in the step down controller and power inverter in combination as described herein. Additionally, as depicted, the pulse width modulation control circuit 120 receives as input in one possible embodiment the ability to modify the voltage by use of the boost switch. The boost switch in this embodiment modifies the reference signal fed into pin 7 of the micro-controller for the reference value which operates to modify the gating of the IGBT and therefore, the voltage characteristics of the DC output depicted. The boost mode depicted provides the alternative function of a boost integrated with the power inverter and step down controller. As shown integrated with the controller 100 in FIG. 24, the boost switch can be alternatively provided in many connections and this integrated boost switch may be integrated with many of the other alternative embodiments.

Figure 40:
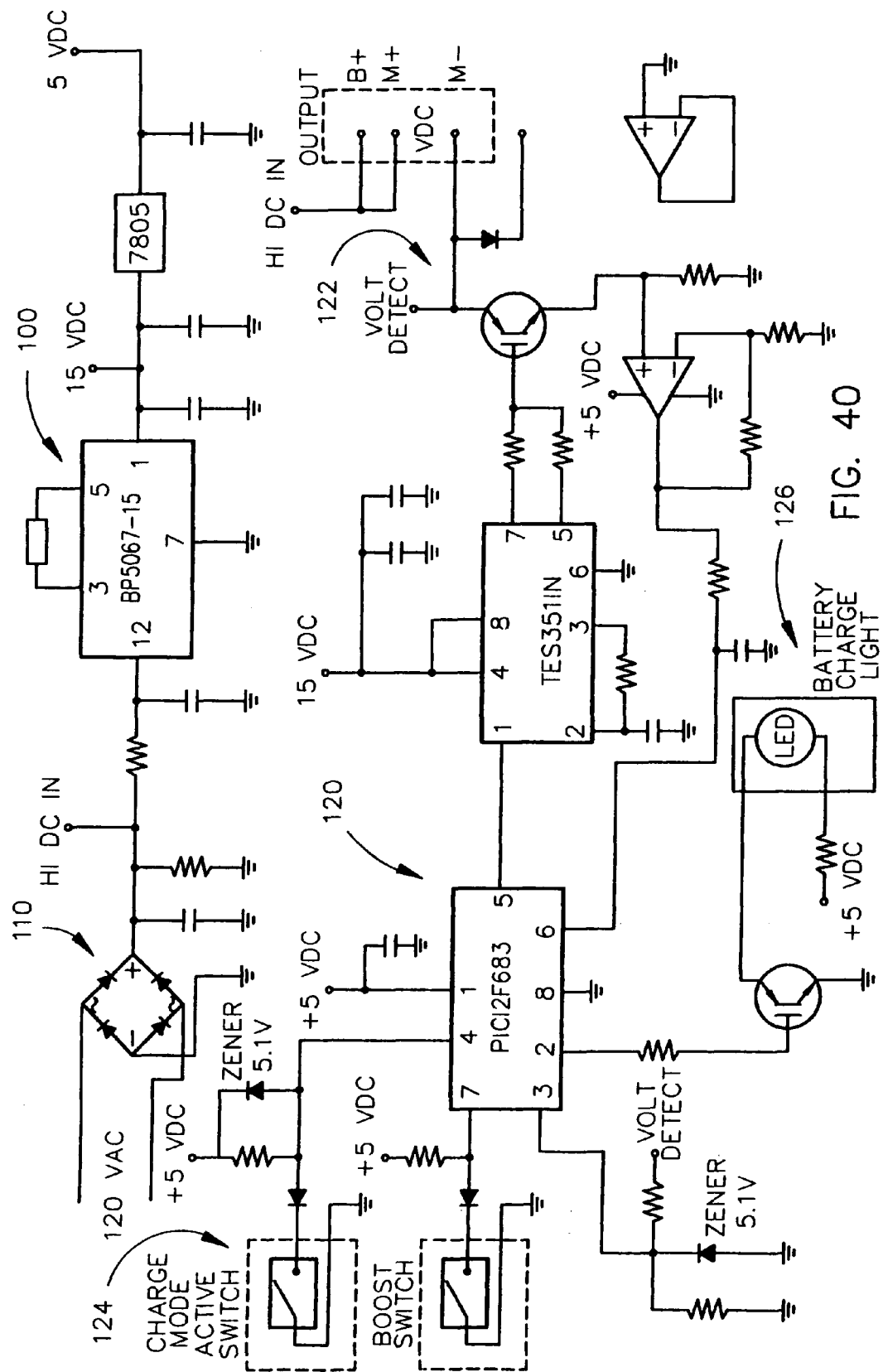
FIG. 40 is a circuit diagram of another option for the power inverter and hybrid control illustrated in FIG. 24 for use with the hybrid mower illustrated in FIG. 1.

Referring now to FIG. 40, the hybrid mower 10 may include a switch for selectively activating a battery charge operation, such as a charge mode active switch 124, or the like. The charge mode active switch 124 may be utilized for switching the hybrid mower 10 from a battery charging mode to a mode where the battery is not being charged, and then back again. In one specific embodiment, the battery is charged in the mower while not in operation, either by automatic switch or by user selectable switch. In another specific embodiment, the battery may be charged while in use (e.g., while mowing a lawn with the cord connected). In an embodiment with a user selectable switch and in situ charging, an operator may be able to control when power from AC mains is being utilized to charge the battery. Further, a battery charge light 126 (e.g., a Light Emitting Diode (LED) or another type of light and/or indicator) may be provided to indicate when such charging is taking place. It will be appreciated that the charge mode active switch 124 may be placed on the hybrid mower 10 and indicated accordingly with various labels and/or indicia. Moreover, it will be appreciated that a multi-colored LED and/or multiple LEDs may be utilized to indicate various charging states to an operator, such as the battery charging mode and modes in which the battery is not being charged. Further, it will be appreciated that various battery charging level indicators may be provided in a similar manner, including various combinations of indicators (e.g., tones, flashing lights, multi-colored lights, meters, and the like). Additionally, it should be noted that battery charge information may be presented by the battery itself (e.g., the battery may include an indicator for demonstrating a charge level to a user of the hybrid mower 10).

As is known, many variations of a step down controller and inverter may be utilized and in general, the power control module of the present embodiment may utilize power input of 120 VAC and may incorporate many switches and controls for electrically connecting the DC motor to either the 60 volt DC battery or the DC output of the hybrid power controller. This may include utilization of a power source switch as indicated wherein the power source switch effectively has a first power input as a connection of the power control module of the DC output of the power inverter and step down controller 100 or receive as a second input the 60 volt DC of the battery pack, the power selection switch providing the ability of the operator to switch between 120 VAC power and 60 VDC power from the battery pack. The power selection switch may be directly connected to the DC motor, in this exemplary embodiment a 60 volt DC motor, which operates the blade. The 60 volt DC motor may be operationally modified by utilization of a boost switch which is optional in many embodiments depicted herein, the boost switch changing voltage applied to the DC motor from 60 volts by an incremental value, thereby increasing rotational speed of the blade as necessary by the operator. Such increase in blade speed, as previously indicated, may be necessitated by thicker grass or other items being cut/mulched by the hybrid mower 10 of the present embodiment. This boost/conserve function which is shown herein provides the ability through the many embodiments disclosed to increase the voltage of the power control module, thereby increasing the rotational speed of the blades. As indicated, this may be desirable for short periods of time and may provide a first power output of the power control module, the first power output higher than a second power output, the second power output being a conserve feature wherein the DC motor draws less current and thereby increases the battery life charge of the battery pack. However, such feature does not have to be implemented only with the use of DC operation and DC power input as it is apparent that the increase rotational speed (boost) feature may be implemented also with 120 VAC wall power by increasing the DC voltage output of the hybrid AC/DC control 100 or by adding a supplemental DC power supply from the operating batteries, whether primary or secondary.

Figure 29B:
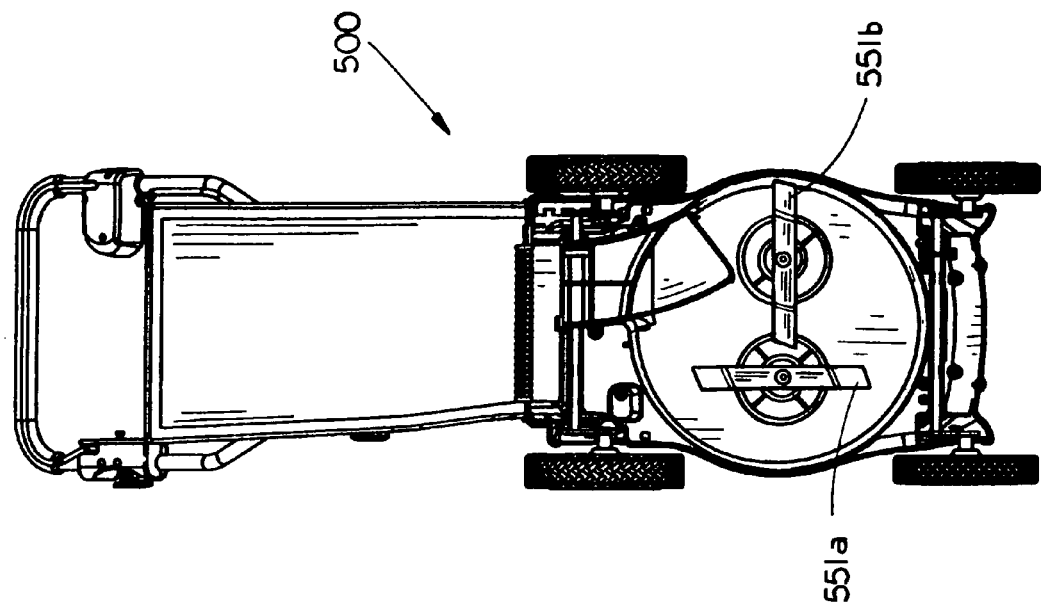
FIG. 29B is a bottom view of the hybrid mower illustrated in FIG. 29 A.
Figure 29A:
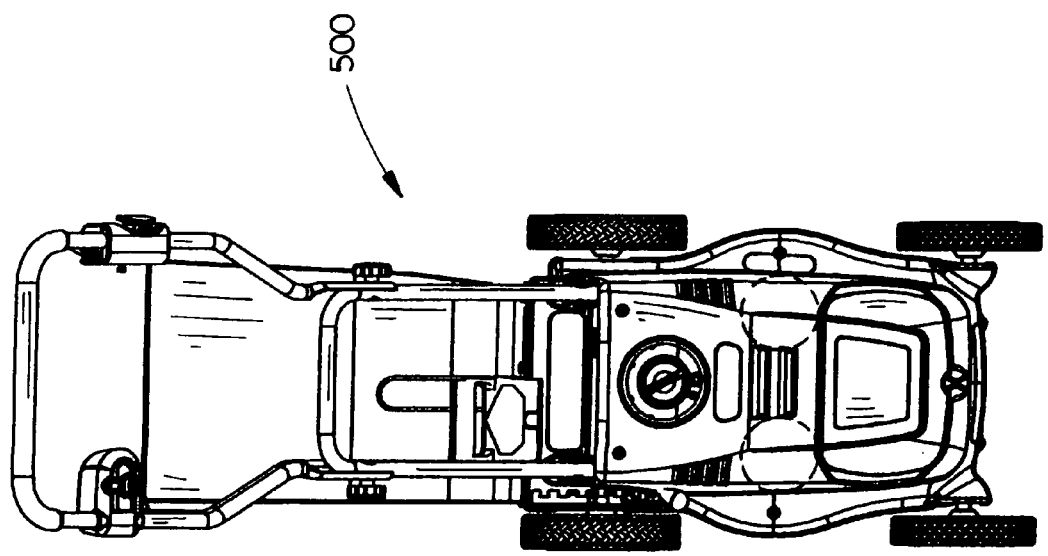
FIG. 29A is a top plan view of a hybrid mower including two motors and two cutting blades.
Figure 30:
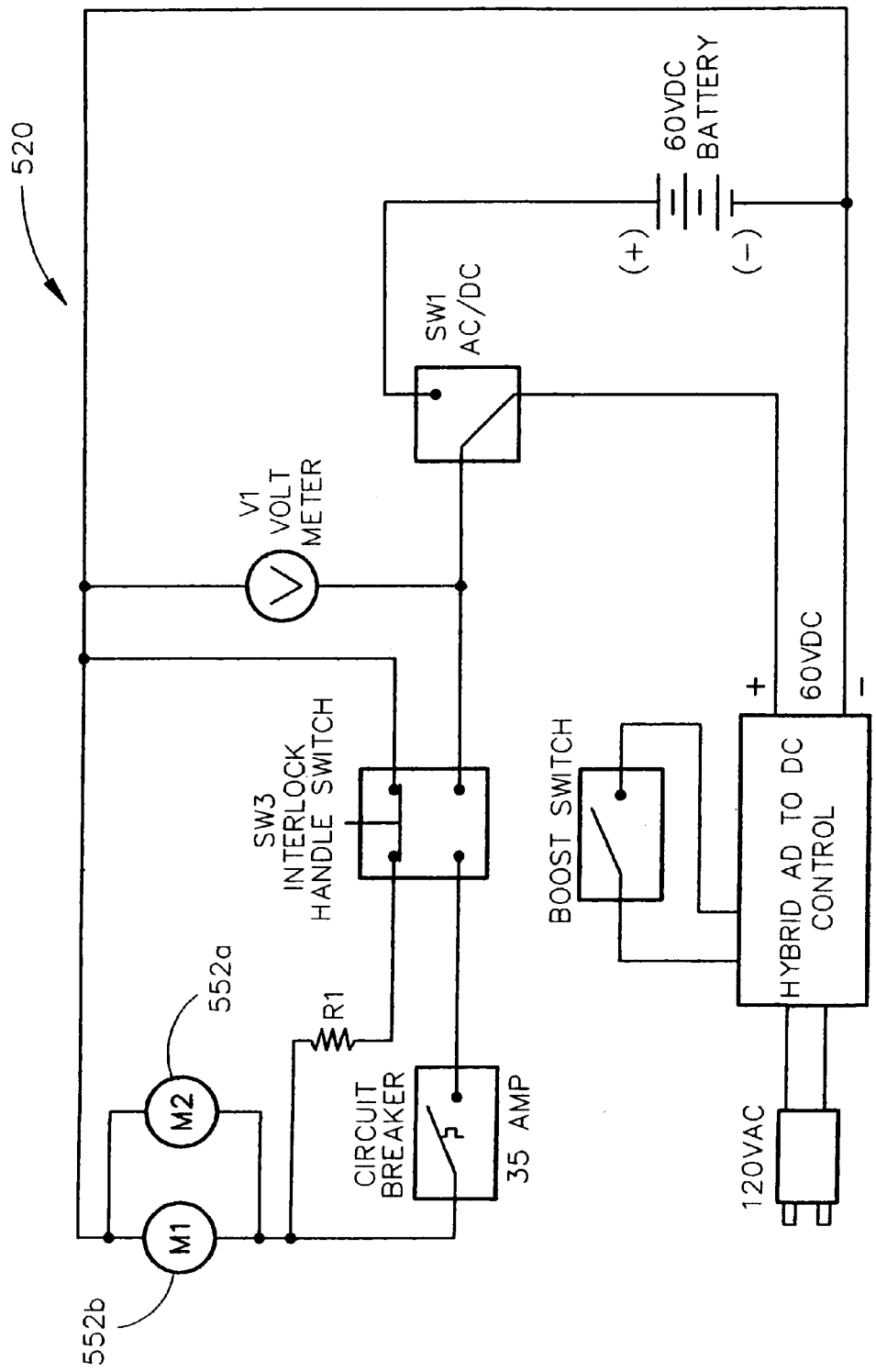
FIG. 30 is a circuit diagram illustrating one option of the power control circuit for use with the hybrid mower illustrated in FIGS. 29A and 29B.
Figure 31:
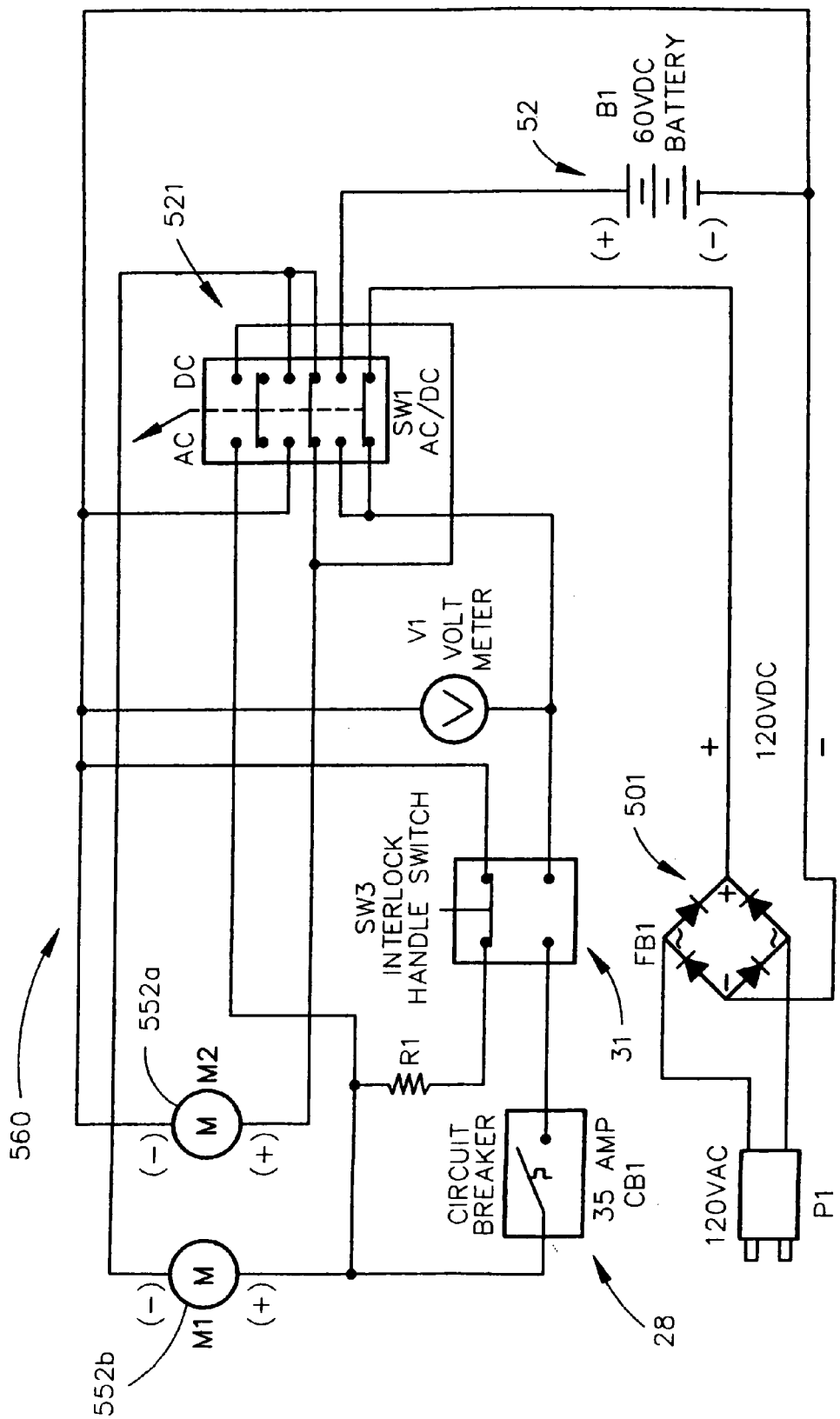
FIG. 31 is a circuit diagram illustrating an alternative option of the power control circuit for use with the hybrid mower illustrated in FIGS. 29A and 29B.

Referring now to FIGS. 29 through 31, an alternative embodiment of the electric lawnmower of the present invention is depicted. In such an alternative construction, the electric lawnmower 500 has a first and a second blade 551A and 551B mounted to a housing 550. Driving each of the blades, 551A and 551B are a first and second motor 552A and 552B as depicted in FIGS. 30 and 31. The alternative dual motor construction as is depicted may substantially use similar power control circuitry with the modification in the series or parallel connection of the DC motors 552A and 552B to the power supply voltage. It may be desirable to provide the DC motors with either 120 VAC line power (which is current rectified) or with the battery pack supplied DC electrical power. In the multiple embodiments provided, two blades may be provided to cut vegetation within and below the deck 550 of the electric lawnmower 500. A total cutting width of approximately 19 inches may be provided wherein each of the blades may be about 9.5 inches (end-to-end length). When attempting to cut a relatively large diameter with a single blade, such as the entire 19 inches of the housing width, excessive battery drain and power consumption may be experienced due to air movement resistance encountered by the blade. The air movement load may goes up exponentially as related to the blade speed thus adding a significantly higher load in addition to the normal vegetation cutting resistance load. The increased rotation speed of the blade and increased length of the blade may cause a significant proportion of the power supply to be used for moving air as opposed to cutting of vegetation.

Thus, for cutting of wider diameters, it may be preferable to utilize two motors and two blades working in tandem. By utilizing two motors as opposed to a single motor with an increased rotational speed, significant power savings may be experienced and run time lengths for the power supply battery as well as power consumption in both DC and AC operations may be significantly reduced. Additionally, when using dual motors 552A and 552B, such dual motor implementation may preferably not be used in series in conjunction with battery operation due to the motors running at half speed, i.e. sharing the battery pack supplied voltage in series. Thus, in a preferred implementation for dual motor use, although not necessarily required, the DC electric motors may preferably be placed in parallel (as is depicted in FIG. 30) in certain operations, such as when operated by the battery pack, and possibly in series in others, such as when connected to higher line voltage. However, the DC motors may be placed in either operation as is deemed necessary. Also, power usage may not become an issue when providing line voltage through the hybrid AC to DC controller wherein the AC current is rectified for operation of the DC motors depicted.

As depicted in FIG. 30, the dual DC motors 552A and 552B for the power control and supply system 520 of the present embodiment are shown in parallel. A circuit breaker may be provided in combination with the interlock handle switch as previously described in order to operationally connect and disconnect the motors as selected by the user through the blade clutch handle 31. Further, an AC/DC operational switch may be provided for selection of either power supply, either AC line voltage or DC battery power supply as previously described. Further, a hybrid AC/DC controller may be utilized to implement rectification of the 120 VAC to provide an adequate supply of DC current to the motors 552A and 552B. Further, the boost switch may be provided in combination with the hybrid controller or separately as previously described as various combinations of these individual elements may be selected.

In an embodiment, the dual blade DC motor combination may provide a 21 inch path for cutting vegetation wherein similar rotational speeds of 16,000 to 19,000 feet per minute blade speed may be experienced either on battery or on the AC line voltage with the higher rotational speed indicated when operating using line voltage. Such rotational speed indicates a potential of 5,800 to 6,900 RPM. These speeds typify the efficiency of the motor when the mower 10 is implemented in a non-cutting environment. During cutting of vegetation, the rotational speed of the blade tip may be 12,000 to 18,000 feet per minute, again with the higher rotational speeds indicated when operating on line voltage. These speeds relate to approximately 4,300 to 6,500 RPM on each of the two blades providing a 19 inch cutting diameter. Similar motors may be provided as previously described for implementation by the electric lawnmower of the present invention.

Further, the horsepower at cutting speed may be anywhere from 1.5 to 2.0 HP with the battery capacity being approximately 480 watt hours as necessary. Excellent cutting at these speeds with either the single motor or dual motor implementation may be experienced with adequate blade speed, cutting action and suction experienced within the lawnmower deck or housing. Mulching may also be accomplished when operating at these speeds and may be increased by implementation of the boost feature previously described which would be available to both DC electric motors during operation if implemented in one of the many various boost and conserver implementations previously described. Referencing again FIG. 30, both motors are depicted in parallel combination with the motors seeing approximately 60 volts from the power supply. When the motors are in such parallel connectivity, as one motor is loaded disproportionately due to various factors from either air resistance or vegetation and cutting resistance, the second motor slows down due to the reduced power available from the battery caused by the internal resistance and the higher amperage of the power supply as is depicted. Such self adjustment of the motor and hence blade speeds provide automated self regulation of both motors.

Given the power supply and control embodiment depicted in FIG. 31, the user may select either AC or DC operation, which also serves as a circuit setting switch, and places the two motors 552a and 552b in either series or parallel configuration. When in DC mode, the battery 52 supplies constant current and may result in better performance of the motors. Further, when placed in DC mode, the motors are in parallel and, as one motor is loaded disproportionately, the second motor may slow down due to the reduced power available from the battery pack caused by the internal resistance of the power supply design and motor configuration and by the higher amperage.

Turning to the alternative construction and embodiment of the power supply and control circuitry of FIG. 31, the power supply and control circuit 560 indicates that the dual DC motors 552A and 552B are connected to the output of the AC/DC power selection switch 521 which toggles the power supply of the circuit from the full bridge rectifier 501 when in the AC position, to the DC battery source 52 when in the DC position as is depicted. The output of the power selection switch 521 feeds the voltage meter shown which is connected in parallel with the double pole, double throw interlock handle switch 31. The interlock handle switch 31 toggles between short in the DC motors 552A and 552B through a resistor, R1 to ground and connecting the output of the power selection switch 521, a three pole double throw switch in this disclosed embodiment, through circuit breaker 28 to the dual DC motors 552A and 552B. When the power selection switch 521 is in the AC selection position, the dual motors M1 and M2 are connected in series thereby splitting the voltage output of the rectifier. In such operation, the full bridge rectifier may provide 120 VDC with 60V the seen by each motor. When the AC/DC power selection switch 521 is in the DC position, the motors M1 and M2 are connected in parallel thereby each sharing in the DC voltage output of the battery pack. The battery, being a constant current power supply, may provide better performance of the DC motors M1 and M2 in parallel and thus the connection as is described may be provided with the capability of switching between parallel and series connectivity of the motors M1 and M2 depending on the power source.

Further, as disclosed in FIG. 31, a full bridge rectifier or possibly other current rectification is depicted wherein the 120 VAC is input into the hybrid controller (not depicted as previously shown for simplicity). The full bridge rectifier in this embodiment may readily be replaced by various rectification circuitry, such as that previously disclosed herein. Thus, the rectifier depicted may be replaced by other current rectification techniques/hardware to rectify the current from AC to DC. These known systems include but are not limited to pulse width modulation which may readily be implemented herein.

When AC mode is selected from the user selectable power selection switch shown in FIG. 31, the total current going through many of the switches and electronic circuit elements presented herein may be one half of that going through the same switches and electronic circuit elements in the parallel or battery mode, given the embodiments depicted as a result of the rectification of the current and positioning of the loads. In other words, as shown in FIG. 31, the battery pack provides 60 VDC which is shared by the dual motors in parallel and the AC input line provides 120 VDC to be split by the dual motors in series in the disclosed embodiments. The response to uneven loading also may be more desirable as previously described in parallel as opposed to in series mode, since, when in series mode, as one motor is disproportionately loaded and slows down, the other motor will speed up. The actual speed modification of the motors in series however may be mitigated due to the nature of the air resistance to the blades and the significant amount of energy and load required to move the air in the mower housing. The relationship between air movement resistance and blade speed is an exponential relationship thus adding a significantly higher load when the blade is spinning faster, thus tending to cause the blades to operate at similar speeds in these embodiments. However, either combination of either series or parallel connection of the two DC motors as is depicted may readily be implemented and such description as set forth herein is not deemed limiting.

In both configurations of the dual motor design depicted, the ability and functionality of the boost and conserve features are still present in that the blade speed for both motors may be reduced in a conserve mode, particularly when operating off of the DC battery power supply in order to increase charge life. As shown in FIG. 30, a boost and conserve switch and feature may be implemented in conjunction with the hybrid controller shown. However, many differing combinations of the boost and conserve feature previously described may be applicable to either design and power supply shown. In conjunction with the power supply and control depicted in either embodiment, a secondary battery pack may be utilized as discussed herein to increase the voltage output of the DC operation and power supply thereby increasing the blade speed for both motors while also allowing battery use to be conserved in a second state thereby increasing overall run life per charge. Alternatively, increased voltage may be provided directly from the hybrid controller as depicted when drawing power from AC power supply.

In addition to the dual motor or other designs depicted, a dual voltage motor may also be desirable. Such dual voltage may be seen by the electric motor when switching between rectified line voltage from an outlet or from a battery pack, which may, in one embodiment, roughly be one half the line voltage. It would be preferable that a dual voltage electric motor be implemented for hybrid operation wherein all electrical or electro-mechanical aspects of the electric motor are in operation and use when utilizing either high voltage operation or lower voltage operation. By all electrical or electro-mechanical aspects being in use, it is meant that windings, brushes, commutators and other aspects of the electrical motor are mostly in operation and electrically connected to the power supply, whether high voltage AC or lower voltage DC. The described DC voltage permanent magnet motor design of the exemplary embodiment allows a single motor to operate using two different DC voltages. This may be accomplished through providing a hybrid controller which places electrically separated windings on the armature in either serial or parallel configuration, parallel for lower voltage operation and serial configuration for higher voltage configuration. In either configuration, the voltage potential across each coil will be about 60 VDC, or half the high voltage, as the coils are placed in series when in AC mode and in parallel when in lower voltage mode. Similarly alternative constructions may be implemented in the embodiment shown.

Presently, in the various embodiments depicted, a dedicated electric motor design may be implemented in the hybrid electric lawnmower which implements the ability and functionality of direct AC power supplied from a standard line voltage power source providing 120 VAC, or, of power provided from a secondary power supply source such as a battery pack, which would supply about 60 VDC to about 72 VDC, as is necessary or as is designed, all to the same electric motor driving the blade on the mower housing. In one embodiment, the hybrid controller utilized in the embodiment may convert the 120 VAC to 120 VDC through the use of various techniques, such as a rectifier or other circuit implementations. In such implementation, the user would elect to switch the mower power supply selection switch to AC, the hybrid controller would rectify the voltage to DC and the motor would operate at a possibly higher voltage supply. Alternatively, user selection of the power selection switch to DC would electrically connect the battery pack or other lower voltage power supply to the motor in order to operate the blade on the mower housing.

In either situation, user selection of AC operation as when the mower embodiment depicted is plugged into an outlet, or when user selection has been modified to DC operation for running the mower off of the battery pack or other direct current power supply, the electric mower of the present embodiment may alternate between high voltage operation or low voltage operation, the low voltage supply typically being one half the high voltage supply. Through implementation of dual core windings which are electrically separated and both rated at the lower voltage level, the rpm of the hybrid motor presently described may be maintained in either voltage configurations.

Figure 32:
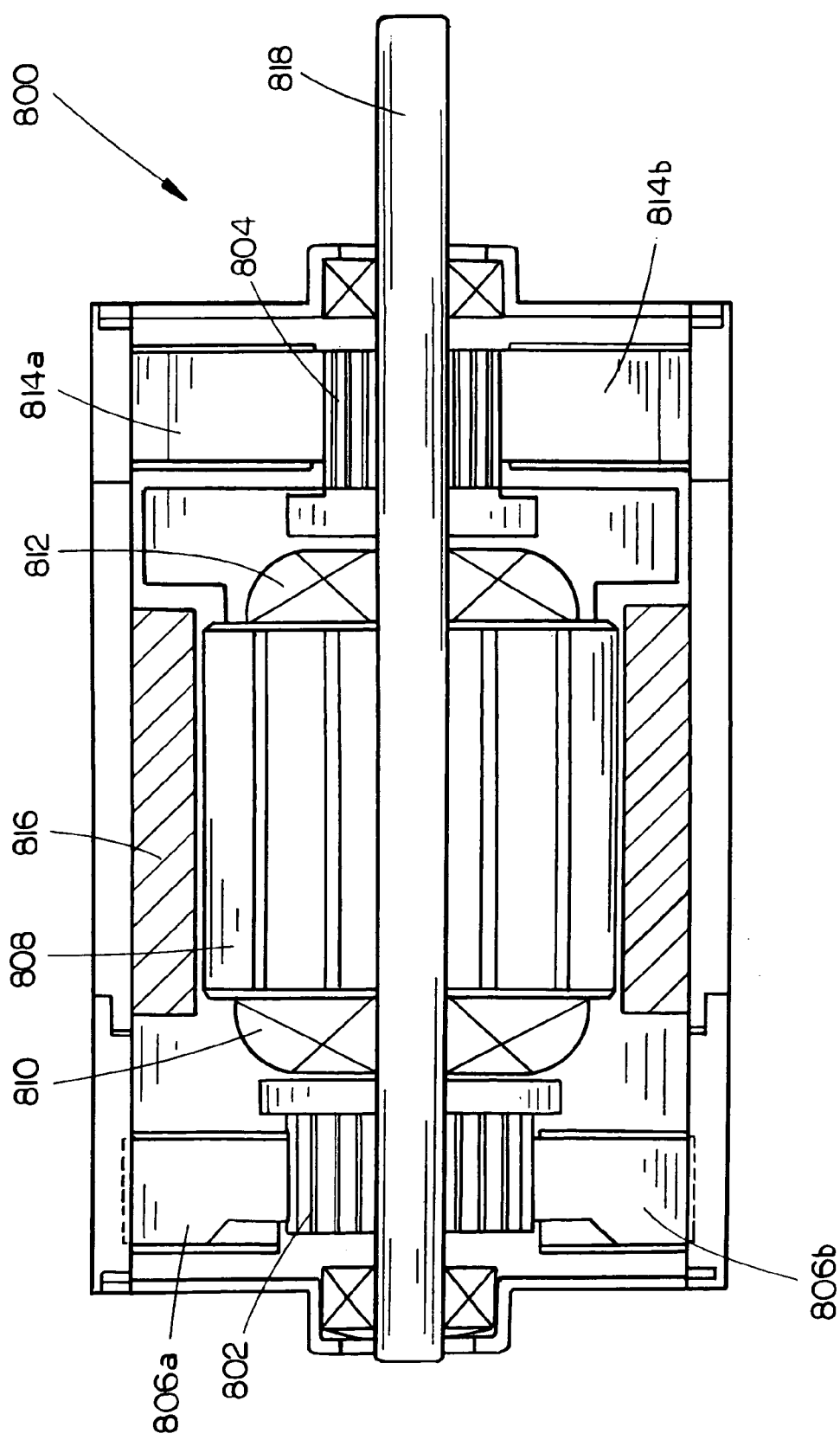
FIG. 32 is a cross-sectional side view of a motor assembly.

Referring now to FIG. 32, there is shown a dual voltage motor 800. In this exemplary embodiment, the dual voltage motor 800 includes a permanent magnet 816 and a single armature 808 connected to an axle 818. Attached to the armature 808 are a first commutator 802 separated from a second commutator 804. The first commutator 802 connects to a first set of windings (coils) 810, and the second commutator 804 connects to a second set of windings 812. The first set of windings 810 is separated from the second set of windings 812. Further, the first commutator 802 is in electric contact with a corresponding first set of brushes 806A and 806B, and the second commutator 804 is in electric contact with a corresponding second set of brushes 814A and 814B. The two sets of brushes (806 and 814) may be selectively configured through the use of a user selection switch which reconfigures the windings (810 and 812) on the motor from series connectivity (for higher voltage source such as rectified line voltage), to parallel connectivity (for a lower voltage source such as a battery pack). If the higher voltage is approximately twice the potential of the lower voltage, the power supply will provide approximately the same voltage potential across a first and a second commutator on the electric motor.

Figure 33:
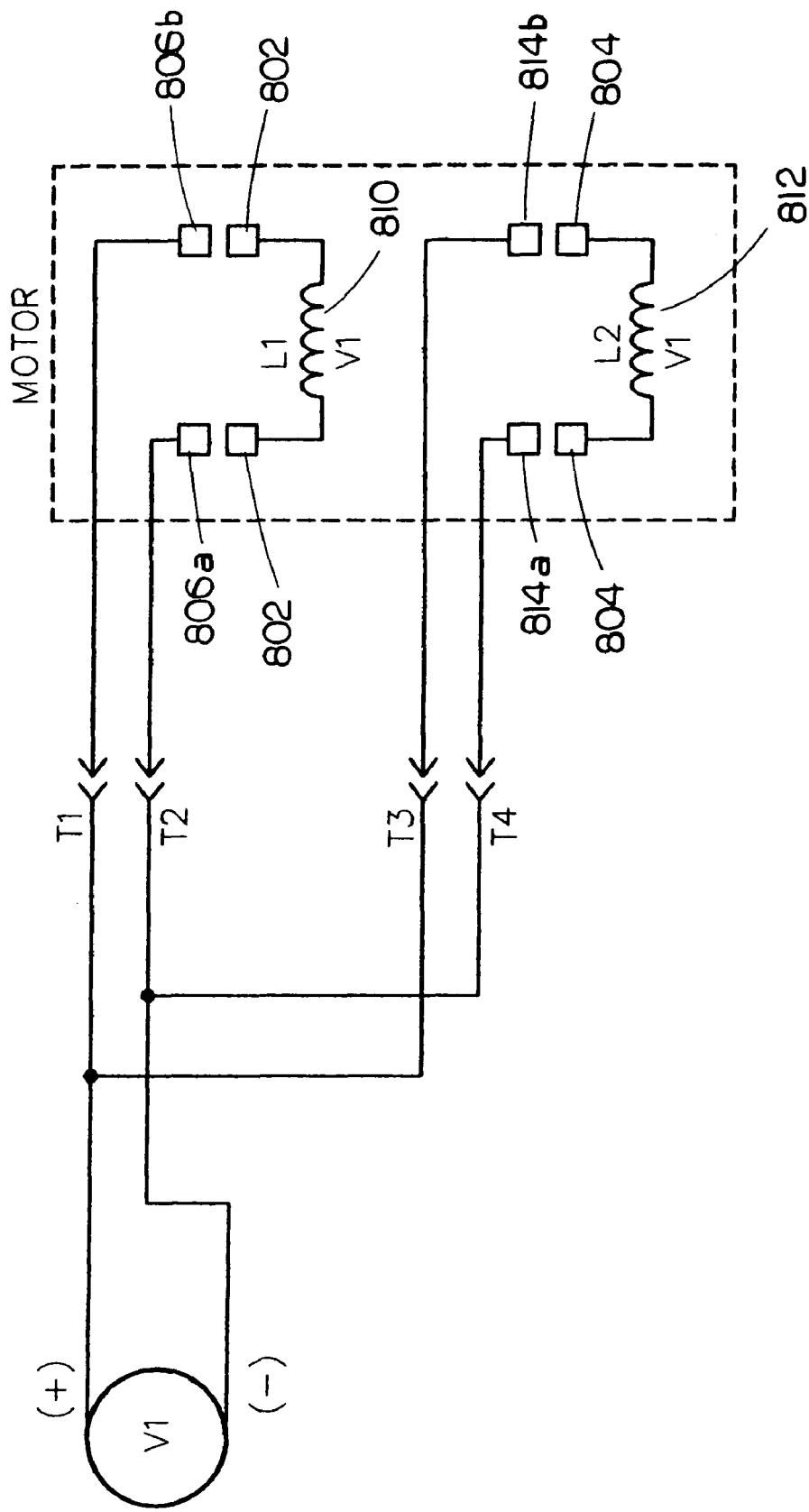
FIG. 33 is a circuit diagram illustrating a parallel configuration utilized by the motor illustrated in FIG. 32.

Referring now to FIG. 33, there is shown a parallel configuration of the dual voltage motor. In such configuration, the positive terminal of the V1 voltage source is connected to the terminal T1 of the motor, and the negative terminal of the V1 voltage source is connected to the terminal T2 of the motor. Terminals T1 and T2 are connected to the first commutator 802 through brushes 806A and 806B, which creates a voltage potential of V1 across the first coil 810. The positive terminal of the V1 voltage source is also connected to terminal T3 of the motor, and the negative terminal of the V1 voltage source is also connected to terminal T4 of the motor. The terminals T3 and T4 are connected to the second commutator 804 through brushes 814A and 814B, which creates a voltage potential of V1 across the second coil 810.

Figure 34:
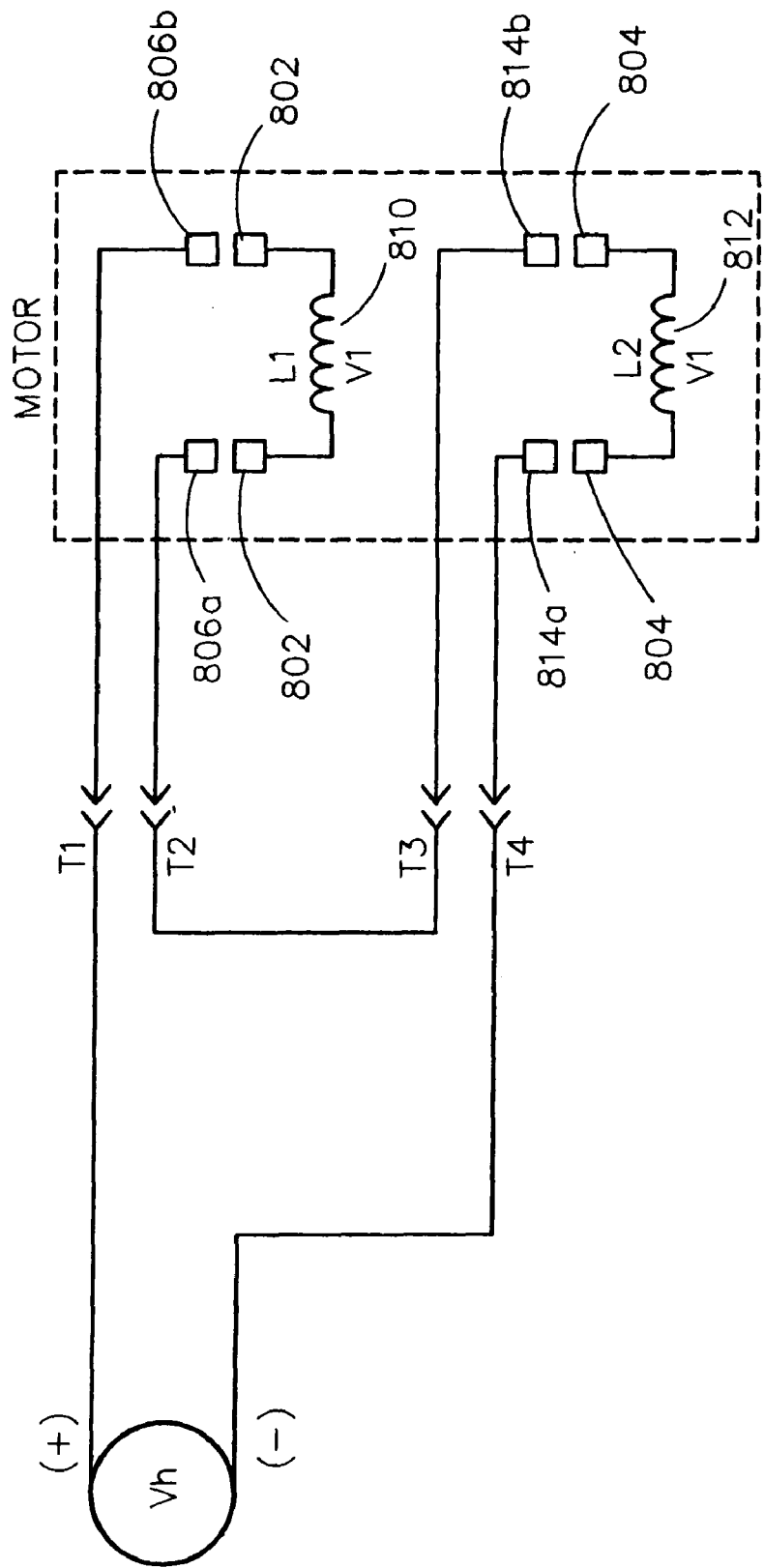
FIG. 34 is a circuit diagram illustrating a parallel configuration utilized by the motor illustrated in FIG. 32.

Referring to FIG. 34, there is shown a series configuration of the dual voltage motor. In such configuration, the positive terminal of the V2 voltage source is connected to the terminal T1 of the motor, and the negative terminal of the V2 voltage source is connected to the terminal T4 of the motor. Further, terminal T2 is connected in series to terminal T3. Terminals T1 and T2 are connected to the first commutator 802 through brushes 806A and 806B, and terminals T3 and T4 are connected to the second commutator 804 through the brushes 814A and 814B. This configuration creates a voltage potential of V2 across both coils which means that each coil will have a potential of a half of V2 in the present embodiment.

Figure 35:
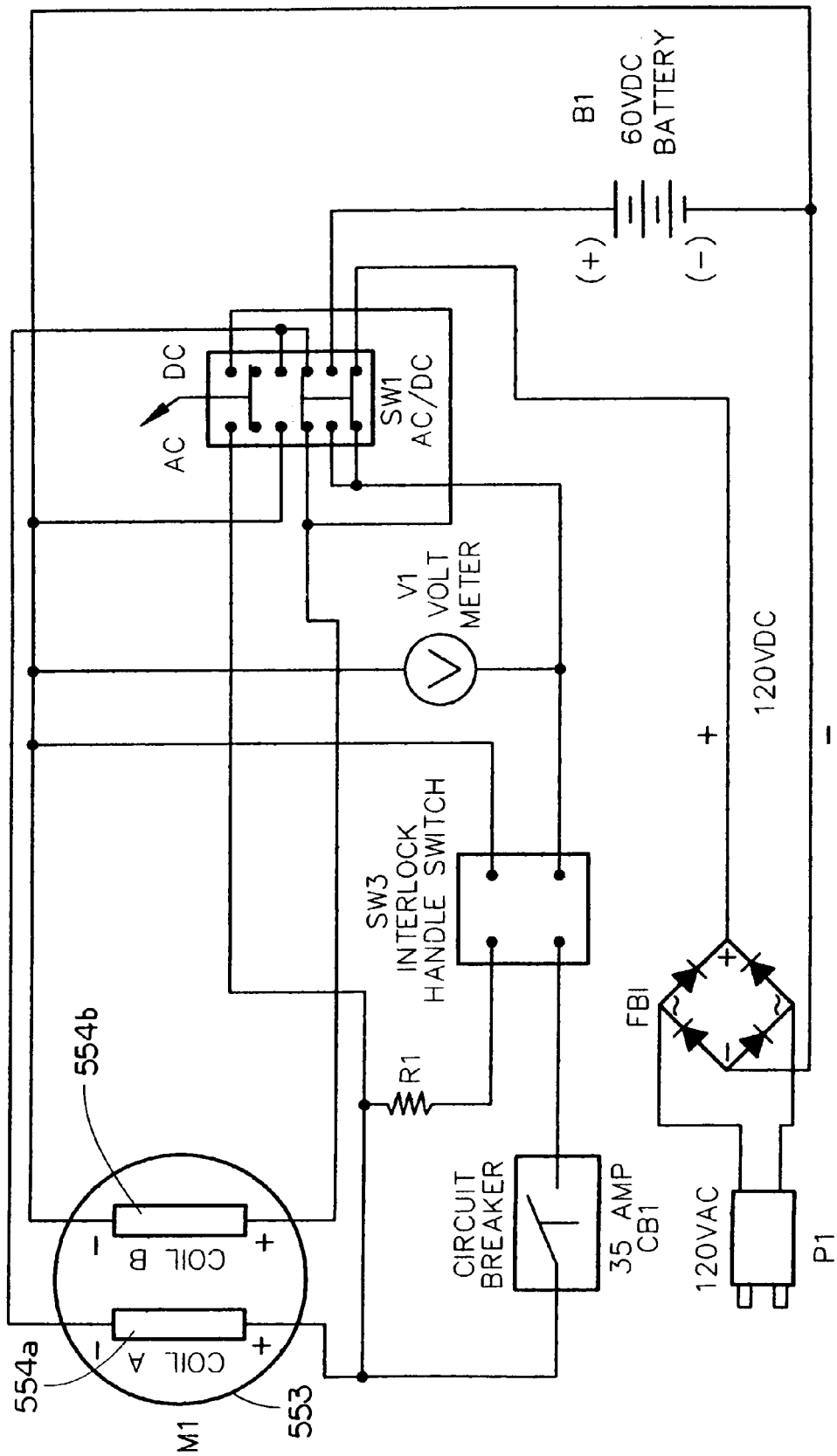
FIG. 35 is a circuit diagram illustrating one option of the power control circuit for use with the hybrid mower utilized the motor illustrated in FIG. 32.

FIG. 35 depicts an exemplary circuit implementation of an electric mower utilizing a dual voltage motor 553. The coils may be placed in either a high voltage configuration or a low voltage configuration by the user. In a high voltage configuration the coils 554A and 554B are placed in series. In a low voltage configuration the coils are placed in parallel. User selection of the high or low voltage configuration may be achieved through the use of the three pole double throw switch SW1 which provides the operator of the hybrid mower presently described in this embodiment the ability to provide a power supply of 120 VAC for higher voltage operation or 60-72 VDC for lower voltage operation.

In one specific embodiment, for example, when the mower is connected to a standard AC power source of 120 VAC, a rectifier may rectify the voltage to about 120 VDC (a higher voltage source). Thus, a series configuration will provide each set of coils about 60 VDC. Alternatively, when the mower is connected to a 60 VDC battery pack (a lower voltage source), a parallel configuration will provide each set of coils about 60 VDC as well. Substantially the same voltage provided to the sets of coils in both higher and lower voltages results in substantially the same revolutions per minute/rounds-per-minute (RPM) of the motor. In this manner, the dual-voltage lawnmower may be capable of executing speed control over the motor and the cutting blade without utilizing an electronic controller. This may represent a significant cost benefit to a consumer. In one specific embodiment, the lack of a controller may represent a cost savings of approximately ten percent. It will be appreciated that the number of windings in the motor may vary and/or the diameter of wires including the windings may vary.

Figure 41:
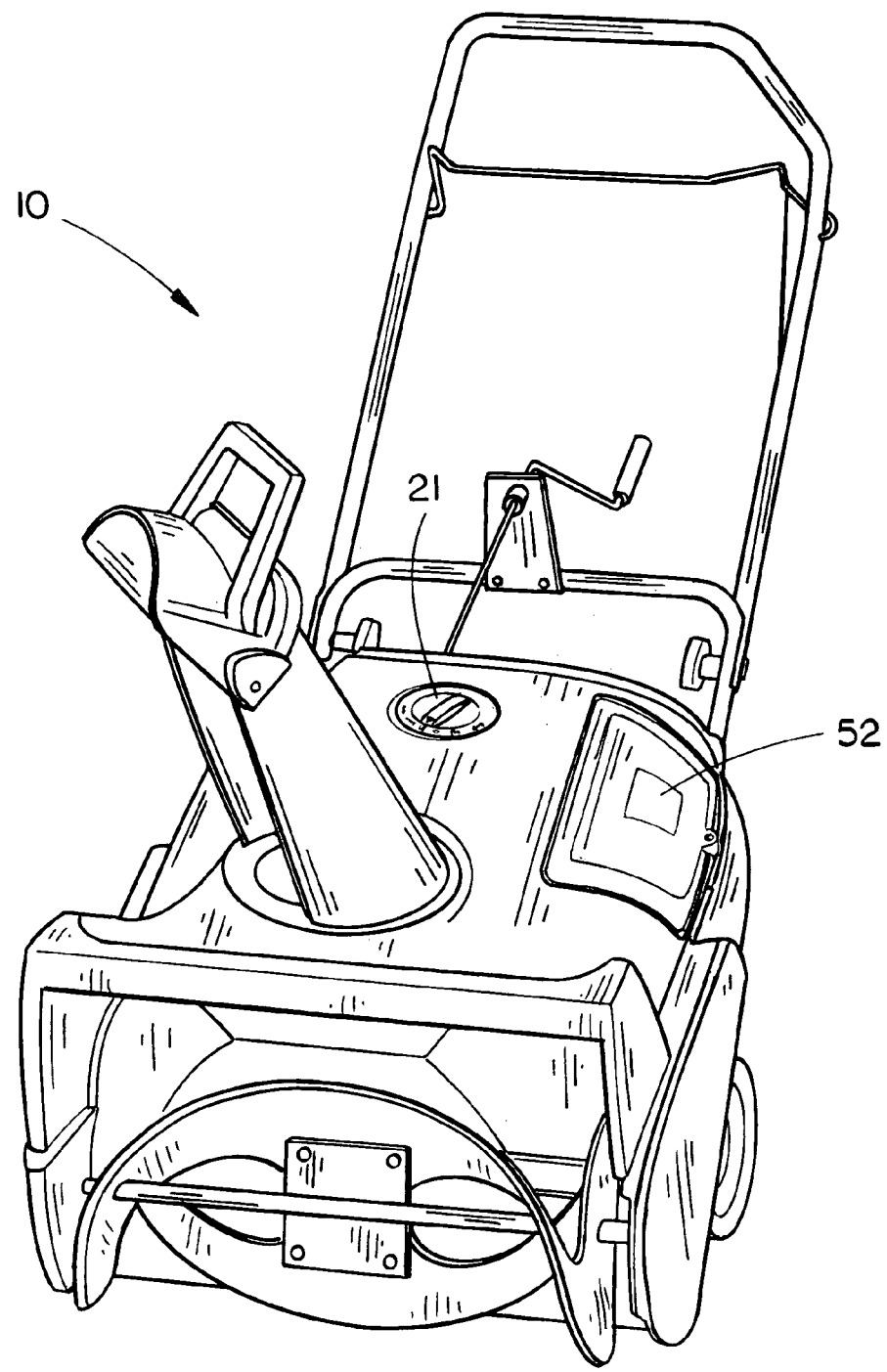
FIG. 41 is an isometric view of a hybrid snow blower.

It will be appreciated that while the hybrid device disclosed herein has been described with some specificity as a hybrid lawnmower, many other devices may be provided which also utilize some or all of the features disclosed herein. Moreover, while the hybrid lawnmower described above has been shown and described as including a cutting component housing including a cutting blade, it will be appreciated that the cutting blade is exemplary only, and a variety of other working elements may be utilized with the hybrid electric device of the present invention. For example, FIG. 41 illustrates a hybrid snow blower 10. The hybrid snow blower may include a cutting component housing including at least one impeller/fan (blowing component). In exemplary embodiments, the hybrid snow blower 10 may implement a removable battery/battery assembly which may be removed after each use of the snow blower 10 and stored indoors for preserving the battery during winter conditions. It is contemplated that other hybrid powered devices may be provided as well, including large devices similar to the mower and the snow blower (e.g., chipper/shredders, reel mowers, tillers, thatchers, and/or aerators), as well as small devices, such as handheld devices like trimmers and/or edgers. Moreover, it will be appreciated that these devices may include a variety of working elements. Further, these working elements may be provided in various quantities. For example, one hybrid electric device may include two working elements (and various types and combinations of motors for driving the working elements as needed), while another hybrid device may include three working elements (with an appropriate number and configuration of motors as needed).

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A device, comprising:
   a housing configured with a working element;
   a motor configured for urging motion of the working element;
   a power control module in electrical control of said motor, the power control module in electrical connection with a first power source and a second power source, the first power source being a battery assembly having a Direct Current (DC) power output, and the second power source being a power inverter receiving Alternating Current (AC) power from an AC power input line, the power control module having a power selection switch for selectively connecting at least one of the first power source and the second power source with the motor to cause said motor to urge motion of the working element;
   a charge switch for selecting between a first mode for charging the battery assembly when the power control module is receiving AC power and a second mode for not charging the battery; and
   a charge controller for controlling battery assembly charging when the first mode of the charge switch is selected,
   wherein the charge controller comprises logic embedded in the power control module.

2. The device as claimed in claim 1, wherein the power inverter is a rectifier and filter combination.

3. The device as claimed in claim 1, wherein the power inverter includes a step down controller.

4. The device as claimed in claim 2, wherein the step down controller includes a voltage rectifier and a pulse width modulator.

5. The device as claimed in claim 1, further comprising a current sensor for sensing current level of the battery assembly, wherein the charge controller analyzes current level changes obtained by the current sensor and adjusts a configurable duty cycle.

6. The device as claimed in claim 1, further comprising a timer logic with a predetermined maximum charge time, wherein the charging controller automatically sets to a maintenance mode when the predetermined maximum charge time have passed.

7. The device as claimed in claim 6, wherein the predetermined maximum charge time is 12.5 hours.

8. A system, comprising:

a housing configured with a working element;

a motor configured for urging motion of the working element;

a power control module in electrical control of said motor, the power control module in electrical connection with a first power source and a second power source, the first power source being a battery assembly having a Direct Current (DC) power output, and the second power source being a power inverter receiving Alternating Current (AC) power from an AC power input line, the power control module having a power selection switch for selectively connecting at least one of the first power source and the second power source with the motor to cause said motor to urge motion of the working element;

a charge switch for selecting between a first mode for charging the battery assembly when the power control module is receiving AC power and a second mode for not charging the battery; and means for controlling charging of the battery assembly when the first mode of the charge switch is selected, wherein the controlling means comprises logic embedded in the power control module.

9. The system as claimed in claim 8, wherein the power inverter is a rectifier and filter combination.

10. The system as claimed in claim 8, wherein the power inverter includes a step down controller comprising a voltage rectifier and a pulse width modulator.

11. The system as claimed in claim 8, further comprising a current sensor for sensing current level of the battery assembly, wherein the controlling means analyzes current level changes obtained by the current sensor and adjusts a configurable duty cycle.

12. The system as claimed in claim 8, further comprising a timer logic with a predetermined maximum charge time, wherein the controlling means automatically sets to a maintenance mode when the predetermined maximum charge time have passed.

13. The system as claimed in claim 12, wherein the predetermined maximum charge time is 12.5 hours.

\* \* \* \* \*